United States Patent
Matsushita et al.

(10) Patent No.: US 12,479,400 B2
(45) Date of Patent: Nov. 25, 2025

(54) VEHICULAR DIGITAL KEY SYSTEM, VEHICULAR DIGITAL KEY MANAGEMENT METHOD, VEHICULAR DEVICE, AND MOBILE TERMINAL

(71) Applicants: DENSO CORPORATION, Kariya (JP); IDEMIA FRANCE, Courbevoie (FR)

(72) Inventors: Suguru Matsushita, Kariya (JP); Marek Kociecki, Courbevoie (FR); Michal Wasilewski, Courbevoie (FR); Filip Later, Courbevoie (FR); Bartlomiej Lewinski, Courbevoie (FR)

(73) Assignees: DENSO CORPORATION, Kariya (JP); IDEMIA FRANCE, Courbevoie (FR)

( * ) Notice: Subject to any disclaimer, the term of this patent is extended or adjusted under 35 U.S.C. 154(b) by 39 days.

(21) Appl. No.: 18/615,138

(22) Filed: Mar. 25, 2024

(65) Prior Publication Data

US 2024/0227730 A1    Jul. 11, 2024

Related U.S. Application Data

(63) Continuation of application No. PCT/JP2022/035811, filed on Sep. 27, 2022.

(30) Foreign Application Priority Data

Sep. 29, 2021 (JP) .................................. 2021-159414

(51) Int. Cl.
*H04W 12/041* (2021.01)
*B60R 25/24* (2013.01)
*H04W 12/06* (2021.01)

(52) U.S. Cl.
CPC .......... *B60R 25/241* (2013.01); *H04W 12/041* (2021.01); *H04W 12/068* (2021.01)

(58) Field of Classification Search
None
See application file for complete search history.

(56) References Cited

U.S. PATENT DOCUMENTS

2016/0371481 A1    12/2016 Miyake
2017/0208062 A1    7/2017 Morikawa et al.
(Continued)

FOREIGN PATENT DOCUMENTS

CN    106773634 A    5/2017
JP    5586758 B1    9/2014
(Continued)

OTHER PUBLICATIONS

U.S. Appl. No. 18/615,021, filed Mar. 25, 2024, Matsushita et al.
(Continued)

*Primary Examiner* — Cai Y Chen
(74) *Attorney, Agent, or Firm* — Harness, Dickey & Pierce, P.L.C.

(57) ABSTRACT

A server issues a service key for using a designated vehicle and a plurality of one-time authentication keys based on a request from the mobile terminal, and distributes the one-time authentication key to the mobile terminal. The one-time authentication key is a disposable authentication key generated based on the service key, and has an expiration date. The one-time authentication key is consumed when the vehicular device authenticates the mobile terminal as a communication partner. The mobile terminal replaces the one-time authentication key stored in the mobile terminal at any time.

18 Claims, 25 Drawing Sheets

(56) References Cited

U.S. PATENT DOCUMENTS

| | | |
|---|---|---|
| 2018/0123804 A1 | 5/2018 | Smith et al. |
| 2018/0351746 A1 | 12/2018 | Yoon et al. |
| 2019/0122468 A1 | 4/2019 | Endo et al. |
| 2019/0213810 A1 | 7/2019 | Lundberg et al. |
| 2019/0253262 A1 | 8/2019 | Smith et al. |
| 2019/0385392 A1 | 12/2019 | Cho et al. |
| 2020/0349784 A1* | 11/2020 | Sakurada .............. B60R 25/241 |
| 2020/0403808 A1 | 12/2020 | Smith et al. |
| 2021/0264706 A1 | 8/2021 | Endo et al. |
| 2022/0094527 A1 | 3/2022 | Narumi et al. |

FOREIGN PATENT DOCUMENTS

| | | |
|---|---|---|
| JP | 6078686 B2 | 2/2017 |
| JP | 6613909 B2 | 12/2019 |
| JP | 2019220935 A | 12/2019 |
| JP | 2019536329 A | 12/2019 |
| JP | 6635102 B2 | 1/2020 |
| JP | 2020107076 A | 7/2020 |
| WO | WO-2023054296 A1 | 4/2023 |
| WO | WO-2023054298 A1 | 4/2023 |

OTHER PUBLICATIONS

U.S. Appl. No. 18/615,700, filed Mar. 25, 2024, Matsushita et al.

\* cited by examiner

FIG. 18

| REQUEST SOURCE INFORMATION |
|---|
| TARGET VEHICLE INFORMATION |
| TARGET USER ID |
| EXPIRATION DATE |
| AUTHORIZATION SETTINGS<br>· GUEST KEY ISSUANCE<br>· POWER SOURCE OPERATION<br>· AVAILABLE DOOR |

FIG. 19

| | |
|---|---|
| BASIC INFORMATION | SERVICE KEY |
| | SERVICE KEY IF |
| | ONE-TIME AUTHENTICATION KEY |
| | VARIABLE CODE |
| GUEST INFORMATION | ISSUE SOURCE INFORMATION |
| | OWNER KEY ID |
| | TARGET VEHICLE INFORMATION |
| | EXPIRATION DATE |
| | AUTHORIZATION SETTINGS |

VEHICULAR DIGITAL KEY SYSTEM, VEHICULAR DIGITAL KEY MANAGEMENT METHOD, VEHICULAR DEVICE, AND MOBILE TERMINAL

CROSS REFERENCE TO RELATED APPLICATION

The present application is a continuation application of International Patent Application No. PCT/JP2022/035811 filed on Sep. 27, 2022, which designated the U.S. and claims the benefit of priority from Japanese Patent Application No. 2021-159414 filed on Sep. 29, 2021. The entire disclosures of all of the above applications are incorporated herein by reference.

TECHNICAL FIELD

The present disclosure relates to a technique for generating and distributing a digital key, which is key information for locking/unlocking a vehicle.

BACKGROUND

In Patent Literature No. 1 (JP 6635102 B) and No. 2 (JP 2019-536329 A), the key information issued by the vehicle administrator is distributed to each of the mobile terminal carried by the user and the in-vehicle device, so that a system for using the mobile terminal as an electronic key of the vehicle is presented. As the mobile terminal, for example, a communication terminal such as a smartphone that can connect to the Internet is assumed. When a mobile terminal such as a smartphone can be used as a vehicle key in this way, the user does not need to have a dedicated electronic key when using the vehicle, which improves convenience. In addition, Patent Literature No. 1 and No. 2 also describe a configuration in which the owner of the vehicle and another person (who is defined as a guest) have different authority to use the vehicle.

There are various methods for verifying the validity of the device connected to the vehicle. For example, Patent Literature No. 3 (JP 6078686 B) discloses a method of authorizing a device connected to a vehicle by using an authentication code generated by combining a variable code which is a dynamically changed parameter and fixed key information. The contents of these prior art literatures can be incorporated by reference as an explanation of the technical elements in this specification.

SUMMARY

According to an example, a server issues a service key for using a designated vehicle and a plurality of one-time authentication keys based on a request from the mobile terminal, and distributes the one-time authentication key to the mobile terminal. The one-time authentication key is a disposable authentication key generated based on the service key, and has an expiration date. The one-time authentication key is consumed when the vehicular device authenticates the mobile terminal as a communication partner. The mobile terminal replaces the one-time authentication key stored in the mobile terminal at any time.

BRIEF DESCRIPTION OF THE DRAWINGS

The above and other objects, features and advantages of the present disclosure will become more apparent from the following detailed description made with reference to the accompanying drawings. In the drawings:

FIG. 18 is a diagram showing an example of information to be included in a guest key issuance request signal;
FIG. 19 is a diagram showing an example of information to be included in a terminal registration package transmitted to a guest terminal.

DETAILED DESCRIPTION

Figure 1:
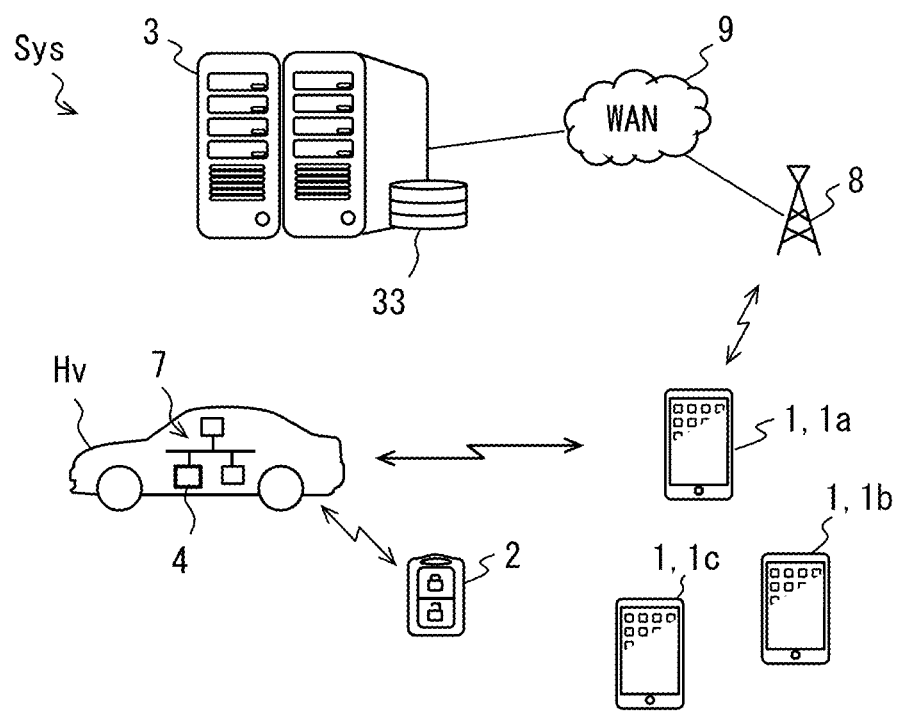
FIG. 1 is a diagram showing an overall image of a vehicular digital key system.

In a system that enables the use of a vehicle using electrical key information, it is required to strengthen the security. As one conceivable configuration to meet the demand, the mobile terminal generates a one-time authentication key, which is a disposable authentication code, based on the unique service key, and the one-time authentication key is used for the vehicle device to prove the validity. However, in the conceivable configuration, the processing load of the mobile terminal is increased. As a mobile terminal, various devices with different processing capacities are assumed. It may be preferable to simplify the functions provided in the mobile terminal as much as possible so that they can operate even on devices with low computing power.

As a further conceivable configuration for simplifying the functions of the mobile terminal, a one-time authentication key generation function is provided in the server, and the mobile terminal acquires the one-time authentication key in real time from the server when communicating with the vehicle. However, mobile terminals are not always in a state where they can communicate. If the mobile terminal is out of the communication range, the one-time authentication key cannot be obtained from the server and the vehicle cannot be used. That is, the convenience of the user may be reduced.

The present disclosure has been made based on the above examination or point of view, and one of the purposes thereof is to provide a vehicular digital key system capable of establishing both security and user convenience, a vehicular digital key management method, a mobile terminal, and a vehicular device.

The vehicular digital key system disclosed herein includes: a vehicular device mounted on and used in a vehicle; a mobile terminal which is an information processing terminal carried by a user; and a server that generates a unique service key for each mobile terminal as the key information for using the vehicle and delivers the service key directly or indirectly to each of the mobile terminal and the vehicular device. Therefore, the vehicular device is configured to determine the validity of the mobile terminal using a disposable one-time authentication key generated based on the service key. The server generates a plurality of one-time authentication keys based on a request from the mobile terminal and distributes the one-time authentication key to the mobile terminal with an expiration date. The mobile terminal receives the one-time authentication key from the server and stores it in a predetermined terminal-side memory. It is configured to replace a part or all of the one-time authentication key stored in the terminal memory based on the expiration date of each one-time authentication key.

According to the above configuration, since the mobile terminal (and thus the user) is authenticated using the one-time authentication key generated based on the service key unique to each mobile terminal, it is possible to increase the security compared to a configuration that authentication of the mobile terminal is performed using fixed key information. In addition, the mobile terminal is controlled to hold a plurality of one-time authentication keys. Therefore, even if the mobile terminal is in an environment where it cannot communicate with the server, it is possible to reduce the risk that the user will not be able to use the vehicle. In addition, according to the above configuration, the one-time authentication key held by the mobile terminal is periodically replaced based on the expiration date. According to this configuration, the valid one-time authentication key is changed over time, so that the security can be further strengthened.

Further, the vehicular digital key management method of the present disclosure is executed by: a mobile terminal, which is an information processing terminal carried by a user; a vehicular device mounted on and used in the vehicle; and a server that generates a unique service key for each mobile terminal as key information for using the vehicle. The server generates multiple disposable one-time authentication keys based on the service key of the mobile terminal according to the request from the mobile terminal, and distribute them to the mobile terminal with an expiration date. The mobile terminal receives the one-time authentication key from the server, and stores it in the predetermined terminal side memory. The mobile terminal periodically replaces a part or all of the one-time authentication key stored in the terminal side memory based on the expiration date of each one-time authentication key. The vehicular device specifies any one of the one-time authentication keys held by the mobile terminal by communicating with the server or the mobile terminal. The vehicular device determines the validity of the mobile terminal using the specified one-time authentication key.

According to the above method, the security can be further strengthened by the same operation as the digital key system for vehicles.

The vehicular device of the present disclosure is a vehicular device mounted on and used in the vehicle and configured to communicate with each of a mobile terminal which is an information processing terminal carried by a user who is an authority to use the vehicle and a server that generates a service key unique to each mobile terminal as key information for using the vehicle. The vehicular device includes a vehicle side memory that stores the service key for each user and a vehicle control unit having at least one processor. The vehicle control unit is configured to generate a one-time authentication key as a disposable authentication key based on a service key stored in the vehicle side memory, and determine the validity of the mobile terminal using the one-time authentication key.

According to the above vehicular device, since the mobile terminal (and thus the user) is authenticated using the one-time authentication key generated based on the service key unique to each mobile terminal, it is possible to increase the security compared to a configuration that authentication of the mobile terminal is performed using fixed key information.

The mobile terminal of the present disclosure is a portable terminal as an information processing terminal carried by a user and configured to communicate with each of a vehicular device mounted on and used in a vehicle and a server that generates a service key as key information for using the vehicle. The mobile terminal includes: a terminal-side memory that stores a data of the service key data; a short-range communication unit for carrying out short-range wireless communication, which is a wireless communication conforming to a predetermined short-range wireless communication standard with the vehicular device; a network connection unit for communicating with a server via the Internet; and a terminal control unit having at least one processor. Under a condition that a connection to the Internet is established, the terminal control unit: transmits an authentication key request signal for requesting the server to deliver a plurality of one-time authentication keys with an expiration date generated based on the service key at once; receives the one-time authentication key; stores it in the terminal side memory; and replace a part of or all of the one-time authentication key stored in the terminal side memory based on the expiration date of each one-time authentication key.

According to the above mobile terminal, the security can be further strengthened by the same operation as the digital key system for vehicles.

Hereinafter, the vehicular digital key system Sys of the present disclosure will be described with reference to the drawings. The vehicle digital key system Sys enables the user to access the vehicle Hv without having the dedicated key 2 by distributing the service key, which is an electronic key for using the vehicle Hv, to the mobile terminal 1. As shown in FIG. 1, the vehicle digital key system Sys includes a mobile terminal 1, a dedicated key 2, a digital key server (DKS: Digital Key Server) 3, and an in-vehicle system 7 mounted on the vehicle Hv. The in-vehicle system 7 includes an authentication ECU 4. ECU is an abbreviation for Electronic Control Unit and refers to an electronic control unit.

Introduction

The vehicle Hv in the following description is, for example, a vehicle owned by an individual. Here, the vehicle Hv may be a company vehicle owned by a company organization or a public vehicle owned by a public institution. In addition, the vehicle Hv may be a vehicle provided for a vehicle rental service (so-called rental vehicle) or a vehicle provided for a car-sharing service (so-called shared vehicle). The vehicle Hv may be a vehicle provided for a passenger transportation service such as a robot taxi.

The vehicle Hv is, for example, an combustion engine vehicle. Alternatively, the vehicle Hv may be a hybrid vehicle or a electric vehicle. The combustion engine vehicle here refers to a vehicle having only a combustion engine as a power source, and a hybrid vehicle refers to a vehicle having a combustion engine and a motor as a power source. An electric vehicle refers to a vehicle that has only a motor as a drive source. The traveling power source in the present disclosure is a power source for traveling the vehicle Hv, and refers to an ignition power source when the vehicle is a combustion engine vehicle. When the vehicle Hv is an electric vehicle or a hybrid vehicle, the system main relay corresponds to a traveling power source. The present device may not be limited to four-wheeled vehicles, alternatively, the present device may be mounted on various vehicles that can travel on the road, such as trailers, two-wheeled vehicles, and three-wheeled vehicles. Motorized bicycles may also be included in two-wheeled vehicles.

In the following, the digital key system for vehicles Sys will be described mainly for one vehicle Hv, alternatively, there may be a plurality of vehicles managed by the DKS 3. Further, there may be a plurality of vehicle Hvs held by one owner.

The user of the present disclosure refers to a user of a service provided by the vehicular digital key system Sys. A person who has created an account for using the service provided by the vehicular digital key system Sys, in other words, the owner of the mobile terminal 1 on which the digital key application 104 described later is installed corresponds to the user.

The various sequence diagrams and flowcharts of the present disclosure are all examples. The number of steps, processing order, execution conditions, and the like provided in each sequence diagram and/or flowchart can be changed as appropriate.

Outline of the Overview Feature

The mobile terminal 1 is a general-purpose information processing terminal that can be possessed/carried by each of a plurality of users. The mobile terminal 1a shown in FIG. 1 shows the mobile terminal 1 possessed by the owner of the vehicle Hv. The mobile terminal 1b is, for example, a mobile terminal 1 owned by the owner's family, and the mobile terminal 1c is a mobile terminal 1 owned by the owner's friend. A device ID, which is unique identification information, is assigned to the mobile terminal 1.

As the device ID, for example, a device address, a UUID (Universally Unique Identifier), or the like can be adopted. The device address in Bluetooth (registered trademark) can be represented by 48 bits. Also, the UUID can be represented by 128 bits. The device address may be a fixed public address or a random address. The public address corresponds to the MAC (Media Access Control) address in Ethernet (registered trademark). In addition, the device ID may be a random number determined at the time of installation of the digital key application 104 described later.

The mobile terminal 1 is configured to be capable of data communication with the DKS 3 via the wireless base station 8 and the wide area communication network 9. The radio base station 8 shown in FIG. 1 may be, for example, a base station for cellular communication or an access point for Wi-Fi (registered trademark). An access point is a communication facility that forms a wireless LAN (Local Area Network). In addition to routers, the concept of access points can include roadside elements. The wide area communication network 9 is, for example, the Internet. For the equipment forming the wide area communication network 9, the mobile terminal 1 corresponds to a user device (UE: User Equipment).

Cellular communication refers to wireless communication that conforms to standards such as 4G and 5G. As the Wi-Fi standard, various standards such as IEEE802.11n, IEEE802.11ac, and IEEE802.11ax (so-called Wi-Fi6) can be adopted. In this disclosure, wireless communication conforming to the Wi-Fi standard is also referred to as Wi-Fi communication. The communication between the mobile terminal 1 and the DKS 3 is carried out by encrypted cellular communication or Wi-Fi communication.

The DSK 3 is a server located outside the vehicle Hv. The DKS 3 is configured to be connectable to the wide area communication network 9. The DKS 3 can communicate with the mobile terminal 1 via the wide area communication network 9. Based on the request from the mobile terminal 1, the DKS 3 issues a service key for using the vehicle Hv to a predetermined user.

Further, the in-vehicle system 7 and the mobile terminal 1 are configured to enable short-range wireless communication. The short-range wireless communication here refers to communication conforming to a predetermined short-range wireless communication standard in which a practical communicable distance is, for example, 5 m to 30 m, and a maximum of about 100 m. As a standard for short-range wireless communication, for example, BLE (Bluetooth Low Energy), Bluetooth Classic, Wi-Fi (registered trademark), ZigBee (registered trademark) and the like can be adopted. UWB-IR (Ultra Wide Band-Impulse Radio) can also be adopted as a short-range wireless communication method. In the present embodiment, as an example, the operation of each part of the in-vehicle system 7 and the mobile terminal 1 will be described by taking as an example a case where the in-vehicle system 7 and the mobile terminal 1 are configured to enable BLE communication, which is wireless communication conforming to the BLE standard. The description of BLE communication in the following can be carried out in place of short-range wireless communication. The details of the communication method related to the communication connection and the encrypted communication are carried out by the sequence defined by the BLE standard.

In the following, a case where the in-vehicle system 7 is set to function as a master in communication with the mobile terminal 1 will be described. The mobile terminal 1 functions as a slave. A slave in BLE communication is a device that intermittently transmits an advertisement signal and transmits/receives data based on a request from a master. The slave is also called a peripheral element. The master controls the communication connection status and communication timing with the slave. The master is also known as a central element. As another aspect, the mobile terminal 1 may be set to operate as a master in communication with the in-vehicle system 7.

The in-vehicle system 7 includes a BLE communication unit 57 for performing BLE communication and an authentication ECU 4. The authentication ECU 4 is one of the ECUs constituting the in-vehicle system 7. The authentication ECU 4 corresponds to a vehicular device. The authentication ECU 4 automatically performs an authentication process by wireless communication with the mobile terminal 1 having the service key. Then, on condition that the authentication is successful, a passive entry passive start function that performs vehicle control according to the position of the user with respect to the vehicle Hv is provided. The vehicle control here includes locking/unlocking the door, turning on/off the power, starting the engine, and the like. Since the mobile terminal 1 corresponds to the user, authenticating the mobile terminal 1 corresponds to authenticating the user.

Explanation of Service Key

The service key is different for each mobile terminal 1. For example, the service key is a code that is determined according to the device ID and is different for each mobile terminal 1. The service key can be a list of alphanumeric characters having a predetermined number of characters. For example, the DKS 3 adopts an output value obtained by inputting a value obtained by adding a random number having a predetermined length to a device ID into a predetermined hash function as a service key. As the hash function, various functions such as FNV132, FNV164, MD-5, SHA-1, SHA-256, and SHA-512 can be adopted. The function used to generate the service key can be appropriately selected according to the number of bits (i.e., an output length) required as the service key.

The service key can be represented by a bit string having a length of 8 bits or more. The longer the service key, the stronger the security and the more suitable it is. The service key can be represented by, for example, 16 bytes, 24 bytes, 27 bytes, and the like. Here, as an example, it is assumed that the service key is defined by 24 bytes. According to the configuration in which the service key is defined by 27 bytes or less, the service key can be accommodated in one BLE encrypted communication packet.

The service key may preferably have a different value for each combination of the vehicle Hv and the mobile terminal 1. For example, the output value of a predetermined hash function whose input value is a combination of the vehicle ID and the device ID may be used as the service key. The vehicle ID is a unique identification number assigned to each vehicle. As the vehicle ID, for example, a vehicle identification number (VIN) or the like can be adopted.

Further, the service key may be an output value obtained by inputting data, obtained by connecting the vehicle ID and the device ID with the values corresponding to the epoch seconds for which the issuance request is received, into a predetermined hash function. Also, it is not always necessary to use a hash function to generate the service key. The service key may be a value obtained by multiplying, adding, or concatenating the device ID with the vehicle ID. In addition, a password set by the user can be used as the element about the service key. For example, the service key may be a value obtained by putting a password of a predetermined number of characters registered by the user into a predetermined hash function.

There are multiple types of service keys. There are two main types of service keys, which are owner keys and guest keys. The owner key is a service key issued to the owner of the vehicle Hv, and has almost all authority regarding the use of the vehicle Hv. The owner key has all the authority to use the vehicle Hv, such as turning on/off the driving power, locking/unlocking the door, and remote control, and also has the authority to issue a service key for other users. The owner key is basically an indefinite service key with no expiration date.

The guest key is a service key for the guest and is basically issued by the owner. The guest here refers to a user other than the owner. The guest key is a service key with more restricted authority than the owner key, and the expiration date is also set.

More specifically, the guest key is classified into a guest key with an issue right that has the authority to issue another guest key and a guest key without an issue right that does not have the authority to issue other guest keys. As an example of a use case, a guest key with issuance right can be issued to the owner's family at the request of the owner. In addition, guest keys without issuance rights can be issued to the owner's friends/acquaintances.

Hereinafter, the mobile terminal 1 possessed by the owner, in other words, the mobile terminal 1 in which the owner key is stored will be referred to as an owner terminal. A mobile terminal 1 possessed by a guest, in other words, a mobile terminal 1 in which a guest key is stored is referred to as a guest terminal. Further, among the guest terminals, the mobile terminal 1 to which the guest key with the issuance right is given is referred to as the guest terminal with the issuance right, and the mobile terminal 1 to which the guest key without the issuance right is given is referred to as the guest terminal without the issuance right. In the example shown in FIG. 1, the mobile terminal 1*a* corresponds to the owner terminal, and the mobile terminal 1b corresponds to the guest terminal with the issuance right. Further, the mobile terminal 1c corresponds to a guest terminal without an issuance right.

When the owner terminal is the parent, the mobile terminal 1 having the guest key issued by the owner terminal corresponds to a child for the owner terminal. Further, the mobile terminal 1 having the guest key issued by the terminal with the issuance right corresponds to the grandchild of the owner terminal. The authority of each guest key is determined by the issue source. Guest key permissions are set smaller (or narrower) than the issue source. Alternatively, in another feature of the vehicular digital key system Sys, the guest key having the same authority as the issue source may be issued. The DKS 3 newly issues a guest key based on a request from the owner terminal or the guest terminal with the issuance right. The type and permission settings of the newly issued service key are specified by the issue source. For example, when the DKS 3 newly issues a guest key based on a request from the owner terminal, the DKS 3 determines based on the signal received from the owner terminal whether the guest key is a guest key with an issue right or a guest key without an issue right. The guest key with issuance right may be restricted so that only the guest key without issuance right can be issued.

About the Configuration and Functions of Mobile Terminals

Figure 2:
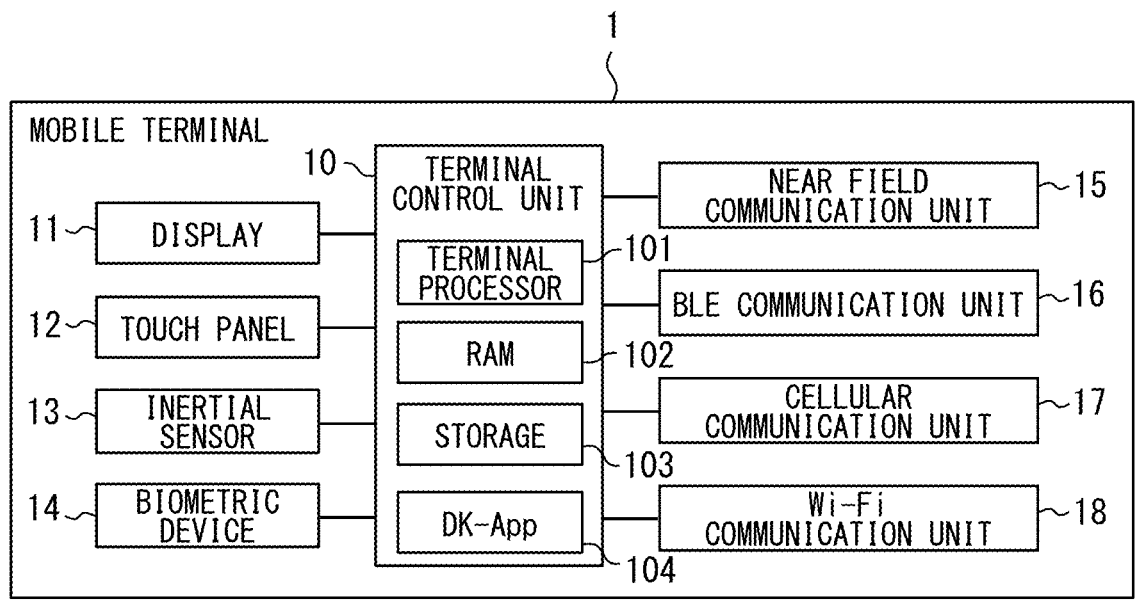
FIG. 2 is a block diagram showing a configuration of a mobile terminal.

Here, first, the configuration/function provided in the mobile terminal 1 will be described with reference to FIG. 2. As the mobile terminal 1, for example, a smartphone, a tablet terminal, a wearable device, or the like can be adopted. The wearable device is a device that is worn and used on the user's body, and can be of various shapes such as a wristband type, a wristwatch type, a ring type, a glasses type, and an earphone type.

The mobile terminal 1 includes a terminal control unit 10, a display 11, a touch panel 12, an inertial sensor 13, a biometric authentication device 14, a near field communication unit 15, a BLE communication unit 16, a cellular communication unit 17, and a Wi-Fi communication unit 18.

The terminal control unit 10 is a module that controls the operation of the entire mobile terminal 1. The terminal control unit 10 is configured as a computer including, for example, a terminal processor 101, a RAM (Random Access Memory) 102, a storage 103, and the like. The terminal processor 101 is hardware (in other words, an arithmetic core) for arithmetic processing combined with the RAM 102. The terminal processor 101 is, for example, a CPU (Central Processing Unit). Since the terminal processor 101 is a processor used by the device used by the user, it can be called a user processor or a UE processor. The terminal processor 101 accesses the RAM 102 to execute various processes for realizing the functions of the respective functional units. The RAM 102 is a volatile storage medium. The storage 103 is configured to include a non-volatile storage medium such as a flash memory.

The digital key application 104 is application software for securely performing user authentication, acquisition/storage of a service key, communication with the in-vehicle system 7, and the like. The digital key application 104 is installed in, for example, a storage 103.

The terminal control unit 10 can communicate with each of the display 11, the touch panel 12, the inertial sensor 13, the biometric authentication device 14, the near field communication unit 15, the BLE communication unit 16, the cellular communication unit 17, and the Wi-Fi communication unit 18. The functions provided by the terminal control unit 10 will be described later.

The display 11 is, for example, a liquid crystal display or an organic EL display. The display 11 displays an image corresponding to the input signal from the terminal control unit 10. The touch panel 12 is a capacitance type touch panel, and is stacked on the display 11. The touch panel 12 and the display 11 correspond to an interface for a user to register key information in the mobile terminal 1 or to execute pairing the mobile terminal 1 with the in-vehicle system 7. The touch panel 12 is an input device. The signal output by the touch panel 12 corresponds to the user's operation on the mobile terminal 1. Hereinafter, the output signal of the touch panel 12 will also be referred to as an operation signal.

The inertial sensor 13 is a sensor that detects the inertial force acting on the mobile terminal 1. The acceleration sensor and the gyro sensor correspond to the inertial sensor 13. The output (i.e., the detection data) of the inertial sensor 13 is input to the terminal control unit 10.

The biometric authentication device 14 is a device that authenticates a user by using, for example, a user's fingerprint or a face image. The biometric authentication device 14 may be a device that authenticates a user by using a vein pattern of a hand or a finger or an iris pattern. Further, the biometric authentication device 14 may be a device that authenticates using the characteristics of the spoken voice such as a voiceprint. The user authentication result is provided to the terminal control unit 10.

The near field communication unit 15 is a communication module for carrying out near field communication, which is wireless communication in accordance with NFC (Near Field Communication) standards. Near field communication here refers to communication in which a communicable distance is from several cm to several tens of cm. The near field communication corresponds to a communication method in which the communicable distance is sufficiently smaller than that of BLE communication. A communication method in which the communicable distance is sufficiently small refers to a communication method in which the communication distance is $1/10$ or less. As a specific communication standard for realizing near field communication, various standards such as ISO/IEC 14443 and ISO/IEC 18092 can be adopted. The near field communication may conform to the Type-F standard, or may conform to the Type-A or Type-B standard. The Type-F standard corresponds to the so-called FeliCa (registered trademark). In the mobile terminal 1, the near field communication unit 15 is an arbitrary element and may be omitted.

The BLE communication unit 16 is a communication module for executing the BLE communication. The BLE communication units 16 and 57 correspond to the short-range communication unit. The cellular communication unit 17 is a communication module for carrying out cellular communication. The cellular communication unit 17 is a communication module that is in charge of a data link layer and a physical layer in a wireless communication protocol such as LTE. The cellular communication unit 17 provides the terminal control unit 10 with information indicating the connection status with the wireless base station 8, for example, whether or not it is out of the communication range.

The Wi-Fi communication unit 18 is a communication module configured to enable Wi-Fi communication. The Wi-Fi communication unit 18 is configured to be connectable to the wide area communication network 9 via an access point. The Wi-Fi is a kind of predetermined wireless LAN standard. Therefore, the Wi-Fi communication unit 18 corresponds to an example of a wireless LAN module.

Various communication modules include an antenna capable of transmitting and receiving radio waves in a frequency band as a transmission and reception target, a communication microcomputer which is a microcomputer for controlling communication, a modulation/demodulation circuit, and the like. The mobile terminal 1 may be configured to enable at least one of cellular communication and Wi-Fi communication as a means of communication with the DKS 3. The mobile terminal 1 does not always need to include both the cellular communication unit 17 and the Wi-Fi communication unit 18. When the mobile terminal 1 is connected to the wide area communication network 9 by cellular communication or Wi-Fi communication, that is, in a so-called online state, the terminal control unit 10 performs various data communication with the DKS 3. Data communication can be carried out by, for example, encrypted communication using TLS (Transport Layer Security). The cellular communication unit 17 and the Wi-Fi communication unit 18 correspond to the network connection unit.

Figure 3:
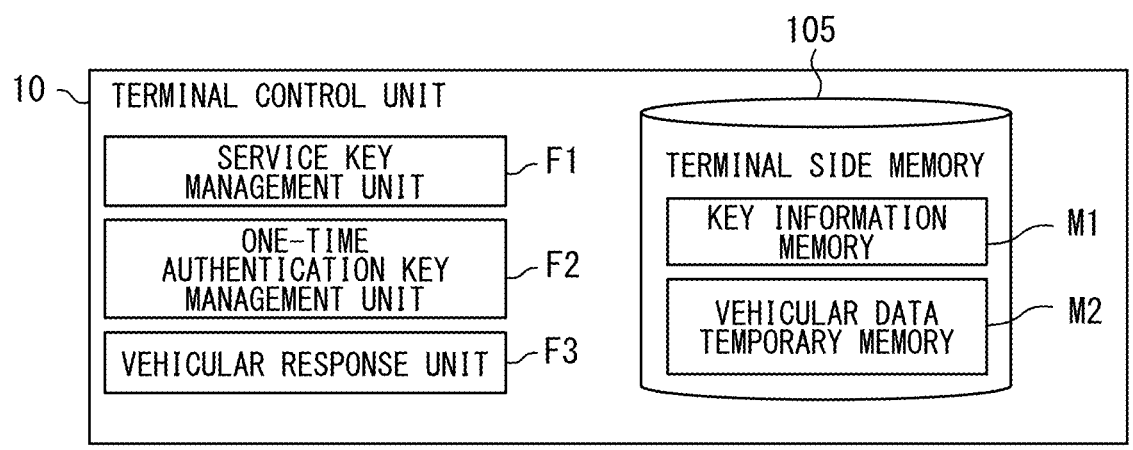
FIG. 3 is a functional block diagram of a terminal control unit.

As shown in FIG. 3, the terminal control unit 10 includes a service key management unit F1, a one-time authentication key management unit F2, and a vehicle response unit F3 as functional units provided by the terminal processor 101 executing the digital key application 104. The various functional units can be active in a state where the digital key application 104 authenticates the user.

User authentication (i.e., login) can be performed by inputting a predetermined user ID and a password to the digital key application 104. User authentication may be performed using the biometric authentication device 14. Since the digital key application 104 is a part of the vehicular digital key system Sys, the state in which the user is logged in to the digital key application 104 corresponds to the state in which the user is logged in to the vehicle digital key system Sys. The login state is canceled when a predetermined expiration date has passed since the login, and the digital key application 104 transitions to a log-off state that requires re-authentication of the user.

Further, the terminal control unit 10 includes a terminal side memory 105. The terminal-side memory 105 is a storage area for storing various data used by the digital key application 104, such as a service key. The terminal-side memory 105 is realized by using the storage area included in the storage 103 or the RAM 102. The terminal-side memory 105 includes a key information memory M1 and a vehicle data temporary memory M2. The key information memory M1 is a storage area for storing a service key, a one-time authentication key described later, a user ID, and the like. The vehicle data temporary memory M2 is a storage area for temporarily storing the data to be transferred to the vehicle Hv received from the DKS 3. The terminal-side memory 105 corresponds to the terminal-side storage device.

The service key management unit F1 manages the service key for the user of the own terminal issued by the DKS 3. The own terminal in the present disclosure refers to a mobile terminal 1 provided by itself as viewed from the terminal control unit 10. The service key management unit F1 requests the issuance of a service key for the own terminal or deletes the service key for the own terminal based on the operation signal input from the touch panel 12. The service key for the own terminal corresponds to the service key for the user of the own terminal.

The service key management unit F1 acquires a service key for its own terminal from the DKS 3 and stores it in the key information memory M1. When the service key is acquired, the service key management unit F1 acquires the key-related information which is additional information together with the service key itself. The key-related information refers to, for example, a service key ID, an expiration date, an authority setting, a type, and the like. These information can be packaged and distributed as a single data set.

The service key ID is a number for identifying the service key. For the service key ID, for example, a unique value is set for each user. The service key ID may be a random number generated when the account is created. Even if the owner changes the model of the mobile terminal 1 and the value of the service key is changed, the service key ID associated with the owner is not changed. The service key ID may be set to a unique value according to the combination of the vehicle ID and the user ID.

The expiration date data indicates a predetermined value indicating indefinite period or a period/date specified by the issue source. The authority setting data indicates the function (that is, the permission) permitted to the user of the own terminal. The authority setting data indicates, for example, whether or not each door can be locked and unlocked, and whether or not the travelling power can be turned on/off. The service key type indicates whether it is an owner key or a guest key. The type information may be integrated with the authority setting data.

In addition to acquiring the service key for the own terminal, the service key management unit F1 executes a process for displaying a status confirmation screen regarding the service key for the own terminal and a process for deleting the service key for the own terminal. The status confirmation screen is a screen image showing the status of the service key for the own terminal. The service key status includes expiration date, authority setting, valid/invalid status, and so on. The status confirmation screen may include information regarding the name of the user corresponding to the issue source.

The function provided by the service key management unit F1 may differ depending on the type of service key assigned to the own terminal, in other words, the authority setting of the service key. For example, the service key management unit F1 of the owner terminal is configured to be able to execute a process for issuing a guest key for a guest specified by the user and a process for deleting/temporarily invalidating the guest key. Only the owner terminal is configured so that it is possible to specify whether or not there is an authority to issue a guest key as a kind of authority setting when issuing a guest key. Further, the service key management unit F1 of the owner terminal displays a list of guests holding the service keys related to the vehicle Hv and a screen showing the status of each guest key. The owner terminal can acquire and display the guest key information from, for example, the DKS 3. Further, the service key management unit F1 of the owner terminal is configured to be able to carry out a process of registering information about the owner key in the vehicle Hv using a predetermined data set acquired from the DKS 3.

Further, the service key management unit F1 included in the terminal with the issue right is configured to be able to execute a process of newly issuing a guest key without the issue right to the guest specified by the user. Further, the service key management unit F1 provided in the terminal with the issue right is configured to be able to confirm the status of the guest key issued by itself and delete/invalidate the guest key. The service key management unit F1 of the terminal without the issue right is configured to be able to check the status and delete/invalidate the service key for the own terminal. Alternatively, the service key management unit F1 of the guest terminal can execute the check of the expiration date of the service key for the own terminal, based on the expiration date data. Here, the check of the expiration date for the guest key may be performed by the DKS 3.

The one-time authentication key management unit F2 acquires the one-time authentication key used for the authentication process with the vehicle Hv from the DKS 3 and stores it in the key information memory M1. The one-time authentication key management unit F2 itself does not have a function of generating a one-time authentication key. According to this configuration, the details of the one-time authentication key generation method can be concealed. As a result, the security performance of the vehicle digital key system Sys can be improved.

The one-time authentication key is a code obtained by combining a service key with a variable code (i.e., variable factor). The variable code is a different value for each issue. The variable code can be, for example, an epoch second, a count value of the number of issuances, or a random number. Further, the variable code may be a value obtained by subtracting the number of times the authentication key is issued from a predetermined initial value. Assuming that the one-time authentication key is defined as Ka, the service key is defined as SK, the variable code is defined as Cd, and the one-time authentication key generation function is defined as G, the one-time authentication key can be represented by Ka=G (SK, Cd). In this case, the generation function G is a function that takes two inputs, which are a service key and a variable code. The generation function G may be a function that takes one input value, and in that case, a one-time authentication key can be generated by, for example, Ka=G (SK+Cd). Here, SK+Cd may be a code in which a service key and a variable code are connected (that is, concatenated), or a value obtained by adding a sequence of numbers corresponding to them in view of the concept of a binary number or a hexadecimal number.

When the first factor for generating the one-time authentication key is the service key, the variable code can be defined as the second factor for generating the one-time authentication key. The variable code is one of the authentication key generation factors. Further, the one-time authentication key may be generated by using a predetermined third factor in addition to the service key and the variable code. For example, the one-time authentication key may be generated by inputting a bit string formed by combining a count value indicating the number of issuances, an ECU number, and a service key in a predetermined order into a predetermined mathematical function. A one-time authentication key is a so-called disposable authentication key that is destroyed once it is used. The third factor may be preferably information registered in advance in the authentication ECU 4.

The One-Time Authentication Key Management Unit F2 transmits a signal for requesting the DKS 3 to distribute the one-time authentication key so that the key information memory M1 maintains a state in which a predetermined number or more of the one-time authentication keys are stored. For example, the one-time authentication key management unit F2 sets the replenishment necessity flag in an on state based on the fact that the remaining number (i.e., Notk) of the one-time authentication key stored in the key information memory M1 is less than a predetermined replenishment threshold (ThRp). The one-time authentication key management unit F2 acquires a plurality of one-time authentication keys by communicating with the DKS 3 based on the fact that the replenishment necessity flag is set to the on state and the online state is available. The replenishment threshold can be, for example, 150 or 300. The replenishment necessity flag is an arbitrary element and may be omitted. The replenishment threshold ThRp may be 200, 400, or 500.

The one-time authentication key has an expiration date starting from the issue date as the starting date. The expiration date can be set to, for example, 1 month, 3 months, or 6 months. The expiration date of the one-time authentication key is also set by the DKS 3. The DKS 3 may be configured so that the length of the expiration date for the one-time authentication key can be changed based on the instruction operation of the owner. When the vehicle Hv is a rental car, the expiration date of the one-time authentication key can be set to correspond to the rental period. The technical idea can be similarly applied to the setting of the expiration date of the guest key.

The one-time authentication key management unit F2 checks the expiration date of the one-time authentication key stored in the key information memory M1 at a predetermined timing, and deletes the expired one-time authentication key. The check of the expiration date of the one-time authentication key may be performed by the DKS 3. When the remaining number of one-time authentication keys is less than the replenishment threshold as a result of deleting the expired one-time authentication key, a process for acquiring the one-time authentication key from the DKS 3, such as by setting the replenishment necessity flag to be the on state, is performed.

The vehicle response unit F3 is configured to execute data communication by the authentication ECU 4 and the BLE based on the establishment of the link (connection) between the authentication ECU 4 and the BLE communication. For example, the vehicle response unit F3 carries out wireless communication for user authentication based on the establishment of the BLE communication link with the authentication ECU 4. The authentication process between the in-vehicle system and the user can be performed by, for example, a challenge-response method. In that case, the vehicle response unit F3 generates a response code using the one-time authentication key for the challenge code transmitted from the authentication ECU 4 and returns it to the authentication ECU 4.

Further, the vehicle response unit F3 performs a process of relaying the communication between the authentication ECU 4 and the DKS 3 based on the request from the authentication ECU 4. For example, the vehicle response unit F3 converts the clock time request signal received from the authentication ECU 4 by BLE communication into a cellular communication format and transmits it to the DKS 3. Further, the data for the authentication ECU 4 received from the DKS 3 such as, for example, the server time information, is converted into the BLE communication format and transferred to the authentication ECU 4.

In addition, the mobile terminal 1 may be configured to be able to execute an authentication process with the in-vehicle system 7 by near-field communication. The mobile terminal 1 may be configured to perform pairing related to BLE communication with the in-vehicle system 7 by near field communication. Further, the terminal control unit 10 may be configured to be able to display a vehicle state confirmation screen, which is a screen for confirming the status of the vehicle Hv, as a function of the digital key application 104. The vehicle status confirmation screen is a screen showing the remaining amount of gasoline/battery, the open/closed state of each window and each door, the locked state, the temperature inside the vehicle, and the like. Further, the terminal control unit 10 may be configured so that a part of the electrical equipment provided in the vehicle Hv can be remotely controlled. For example, the air conditioner may be turned on/off, windows may be opened/closed, hazard lamps may be turned on/off, and the like, and these operations may be remotely controlled. The vehicle status confirmation and the contents of remote control may be changed according to the authority of the service key.

Regarding the Configuration and Function of the Dedicated Key

Here, the configuration and function of the dedicated key 2 will be described with reference to FIG. 4. The dedicated key 2 is a dedicated electronic key for operating the vehicle Hv. The dedicated key 2 is provided to the owner together with the vehicle Hv as a proof of being the owner of the vehicle Hv or as a master key having an entity at the time of purchasing the vehicle Hv. The dedicated key 2 is basically possessed by the owner. The dedicated key 2 can be understood as one of the accessories of the vehicle Hv. The dedicated key 2 can adopt various shapes such as a flat rectangular parallelepiped type, a flat elliptical body type (so-called fob type), and a card type. The dedicated key 2 may be referred to a vehicle portable device, a key fob, a key card, a card key, an access key, or the like.

A dedicated key code, which is a predetermined code for certifying that the key is the vehicle Hv key, is registered in the dedicated key 2. The dedicated key code is also registered in the authentication ECU 4. The dedicated key 2 is configured to be able to prove that the person who is trying to access the vehicle Hv is the owner by communicating with the authentication ECU 4 in a predetermined procedure. The dedicated key 2 is an arbitrary element and may be omitted.

Figure 4:
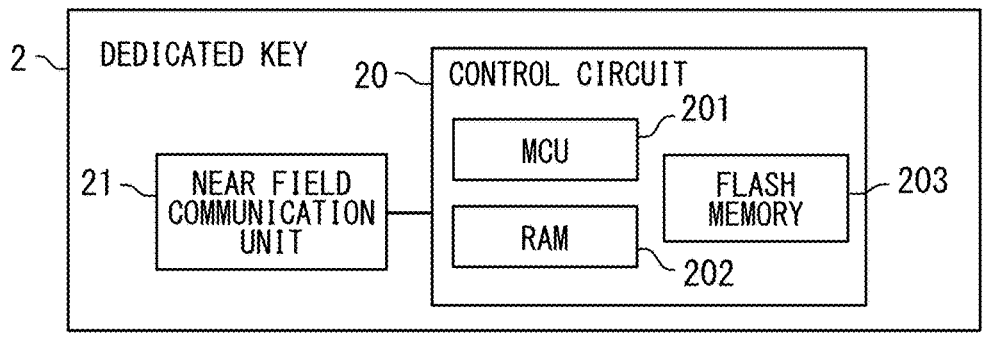
FIG. 4 is a block diagram showing a configuration of a dedicated key.

As shown in FIG. 4, the dedicated key 2 includes a control circuit 20 and a near field communication unit 21. The control circuit 20 is a circuit that controls the operation of the dedicated key 2. The control circuit 20 is realized by using an MCU (Micro Controller Unit) 201, a RAM 202, a flash memory 203, and the like. The control circuit 20 may be realized by using an MPU (Micro-Processing Unit) or an FPGA (Field-Programmable Gate Array) instead of the MCU. The above-mentioned dedicated key code is stored in the flash memory 203.

The near field communication unit 21 is a communication module for carrying out near field communication. The dedicated key 2 is configured as, for example, a passive type wireless tag that functions by converting radio waves from the near field communication unit 56 included in the vehicle Hv into electric power. When the near field communication unit 21 is connected by communication with the near field communication unit 56 included in the vehicle Hv, the control circuit 20 returns the response code which is generated based on the dedicated key code itself or the dedicated key code in response to the request from the authentication ECU 4. The authentication ECU 4 can transition to a state in which owner registration is possible based on the success of the authentication process using the dedicated key code. In this way, the dedicated key 2 can function as a device for switching the authentication ECU 4 to a state in which owner information can be registered.

About the Configuration and Function of DKS

Figure 5:
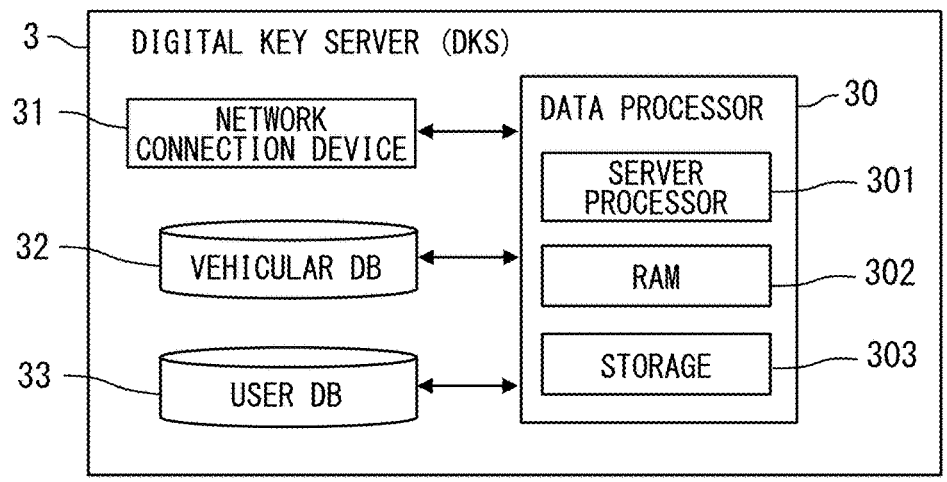
FIG. 5 is a block diagram showing a configuration of a digital key server.

Here, the configuration and function of DSK 3 will be described. As shown in FIG. 5, the DKS 3 includes a data processing unit 30, a network connection device 31, a vehicle DB 32, and a user DB 33. Here, DB in the member name is an abbreviation for Database.

The data processing unit 30 is configured to execute various processes based on signals/data input from the network connection device 31. The data processing unit 30 is connected to each of the network connection device 31, the vehicle DB 32, and the user DB 33 so as to be able to communicate with each other. The data processing unit 30 is configured by using the server processor 301, the RAM 302, and the storage 303. The server processor 301 is an arithmetic core that executes various arithmetic processes, and is realized by using, for example, a CPU or a GPU. A predetermined digital key management program is stored in the storage 303. When the server processor 301 executes the digital key management program, various functional units described later are realized. The execution of the digital key management program by the server processor 301 corresponds to the execution of the vehicle digital key management method, which is a method corresponding to the program.

The network connection device 31 is a communication module for connecting to the wide area communication network 9. The network connection device 31 is configured to be capable of intercommunication with communication equipment constituting the wide area communication network 9 using, for example, an optical fiber. As a result, when the mobile terminal 1 is in the online state, the DKS 3 can perform data communication with the mobile terminal 1.

Figure 6:
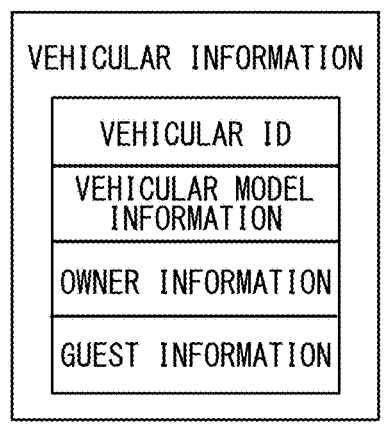
FIG. 6 is a diagram showing an example of types of data stored in a vehicle database.

The vehicle DB 32 is a database in which information about a vehicle managed by the vehicle digital key system Sys is registered. As shown in FIG. 6, the vehicle ID of each vehicle is stored in the vehicle DB 32 in association with the vehicle model information, the owner information, and the guest information. The vehicle model information includes information related to the vehicle type, model year, grade, OS (Operating System), and the like of the target vehicle.

The vehicle model information may include the software version used in the authentication ECU 4, the ECU number, and the like. The ECU number here is a number for distinguishing the authentication ECU 4 used in each of the plurality of vehicles, and is a number different for each authentication ECU 4. As the ECU number, the serial number of the certified ECU 4 or the like can be adopted. By using the ECU number, the DKS 3 can execute data distribution or the like targeting a specific authentication ECU 4 even if the authentication ECU 4 of the same model is mounted on a plurality of vehicle Hvs.

The owner information is information about the owner of the vehicle Hv, and includes, for example, a user ID, a telephone number as contact details, an e-mail address, a device ID, and the like. The guest information is information about a user (that is, a guest) to whom the service key related to the vehicle Hv is distributed. For example, a user ID for each guest is registered in the vehicle DB 32 as guest information about the vehicle Hv. The vehicle DB 32 may not always have to include guest information.

Figure 7:
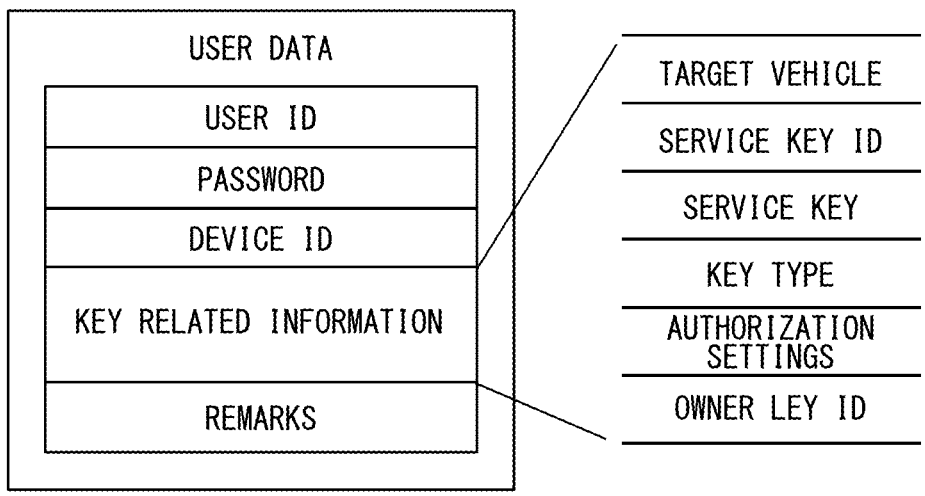
FIG. 7 is a diagram showing an example of types of data stored in a user database.

The user DB 33 is a database in which information about the user is registered. As shown in FIG. 7, user ID, password, device ID, key-related information, remarks information, and the like are stored in the user DB 33 as user data for each user. The user ID and the password are a data set for authenticating the user. The user ID and the password are registered by the user, for example, when the account is created. An account for using the service can be created via a dedicated web page or digital key application 104. The device ID of the mobile terminal 1 possessed by the user can be registered, for example, by the DKS 3 communicating with the digital key application 104.

The key-related information includes, for example, target vehicle information, a service key ID, a service key, a key attribute, an authority setting, and an owner key ID. The target vehicle information indicates the ID of the vehicle that can be used by the user. When the service key information for each vehicle is managed by the vehicle DB 32, the user DB 33 may not always have to include the target vehicle information as the key-related information. The key type indicates, for example, whether it is an owner key or a guest key. The key type can also be understood as information indicating the user's attribute (owner/guest) with respect to the target vehicle. As described above, the authority setting indicates the door that can be locked and unlocked, and whether or not the driving power is permitted to be turned on/off. The owner key ID indicates the service key ID of the owner of the target vehicle. The owner key ID corresponds to the owner key number. The owner key ID field in the owner's user data may be blank, or the owner's own service key ID may be registered therein.

In the remarks column, age, proficiency level of driving skill, and the like can be registered. The proficiency level of driving skill may be indicated by a numerical value such as a score or a ranking, or by a feature whether or not the driver is a beginner. Alternatively, the proficiency level of driving skill may be indicated by a total driving distance, a total driving period, or a feature whether or not it is within one year after obtaining a driver's license, and the like. In addition, the history of the accident may be registered in the remarks column. These remarks information can be used as a calculation material for usage fees and insurance fees when applied to car sharing services and the like.

Both the vehicle DB 32 and the user DB 33 are realized by using a rewritable non-volatile storage medium. Further, both the vehicle DB 32 and the user DB 33 are configured so that data can be written, read, deleted, and the like by the server processor 301. The vehicle DB 32 and the user DB 33 may be integrated. The above-mentioned database configuration is an example. The vehicle DB 32 and the user DB 33 may not have to hold all the above-mentioned items. Further, the vehicle DB 32 may be provided by another server. In the first place, the DKS 3 of the present disclosure may be divided into a plurality of servers and implemented. The division of roles/function arrangement for each server can be changed as appropriate.

Figure 8:
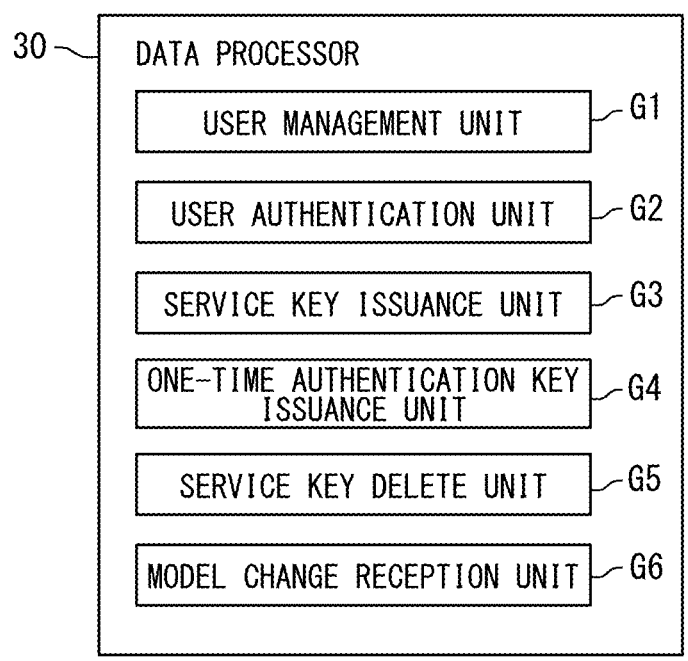
FIG. 8 is a functional block diagram of a data processing unit.

As shown in FIG. 8, the data processing unit 30 includes a user management unit G1, a user authentication unit G2, a service key issue unit G3, a one-time authentication key issue unit G4, a service key deleting unit G5, and a model change reception unit G6.

The user management unit G1 has a configuration for managing user information. For example, the user management unit G1 performs new registration, deletion, and change of registration contents of the user based on the data input from the network connection device 31. New registration/deletion of a user corresponds to issuance/deletion of an account. User operations/instructions related to new registration, deletion, and change of registered contents are acquired, for example, via the mobile terminal 1 and the network connection device 31.

In the following, the signals corresponding to the user's operations/instructions to the vehicle digital key system Sys, such as account creation/deletion, registration content change, service key issuance/deletion/invalidation, and the like will be simply referred to as operation signals. Here, the interface that directly accepts the user's operation may not be limited to the mobile terminal 1. The DKS 3 can acquire the above operation signal via a computer arranged in an office or a home. That is, the DKS 3 is configured so that the user's operation signal can be acquired via the digital key application 104 or a dedicated web page.

The user authentication unit G2 executes a process of authenticating a user from a combination of a user ID and a password. Based on the fact that the user authentication unit G2 determines that the authentication is successful, the service key issue unit G3, the one-time authentication key issue unit G4, the service key deleting unit G5, the model change receiving unit G6, and the like execute the processes according to the request from the digital key application 104 or the user's operation signal.

The service key issue unit G3 issues a service key based on a user operation on the mobile terminal 1 or the like. Specifically, the service key is issued according to the content of the request based on the service key issuance request signal transmitted from the owner terminal or the guest terminal with the issuance right. The one-time authentication key issue unit G4 issues a one-time authentication key for the request source based on the one-time authentication key issuance request signal transmitted from the mobile terminal 1. The service key deletion unit G5 deletes the designated service key based on the request from the mobile terminal 1. The model change reception unit G6 is configured to accept a model change application and issue a service key according to a new device ID.

Details of the one-time authentication key issue unit G4, the service key deleting unit G5, and the model change receiving unit G6 will be described later.

By providing the above functional units, the data processing unit 30 maintains a correspondence relationship between the owner and the guest for each vehicle managed by the system. There may be multiple guests, while only one user can be the owner for a vehicle. The data processing unit 30 manages the guest information associated with one vehicle and the owner in an integrated manner.

Figure 9:
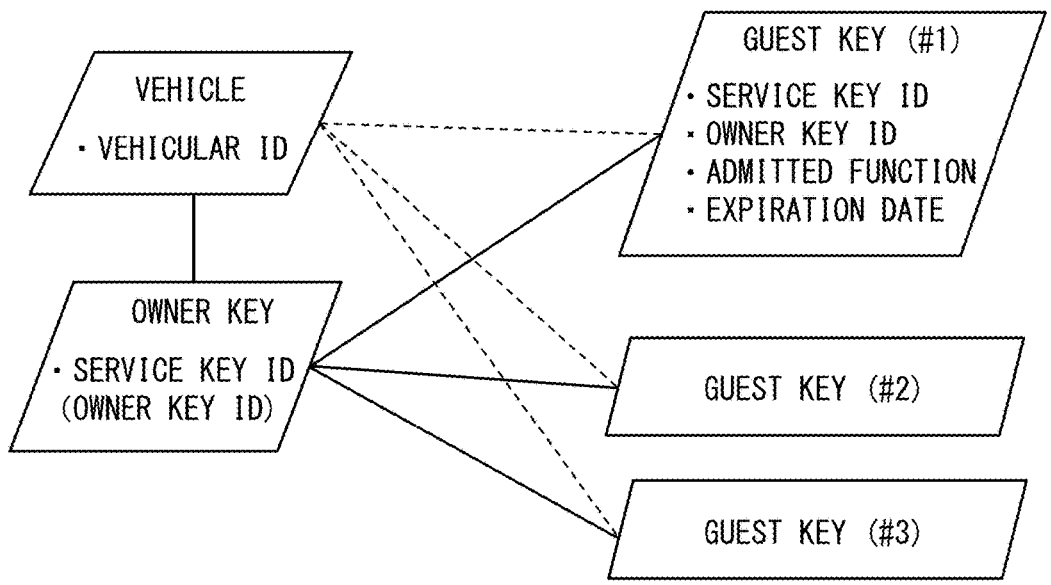
FIG. 9 is a diagram for explaining the relationship between the vehicle, the owner key, and the guest key.

FIG. 9 conceptually shows the correspondence between the owner key and the guest key for one vehicle. The data processing unit 30 manages one vehicle and a plurality of guest keys associated with one owner key based on the service key ID of the owner key, that is, the owner key ID. Note that FIG. 9 shows a case where three guest keys are issued for one vehicle. As mentioned above, each guest key may have different authority settings and expiration dates.

About the Configuration and Functions of the In-Vehicle System 7

Figure 10:
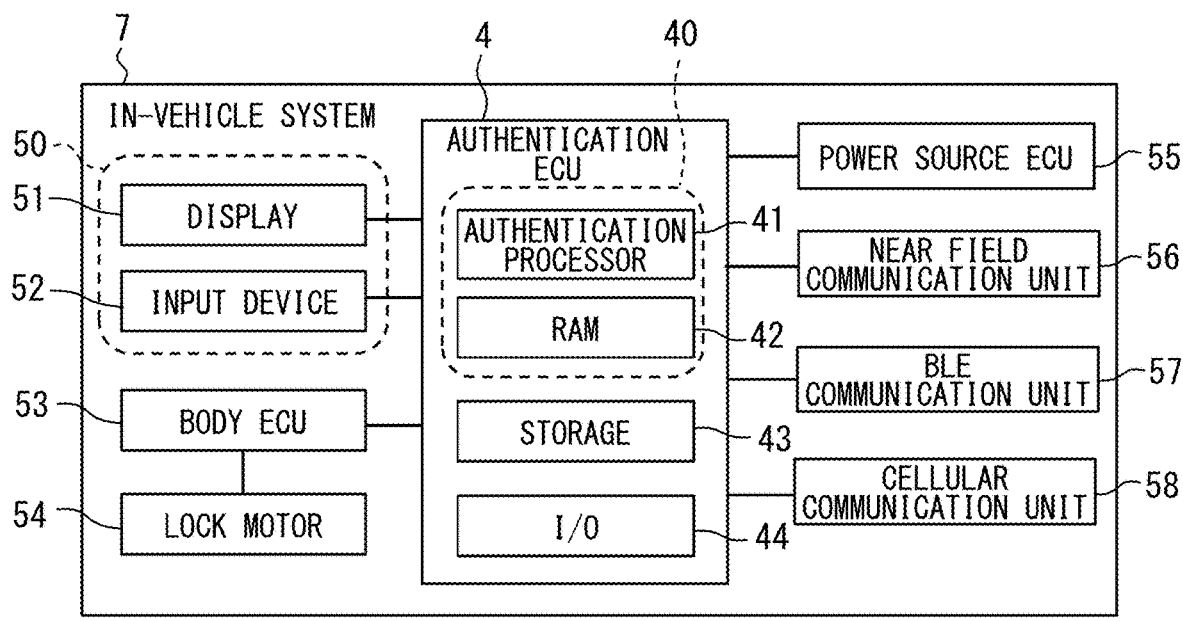
FIG. 10 is a block diagram showing the configuration of an in-vehicle system.

Here, the configuration and functions of the in-vehicle system 7 will be described. As shown in FIG. 10, the in-vehicle system 7 includes an authentication ECU 4, a display 51, an input device 52, a body ECU 53, a lock motor 54, a power supply ECU 55, a proximity field communication unit 56, a BLE communication unit 57, and a cellular communication unit 58.

The authentication ECU 4 mutually communicates and connects with each of the display 51, the input device 52, the body ECU 53, the power supply ECU 55, the near field communication unit 56, the BLE communication unit 57, and the cellular communication unit 58 via the in-vehicle network Nw or by a dedicated signal line. The body ECU 53 is communicably connected to the lock motor 54. The in-vehicle network Nw is a communication network constructed in the vehicle Hv. As the standard of the in-vehicle network Nw, various standards such as Controller Area Network (hereinafter, CAN: registered trademark), Ethernet (registered trademark), FlexRay (registered trademark), and the like can be adopted. A part of the body ECU 53 and the like may be connected to the authentication ECU 4 by a dedicated line without passing through the in-vehicle network Nw. The connection form between the devices can be changed as appropriate.

The authentication ECU 4 is an ECU that executes the authentication process of the mobile terminal 1 in cooperation with the BLE communication unit 57 and the like. Further, the authentication ECU 4 performs predetermined vehicle control, in cooperation with other ECUs, such as unlocking the door and turning on the power for traveling on the condition that the authentication of the mobile terminal 1 is successful. The authentication ECU 4 includes a vehicle control unit 40 as a core module that executes the above processing.

The authentication ECU 4 is implemented by a computer. That is, the authentication ECU 4 includes an authentication processor 41, a RAM 42, a storage 43, an I/O 44, a bus line connecting these configurations, and the like. The authentication processor 41 is, for example, a CPU. The authentication processor 41 accesses the RAM 42 to execute various processes for realizing the functions of the respective functional units. The configuration including the authentication processor 41 and the RAM 42 corresponds to the vehicle control unit 40. The authentication processor 41 can also be referred to a vehicle processor in contrast to the server processor 301. The storage 43 stores a vehicle authentication program, which is a program for authenticating a user (actually, a mobile terminal) who accesses the vehicle Hv. Further, the storage 43 may store the ECU number of the authentication ECU 4. The I/O 44 is a circuit module for communicating with another device. Details of the function of the authentication ECU 4 will be described later.

The display 51 is a device for displaying an image. For example, the display 51 can display an owner registration start screen, a service key deletion screen, or the like based on the input from the authentication ECU 4. The owner registration start screen is an operation screen for starting the registration of the owner key, and may include, for example, a form for inputting the owner password. The service key deletion screen is a screen for deleting the service key data specified by the user from the vehicle side memory 45. The owner key data held by the authentication ECU 4 is also configured to be deleteable via the service key deletion screen. The display 51 is, for example, a center display provided in the central region of the instrument panel in the vehicle width direction. The display 51 may be a so-called meter display arranged in the front area of the driver's seat.

The input device 52 is a device for receiving a user's instruction operation to the in-vehicle system 7, more specifically, the authentication ECU 4. As the input device 52, for example, a touch panel stacked on the display 51 can be adopted. The input device 52 may be a mechanical switch provided on a steering wheel, an instrument panel, or the like. The input device 52 outputs an electric signal, corresponding to the operation performed by the user to the device, to the authentication ECU 4 as an operation signal. The operation signal output by the input device 52 indicates the operation content of the user. The display 51 and the input device 52 correspond to an interface for the user to register/delete the service key/change the operation setting for the authentication ECU 4. The display 51 and the input device 52 are collectively referred to as an in-vehicle HMI 50. HMI is an abbreviation for Human Machine Interface.

The body ECU 53 is an ECU that controls the body actuator based on the request from the authentication ECU 4 and the operation signal of the user. The body ECU 53 is communicatively connected to various body actuators. The body actuator here includes a lock motor 54 that constitutes a lock mechanism for each door.

The power supply ECU 55 is an ECU that controls the on/off state of the traveling power supply mounted on the vehicle Hv. For example, the power supply ECU 55 sets the traveling power supply to be on based on, for example, an instruction signal from the authentication ECU 4. When the vehicle Hv is an engine vehicle, the power supply ECU 55 starts the engine based on the above-mentioned instruction signal.

The near field communication unit 56 is a communication module for carrying out near field communication. The near field communication unit 56 has a function as a reader for receiving data from the dedicated key 2. The near field communication unit 56 accesses the dedicated key 2 within the communication distance by near field communication, and receives information related to owner verification, for example, a dedicated key code or a response code based on the dedicated key code. The near field communication unit 56 can perform near field communication not only with the dedicated key 2 but also with various devices located within the communication range such as the mobile terminal 1.

As the near field communication unit 56, for example, a communication module for the outside of the vehicle and a module for the inside of the vehicle may be provided. The near field communication unit 56 for outside the vehicle corresponds to a configuration for performing authentication for locking/unlocking control. The in-vehicle near field communication unit 56 corresponds to a configuration for performing authentication for on/off control of a traveling power supply. The near communication unit 56 for the outside of the vehicle is arranged near, for example, the outer door handle for the driver's seat. The vicinity of the outer door handle means, for example, within 0.2 m from the outer door handle. The vicinity of the outer door handle also includes the inside of the outer door handle. Further, the near communication unit 56 for the inside of the vehicle is arranged around the driver's seat in the vehicle interior. For example, the near communication unit 56 for the inside of the vehicle is arranged near the start button arranged on the instrument panel. The near field communication unit 56 for the inside of the vehicle may be built in the start button. Further, the near field communication unit 56 may be provided at the center console or the central portion of the instrument panel in the vehicle width direction.

The BLE communication unit 57 is a communication module for executing the BLE communication. The BLE communication unit 57 is arranged, for example, on the center console, the ceiling portion in the vehicle, the upper end portion of the front/rear glass, the C pillar, and the like. The cellular communication unit 58 is a communication module for carrying out cellular communication. The in-vehicle system 7 may include a module for Wi-Fi communication instead of the cellular communication unit 58 or in combination with the cellular communication unit 58.

The authentication ECU 4 executes a process related to user authentication by communicating with the DKS 3 and the mobile terminal 1. More specifically, the communication between the authentication ECU 4 and the mobile terminal 1 can be realized by the cooperation of the BLE communication unit 16 included in the mobile terminal 1 and the BLE communication unit 57 included in the in-vehicle system 7.

Figure 11:
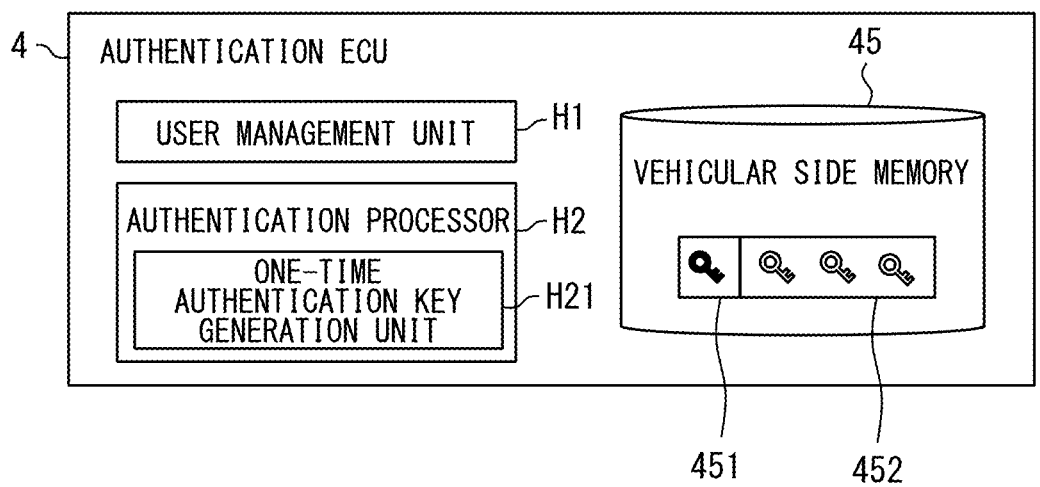
FIG. 11 is a functional block diagram of an authentication ECU.

As shown in FIG. 11, the authentication ECU 4 includes a user management unit H1 and an authentication processing unit H2 as functional units. These functional units are realized, for example, by the authentication processor 41 executing a vehicle authentication program. Further, the authentication ECU 4 includes a vehicle-side memory 45 for storing the owner key and the like. The vehicle-side memory 45 is realized by using the storage area included in the storage 43 or the RAM 42. The vehicle-side memory 45 includes an owner key storage unit 451 and a guest key storage unit 452.

The owner key storage unit 451 is a storage area for storing information related to the owner key. The guest key storage unit 452 is a storage area for storing information related to the guest key. The information about the owner/guest key refers to the service key ID itself, the service key ID, the user ID, the user name, and the like, in addition to the service key itself. Information about guest keys also includes expiration dates and authority settings. The guest key storage unit 452 is configured to be able to store a plurality of guest keys, while the owner key storage unit 451 is configured to be able to store only one owner key. Therefore, registering a new owner key involves deleting the data of the old owner key, which corresponds to an overwrite process. The vehicle-side memory 45 corresponds to the vehicle-side storage unit.

The service key issued by the DKS 3 is activated by being registered in the vehicle side memory 45. That is, the user can use the vehicle Hv within the range of authority assigned to the service key under a condition that the service key for the user is stored in the vehicle side memory 45.

The user management unit H1 is configured to manage a user who can use the vehicle Hv, that is, a service key stored in the vehicle side memory 45. As will be described later, the user management unit H1 acquires data related to the service key issued by the DKS 3 via the mobile terminal 1 by performing BLE communication with the mobile terminal 1 and stores the data in the vehicle side memory 45. Further, the user management unit H1 acquires data for deleting the service key stored in the vehicle side memory 45 via the mobile terminal 1, and deletes the data related to the target service key.

The authentication ECU 4 includes an owner registration enable mode in which the owner key registration can be accepted and an owner registration prohibition mode in which the owner registration is not accepted/rejected as the operation mode. The authentication ECU 4 basically operates in the owner registration prohibition mode. Therefore, the owner registration prohibition mode can be referred to a normal mode. The authentication ECU 4 temporarily shifts from the owner registration prohibition mode to the owner registration enable mode based on the input of the security release code described later.

The authentication processing unit H2 cooperates with the BLE communication unit 57 to perform a process of confirming (in other words, authenticating) that the communication partner is the mobile terminal 1 owned by the user of the vehicle Hv. Communication for authentication is encrypted. The authentication method itself can be implemented using various methods such as a challenge-response method. In this embodiment, as an example, authentication is performed by a challenge-response method using a challenge code and a one-time authentication key. The detailed sequence of the authentication process will be described later. The authentication processing unit H2 includes a one-time authentication key generation unit H21 that dynamically generates a one-time authentication key required for authentication processing as a sub-functional unit. The one-time authentication key generation unit H21 is an arbitrary element and may be omitted.

The timing at which the authentication processing unit H2 executes the authentication processing can be, for example, the timing at which the communication connection between the BLE communication unit 57 and the mobile terminal 1 is established. The authentication processing unit F4 may be configured to execute the authentication process at a predetermined cycle while the BLE communication device 57 and the portable terminal 1 are in communication connection. Further, the encrypted communication for the authentication process may be performed by using a predetermined user operation on the vehicle Hv as a trigger.

As the user operation that triggers the execution of the authentication process, pressing the door button/touching the outside door handle, pressing the start button, opening/closing the door, and the like can be adopted. The door button refers to a button provided on the outside door handle for unlocking/locking the door. Touch to the outside door handle can be detected by a touch sensor provided on the outside door handle. The start button is a button provided in the vehicle interior such as an instrument panel for switching on/off of the driving power supply.

About Owner Key Registration Sequence

Figure 12:
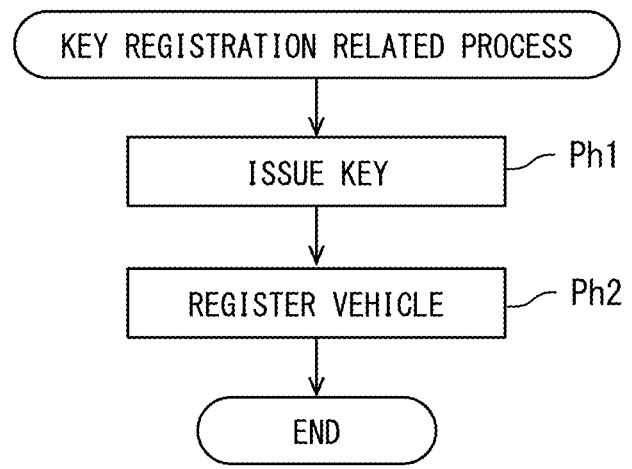
FIG. 12 is a diagram for explaining an overall feature of processing related to issuance and registration of a service key.

Here, an example of the sequence from the issuance of the owner key to the registration in the vehicle will be described with reference to FIGS. 12, 13, and 14. As shown in FIG. 12, the sequence from the issuance of the owner key to the registration in the vehicle can be roughly divided into the issuance phase Ph1 and the vehicle registration phase Ph2.

The issuance phase Ph1 is a phase in which the DKS 3 issues a service key based on a request from the user, actually a key issuance request signal transmitted from the mobile terminal 1. The issued service key is distributed only to the mobile terminal 1. The service key issued by the DKS 3 is not directly distributed to the vehicle Hv, but is registered in the vehicle via the mobile terminal 1. The vehicle registration phase Ph2 is a phase in which the service key information held by the mobile terminal 1 is registered in the vehicle Hv by BLE communication. The service key issued by the DKS 3 is in a substantially usable state, that is, activated only after it is registered in the vehicle Hv. Therefore, the vehicle registration phase Ph2 can also be referred to an activation phase. Not only the owner key but also the guest key issuance-validation includes the issuance phase Ph1 and the vehicle registration phase Ph2.

Figure 13:
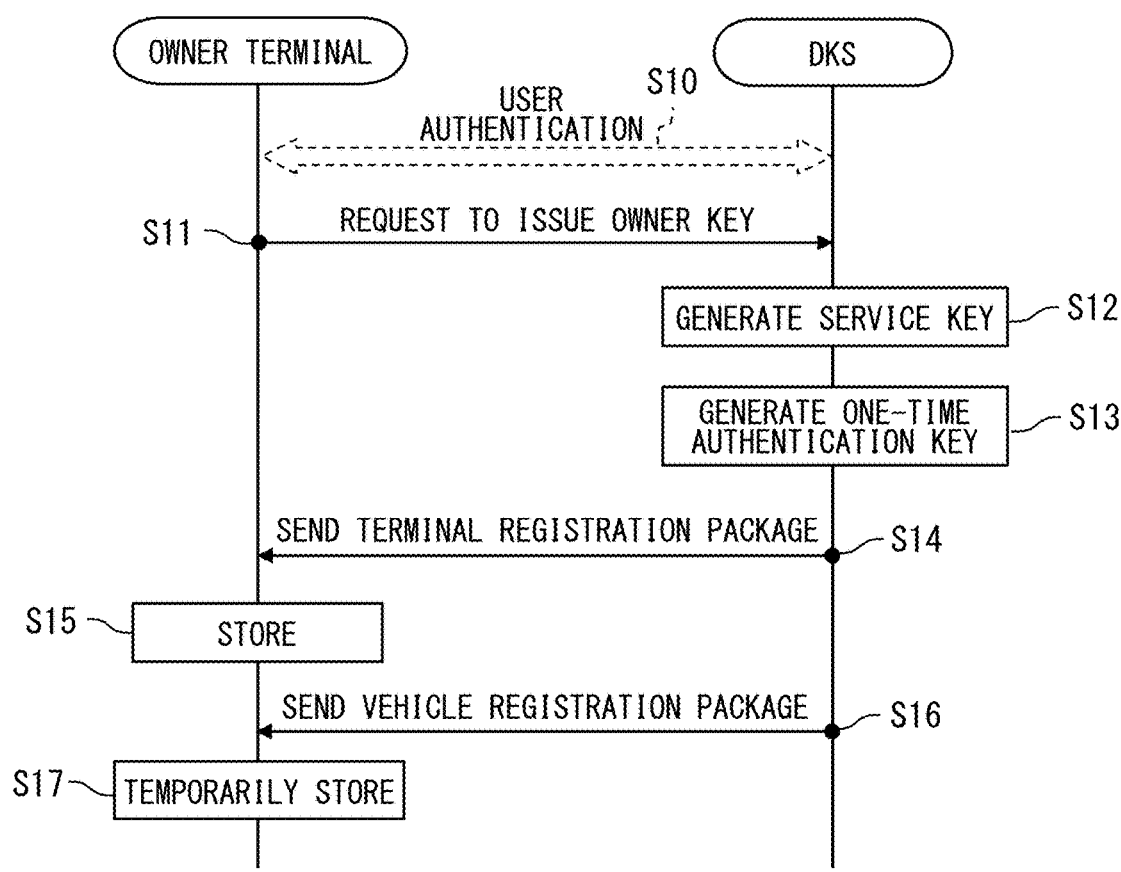
FIG. 13 is a sequence diagram for explaining an owner key issuance process.
Figure 14:
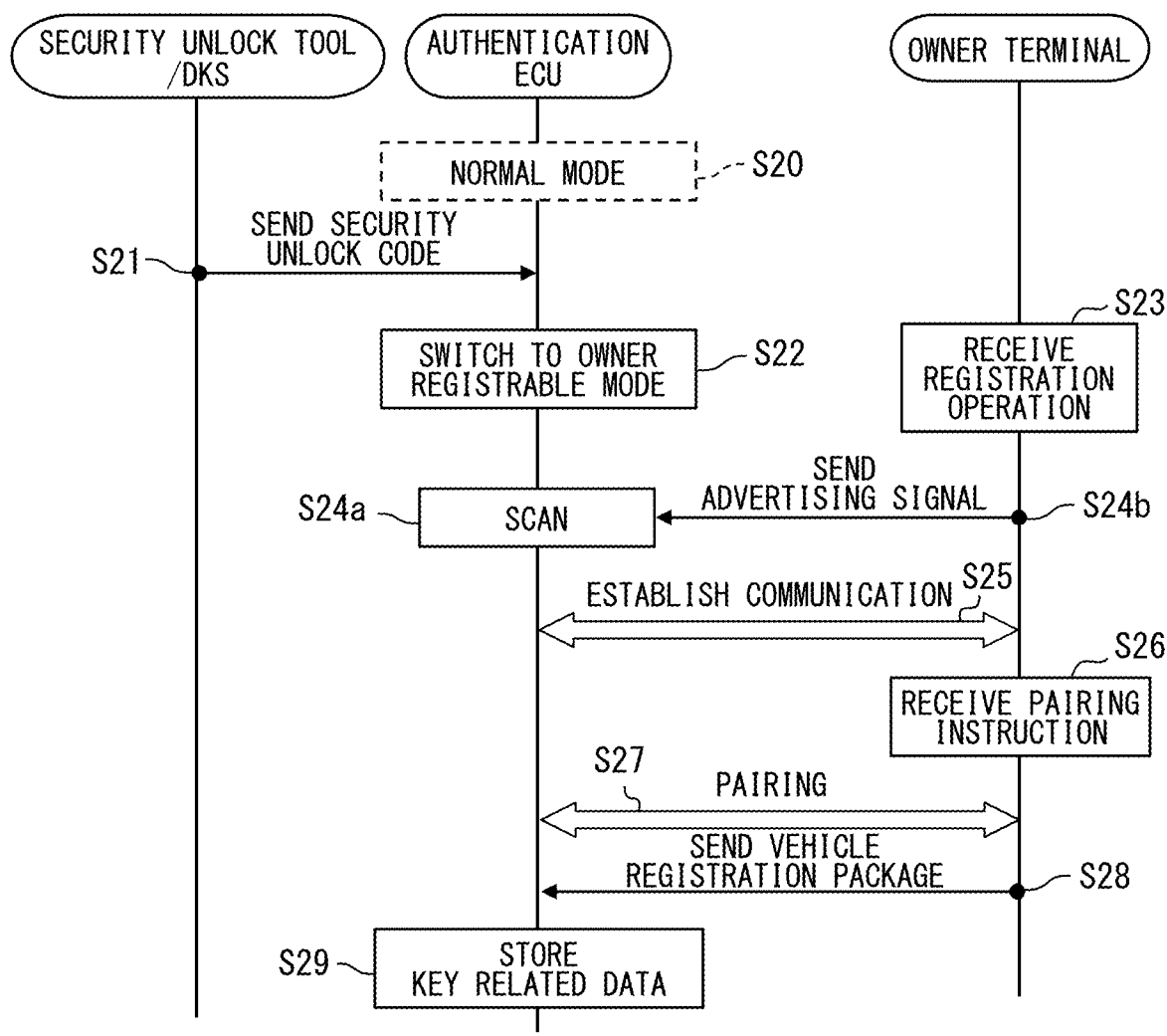
FIG. 14 is a sequence diagram for explaining a process of registering an owner key in a vehicle.

FIG. 13 is a sequence diagram showing the interaction of each device corresponding to the owner key issuance phase. The owner key issuance sequence is executed by the owner terminal and the DKS 3. The owner key issuance sequence includes steps S10 to S17, as shown in FIG. 13.

Step S10 is a step in which the DKS 3 authenticates the user/mobile terminal 1 and confirms that the communication partner is the owner/owner terminal. Authentication of being an owner may be performed using a user ID and a password, or may be authenticated using biometric information. Authentication using biometric information can be performed by the biometric authentication device 14. Note that step S10 may be a step in which the digital key application 104 of the mobile terminal 1 authenticates the user.

Step S11 is a step in which the mobile terminal 1 as the owner terminal transmits a key issuance request signal based on the user's operation. Since the key issuance request signal transmitted here is a signal for requesting the issuance of the owner key, it can be referred to an owner key issuance request signal. The key issuance request signal includes information for the DKS 3 to identify the request source, such as a device ID or a user ID. The key issuance request signal also includes the type of service key to be issued. When the service key as an issue target is a guest key, the key issuance request signal may additionally include information indicating the setting of authority and the setting of expiration date. In addition, the key issuance request signal may include information on the target vehicle and the like.

Here, since the information of the target vehicle can be specified by referring to the vehicle DB 32 using the user ID or the like as a search key, it may not have to be included in the key issuance request signal.

In step S12, the DKS 3 generates a service key and a service key ID as the owner key based on the owner key issuance request signal acquired from the owner terminal. More specifically, the execution subject of step S12 is the service key issue unit G3.

In step S13, the DKS 3 creates a predetermined number of one-time authentication keys based on the service key generated in step S12. More specifically, the execution subject of step S13 is the one-time authentication key issue unit G4. The number of initial issuances, which is the number of one-time authentication keys generated when the service key is issued, is set to be a predetermined amount larger than the replenishment threshold value, for example, 300.

In step S14, the DKS 3 transmits a terminal registration package, which is a data set including various data generated in steps S12 to S13, to the owner terminal. The terminal registration package includes a service key, a service key ID, a plurality of one-time authentication keys, and a variable code used to generate each one-time authentication key. Each one-time authentication key is associated with the variable code used to generate the one-time authentication key. The data set including the plurality of one-time authentication keys and the variable code may be transmitted independently from the data set including the service key as an authentication key package.

Further, the terminal registration package may include a terminal check code and an ECU number of the authentication ECU 4 mounted on the target vehicle. The terminal check code is a code for the mobile terminal 1 on the receiving side to verify the integrity of the data, the validity of the received data, and the presence or absence of falsification. The terminal check code may be a Hamming code or a hash value obtained by inputting the payload into a predetermined hash function. The terminal check code may be generated by using an encryption key issued in advance as a key for encrypted communication between the DKS 3 and the mobile terminal 1.

In step S15, the mobile terminal 1 as the owner terminal receives the terminal registration package distributed from the DSK 3 and stores the contents in the key information memory M1. The service key management unit F1 verifies the validity of the received data using the terminal check code described above, and then stores the received service key and its related information in the key information memory M1.

In step S16, the DKS 3 transmits a vehicle registration package, which is a data set for registering the owner information in the vehicle Hv, to the owner terminal. The vehicle registration package may include a service key, a service key ID, and a vehicle check code. The vehicle check code is a code for the authentication ECU 4, which is the final receiving device, to verify the integrity of the data, the validity of the received data, and the presence or absence of falsification. The vehicle check code may be a Hamming code or a hash value according to the payload as in the terminal check code. The vehicle check code may be generated by using an encryption key issued in advance as a key for encrypted communication between the DKS 3 and the authentication ECU 4. Further, the vehicle check code may be generated based on the ECU number. A terminal check code may be added to the vehicle registration package. According to this configuration, the owner terminal, which functions as a relay for communication between the DKS 3 and the authentication ECU 4, can also verify the completeness, correctness, and the like of the received vehicle registration package.

In step S17, the mobile terminal 1 as the owner terminal receives the vehicle registration package distributed from the DKS 3 and stores the contents in the vehicle data temporary memory M2. In the reception process, a verification process using the terminal check code described above may be performed. In the present embodiment, the vehicle registration package and the terminal registration package are transmitted separately, alternatively, the transmission mode of various data may not be limited to this feature. The vehicle registration package and the terminal registration package may be transmitted as a series of data. At that time, the duplicated data may be omitted.

The sequence of registering the owner key in the vehicle Hv will be described with reference to FIG. 14 below. The registration sequence of the owner key to the vehicle Hv includes steps S20 to S29.

First, as an initial state (at step S20) at the start of this sequence, the authentication ECU 4 is operating in the owner registration prohibition mode (that is, the normal mode). Step S21 is a step in which a predetermined security unlock tool or the DKS 3 inputs a predetermined security unlock signal to the authentication ECU 4. The input of the security unlock signal to the authentication ECU 4 using the security unlock tool or the DKS 3 is executed by the owner or the dealer staff.

The security unlock signal is a signal including a security unlock code. The security unlock signal corresponds to a signal proving that the registrant is the owner in one aspect. The security unlock signal corresponds to a signal for temporarily switching the authentication ECU from the owner registration prohibition mode (normal mode) to the owner registration mode. The authentication ECU 4 shifts to the owner registration mode based on the input of the security unlock signal (at step S22). The security unlock signal corresponds to the owner registration start signal.

The security unlock tool is, for example, a dedicated key 2. In addition, a dedicated key code can be adopted as the security unlock code. For example, the authentication ECU 4 may shift to the owner registration mode based on the fact that the in-vehicle near field communication unit 56 performs near field communication with the dedicated key 2 and receives the dedicated key code. The authentication ECU 4 may be configured to shift to the owner registration mode on the condition that a predetermined password is input via the vehicle-mounted HMI 50 in addition to receiving the dedicated key code.

Further, the security unlock tool may be a dedicated tool managed by a dealer shop or the like. The communication method between the dedicated tool and the authentication ECU 4 may be near-field communication or, for example, wired communication using a USB cable or the like. The security unlock signal from the DKS 3 is received via the cellular communication unit 58. The DSK 3 transmits a security unlock signal destined for the vehicle Hv based on a request from the owner terminal or a request from a predetermined terminal provided in the dealer shop. According to this configuration, the owner or the staff of the dealer shop can switch the authentication ECU 4 to the owner registration mode by operating the owner terminal or a predetermined terminal provided in the dealer shop.

When the authentication ECU 4 shifts to the owner registration mode, the BLE communication unit 57 is set to the standby state at a predetermined scan interval as step S24a, and the search (so-called scanning) of the mobile terminal 1 is performed. The standby state here refers to a state in which the advertisement signal can be received. In the present embodiment, the mobile terminal 1 existing around the vehicle is detected by the passive scan method. As another aspect, the authentication ECU 4 may search the mobile terminal 1 by an active scan method accompanied by transmission of a scan request.

Figure 15:
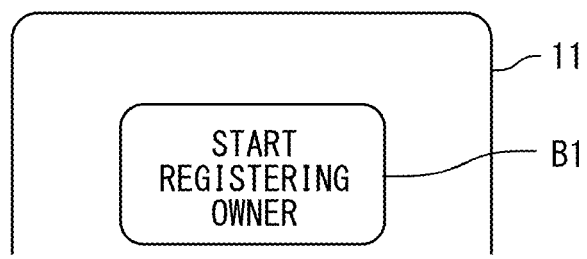
FIG. 15 is a diagram showing an example of a display screen of a mobile terminal for registering an owner key in a vehicle.

On the other hand, when the owner terminal accepts the owner key registration start operation via the touch panel 12 (at step S23), the owner terminal transmits advertisements for the owner key registration at predetermined intervals (at step S24b). When the advertisement is received by the authentication ECU 4 via the BLE communication unit 57, the authentication ECU 4 and the mobile terminal 1 start communication for communication connection (at step S25). The owner key registration start operation is, for example, as shown in FIG. 15, pressing the owner key registration start button B1 displayed on the display 11. The owner key registration start operation may be the input of a voice command instructing the owner key registration start operation.

Figure 16:
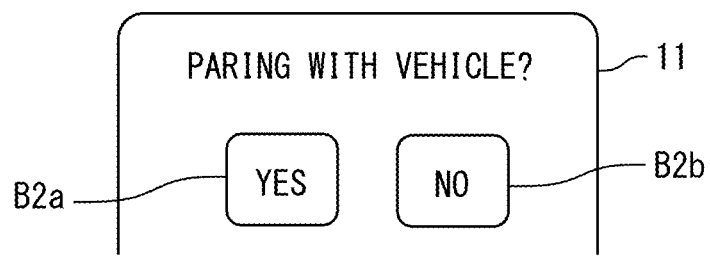
FIG. 16 is an example of a display screen of a mobile terminal related to a communication connection with a vehicle.

When the connection between the authentication ECU 4 and the BLE communication is established, the owner terminal displays, for example, the pairing confirmation screen shown in FIG. 16. The pairing confirmation screen includes, for example, buttons B2a and B2b for the user to select whether or not to execute pairing. When the owner terminal detects that the affirmative button B2a is pressed based on the signal from the touch panel 12 (at step S26), the owner terminal executes the pairing process with the authentication ECU 4 (at step S27). This enables encrypted data communication between the authentication ECU 4 and the owner terminal. The pairing process here includes not only the exchange of the encryption key but also the storage of the encryption key (so-called bonding).

When the pairing process is completed and the encrypted communication link between the authentication ECU 4 and the owner terminal is established, the owner terminal transmits the vehicle registration package stored in the vehicle data temporary memory M2 to the authentication ECU 4 by BLE communication (at Step S28). The series of communication from steps S24a to S28 corresponds to the communication for acquiring the owner key from the owner terminal for the authentication ECU 4.

When the authentication ECU 4 receives the vehicle registration package from the owner terminal via BLE communication, the authentication ECU 4 stores the key-related data included in the package in the vehicle side memory 45. More specifically, the received service key and the service key ID are stored in the owner key memory 451. As a result, the vehicle registration of the owner key is completed and the owner key is activated.

The owner registration prohibition mode may be realized by, for example, rejecting the reception or storage of the service key having the owner authority, or may be realized by rejecting the communication connection itself. Further, as one aspect, the authentication ECU 4 may be configured to store the service key, received by the communication link including the predetermined owner registration ID in response to the advertisement as the starting point, in the owner key memory 451 as the owner key. In that case, the authentication ECU 4 ignores the advertisement including the owner registration ID in the owner registration prohibition mode, while making a communication connection based on the advertisement including the owner registration ID in the owner registration mode. The owner registration ID is an ID indicating that the communication is for registering owner information, and can be expressed by a combination of three types of identifiers such as UUID, Major, and Minor.

According to the above configuration, the owner key data is registered in the vehicle Hv only when a specific owner registration start signal is input into the authentication ECU 4. Therefore, the security can be enhanced as compared with the configuration in which the owner key can be registered at all times.

About Guest Key Registration Sequence

Next, an example of the sequence from the issuance of the guest key to the registration of the guest key in the vehicle Hv will be described with reference to FIGS. 17, 18, 19, and 20. The sequence from the issuance of the guest key to the vehicle registration can also be divided into the issuance phase Ph1 and the vehicle registration phase Ph2.

Figure 17:
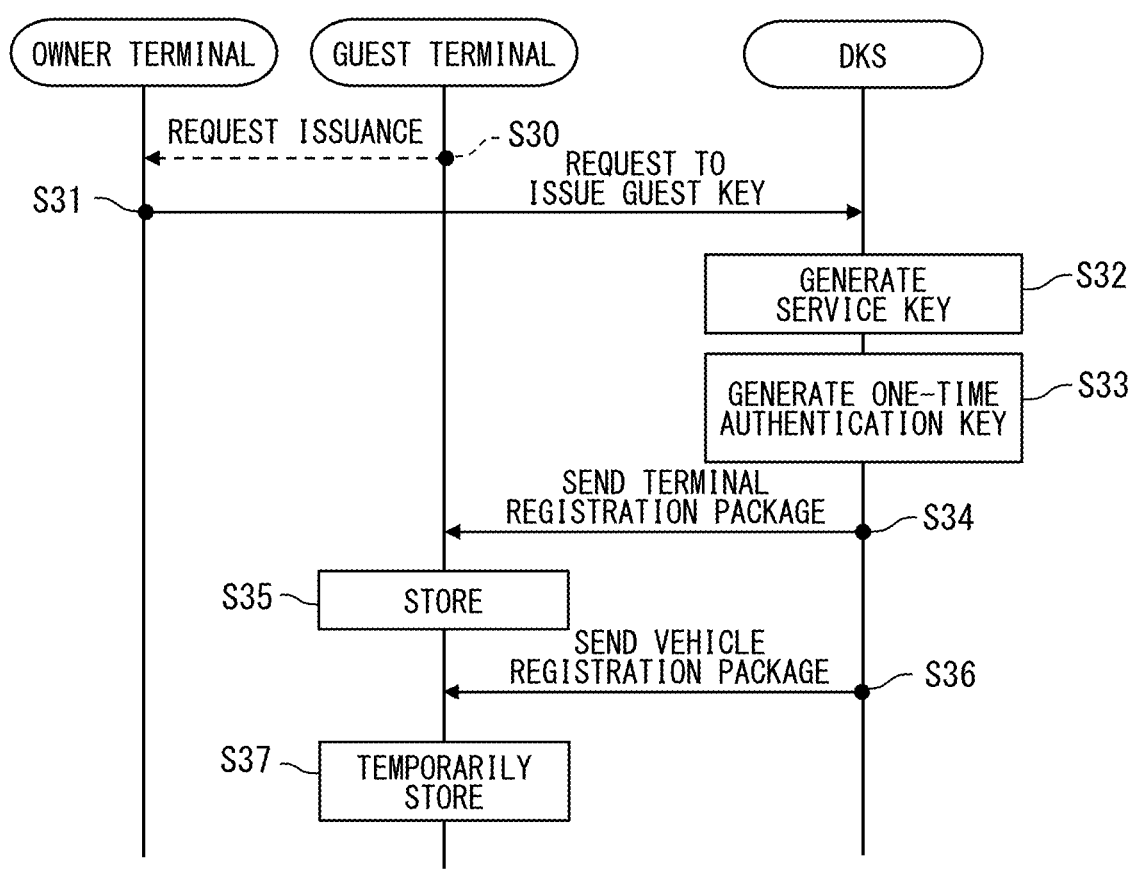
FIG. 17 is a sequence diagram for explaining a guest key issuance process.

FIG. 17 is a sequence diagram showing the interaction of each device corresponding to the guest key issuance phase Ph1. The guest key issuance sequence is executed by the owner terminal, the target guest terminal, and the DKS 3. The target guest terminal refers to the mobile terminal 1 associated with the guest to which the service key is issued. The guest key issuance sequence includes steps S30 to S37, as shown in FIG. 17.

The guest terminal in the description of the guest key issuance and registration sequence in the vehicle refers to the target guest terminal. Although the case where the owner issues the guest key will be described below, the issuer of the guest key may be a guest to whom the guest key with the issue right is granted. A guest who has a guest key with an issue right is also described as a guest who has an issue right. The description of the owner terminal/owner in the explanation of the issuance of the guest key can be read as the guest terminal with the issue right/the guest having the issue right.

Step S30 is a step in which the guest terminal transmits a guest key issuance request to the owner terminal based on the operation of the guest who desires to issue the service key. When the owner terminal receives the issuance request from the guest terminal, it transmits a guest key issuance request signal to the DKS 3 (at step S31). Although not shown, the guest key issuance sequence may also include a step in which the DKS 3 authenticates the user as the owner. Further, step S30 is an arbitrary element. Even if there is no issuance request from the guest terminal, the owner terminal can transmit a guest key issuance request signal for a predetermined guest based on the operation of the owner. For example, the owner is configured to be able to issue a guest key to any guest by operating the owner terminal based on the exchange of telephone calls/emails with the guest.

As shown in FIG. 18, for example, the guest key issuance request signal includes a data field for accommodating each of request source information, target vehicle information, target user ID, expiration date information, and authority setting information. The request source information is information indicating a guest key issuance request source, and for example, an owner's user ID, a service key ID, a device ID, or the like can be adopted. The target vehicle ID is information for identifying a vehicle that can be used with a newly issued guest key, and here refers to the vehicle ID of the vehicle Hv. The target user ID is the user ID of the guest to which the guest key is issued. A device ID or the like may be adopted as the target user information instead of the user ID. In the data field corresponding to the expiration date, a value corresponding to the period/date and time specified by the owner or a predetermined value is input. The authority setting information indicates whether or not the guest key issuance right is granted, whether or not the switching authority of the driving power supply is granted, which door that can be locked and unlocked, and the like.

When the DKS 3 receives the guest key issuance request signal from the owner terminal, in step S32, the service key and the service key ID for the target guest are generated based on the received guest key issuance request signal. Further, in step S33, the one-time authentication key issue unit G4 of the DKS 3 creates a predetermined number of one-time authentication keys based on the service key generated in step S32.

In step S34, the DKS 3 transmits a terminal registration package, which is a data set including various data generated in steps S32 to S33, to the guest terminal. The terminal registration package related to the guest key may include guest information in addition to the basic information, as shown in FIG. 19, for example. The basic information has almost the same items as the package delivered when the owner key is issued. That is, the basic information includes a service key, a service key ID, a plurality of one-time authentication keys, and a variable code for each one-time authentication key. The guest information is additional information for the guest key. For example, the guest information includes issue source information, owner key ID, target vehicle information, expiration date information, and authority setting information. The issue source information basically indicates the owner. Here, when the newly issued guest key is generated based on a request from the guest terminal with the issue right, the data field (i.e., a column) of the issue source information may include information indicating the guest as the issue source. The terminal registration package may be configured to include only one of the issue source information and the owner key ID. The terminal registration package issued to the guest terminal also includes a terminal check code and the like.

In step S35, the mobile terminal 1 as a guest terminal receives the terminal registration package delivered from the DKS 3 and stores the contents in the key information memory M1. In step S36, the DKS 3 transmits a vehicle registration package, which is a data set for registering the guest key information in the vehicle Hv, to the guest terminal. The information type included in the vehicle registration package related to the guest key can be the same as the vehicle registration package transmitted in step S36. In step S37, the mobile terminal 1 as the guest terminal receives the vehicle registration package distributed from the DKS 3 and stores the contents in the vehicle data temporary memory M2.

Figure 20:
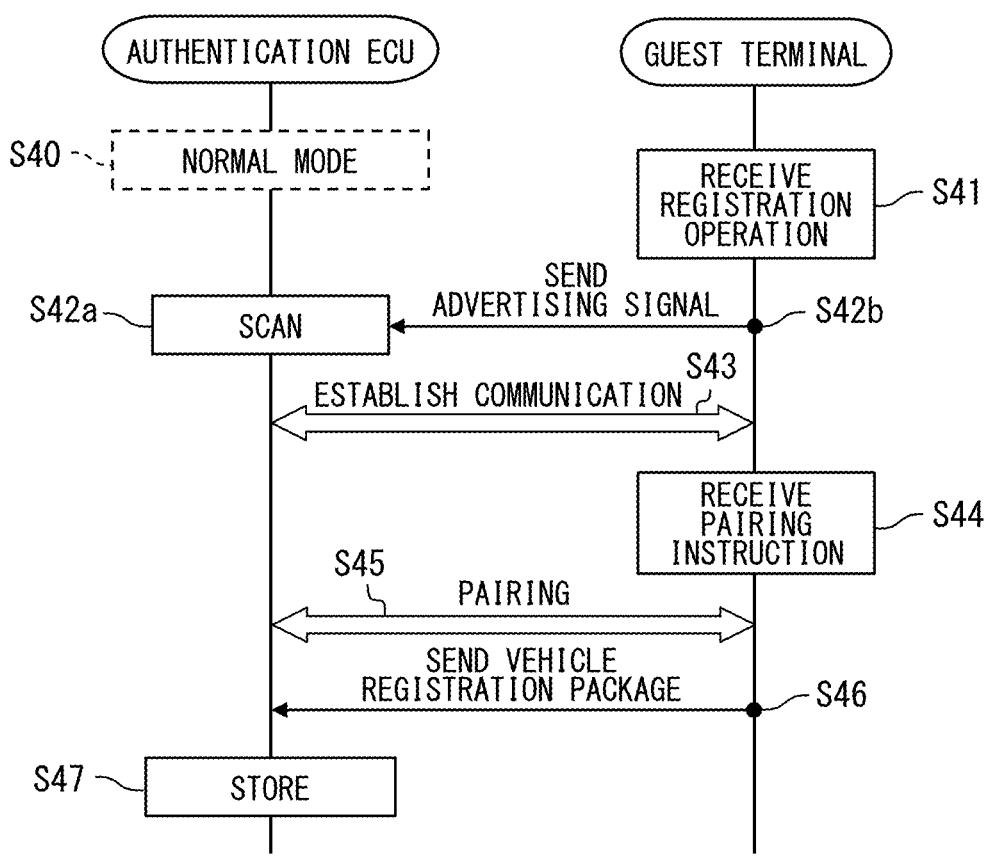
FIG. 20 is a sequence diagram for explaining a process of registering a guest key in a vehicle.

The sequence in which the guest terminal registers the guest key received from the DSK 3 in the vehicle Hv will be described with reference to FIG. 20 below. The registration sequence of the guest key to the vehicle Hv includes steps S40 to S47. As a condition, the guest terminal is located around the vehicle Hv, more specifically, at a position where BLE communication is possible. The actual execution subject of the step executed by the guest terminal is the terminal processor 101. Further, the authentication processor 41 is a substantial execution subject of the step executed by the authentication ECU 4.

First, as the initial state (at step S40) at the start of this sequence, the authentication ECU 4 is operating in the normal mode. The authentication ECU 4 can register the guest key even in the normal mode. Therefore, unlike the owner key registration sequence, the owner and the guest do not need to change the operation mode of the authentication ECU 4 by using a security unlock tool or the like. The authentication ECU 4 performs scanning at predetermined scan intervals even in the normal mode (at step S42a).

Figure 21:
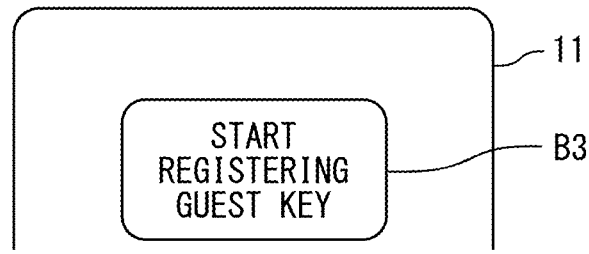
FIG. 21 is a diagram showing an example of a display screen of a mobile terminal for registering a guest key in a vehicle.

On the other hand, when the guest terminal receives the guest key registration start operation via the touch panel 12 (at step S41), the guest terminal transmits the advertisement for the guest key registration at predetermined intervals (at step S42b). When the advertisement is received by the authentication ECU 4 via the BLE communication unit 57, the authentication ECU 4 and the mobile terminal 1 start communication for communication connection (at step S43). The guest key registration start operation is, for example, as shown in FIG. 21, pressing the guest key registration start button B3 displayed on the display 11. The guest key registration start operation may be the input of a predetermined voice phrase.

When the connection between the authentication ECU 4 and the BLE communication is established, the guest terminal displays, for example, the pairing confirmation screen shown in FIG. 16. When the guest terminal detects that the affirmative button B2a is pressed based on the signal from the touch panel 12 (at step S44), the owner terminal executes the pairing process with the authentication ECU 4 (at step S45). This enables encrypted data communication between the authentication ECU 4 and the guest terminal.

When the pairing process is completed and the encrypted communication link between the authentication ECU 4 and the guest terminal is established, the guest terminal transmits the vehicle registration package stored in the vehicle data temporary memory M2 to the authentication ECU 4 by BLE communication (at Step S46).

When the authentication ECU 4 receives the vehicle registration package from the guest terminal via BLE communication, the authentication ECU 4 stores the key-related data included in the package in the vehicle side memory 45 (at step S47). More specifically, the received service key, service key ID, authority setting, expiration date, and the like are stored in the guest key memory 452. As a result, the registration of the guest key in the vehicle Hv is completed, and the guest key is activated.

According to the above configuration, it is not necessary to connect the owner terminal and the authentication ECU 4 by BLE communication in order to activate the guest key. That is, it is not necessary for the owner to bring the owner terminal close to the vehicle Hv each time the guest key is issued. Therefore, according to the above configuration, the burden on the owner for validating the guest key can be reduced. Further, in the present embodiment, the authentication ECU 4 acquires and stores the vehicle registration package by BLE communication with the mobile terminal 1 regardless of the type of the service key such as the owner key and the guest key. According to this configuration, it is possible to suppress the amount of data communication in the vehicle Hv. Further, even when the vehicle Hv is out of the communication range such as an underground parking lot, the service key can be registered in the vehicle Hv as the user approaches. Of course, as another aspect, the authentication ECU 4 may acquire the vehicle registration package from the DKS 3 by cellular communication or Wi-Fi communication. The configuration in which the service key is transmitted to the vehicle Hv via the mobile terminal 1 corresponds to a configuration in which the service key is indirectly distributed to the authentication ECU 4.

System Operation Example When the User Uses the Vehicle

Figure 22:
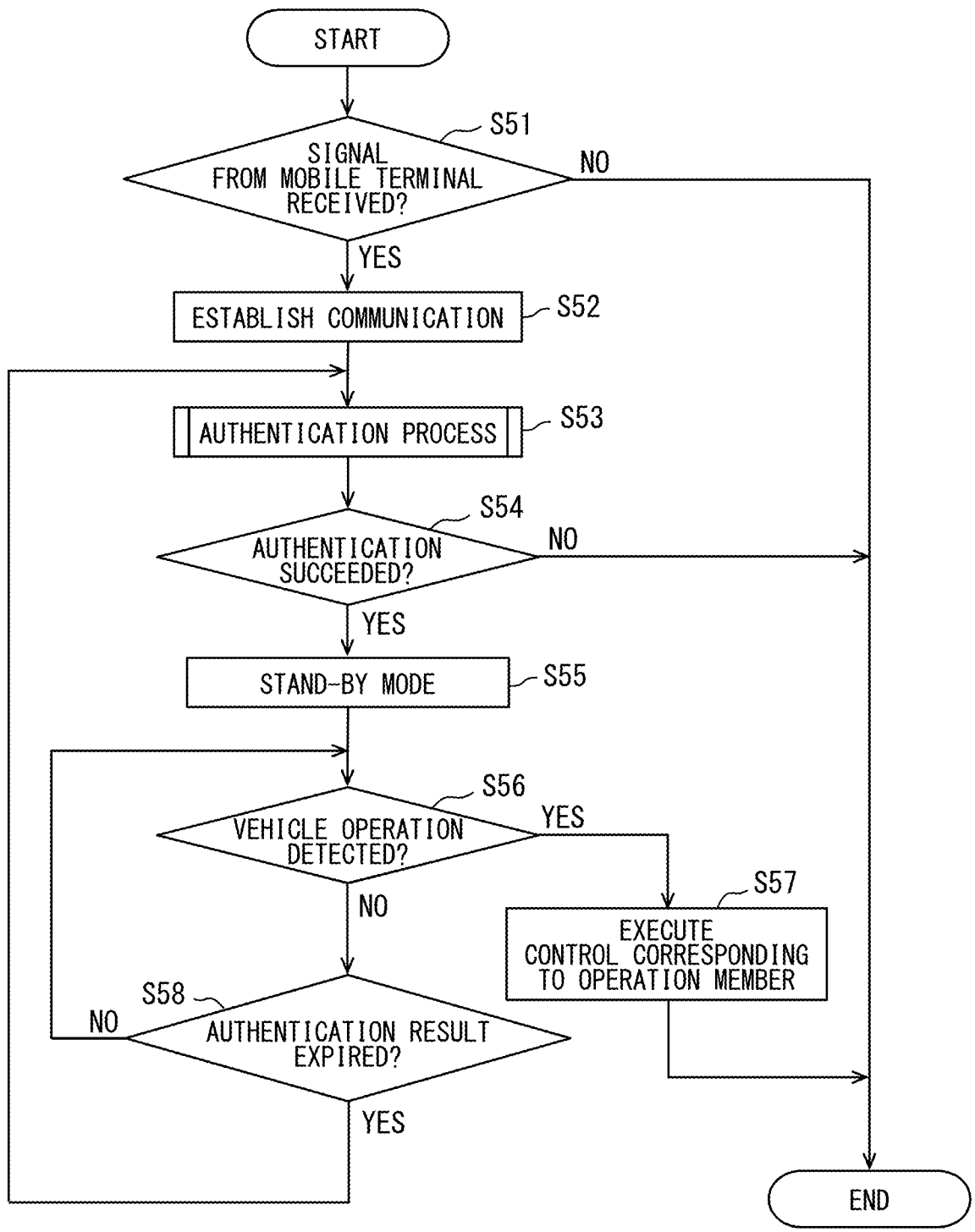
FIG. 22 is a flowchart for explaining an operation example of the authentication ECU during parking.
Figure 23:
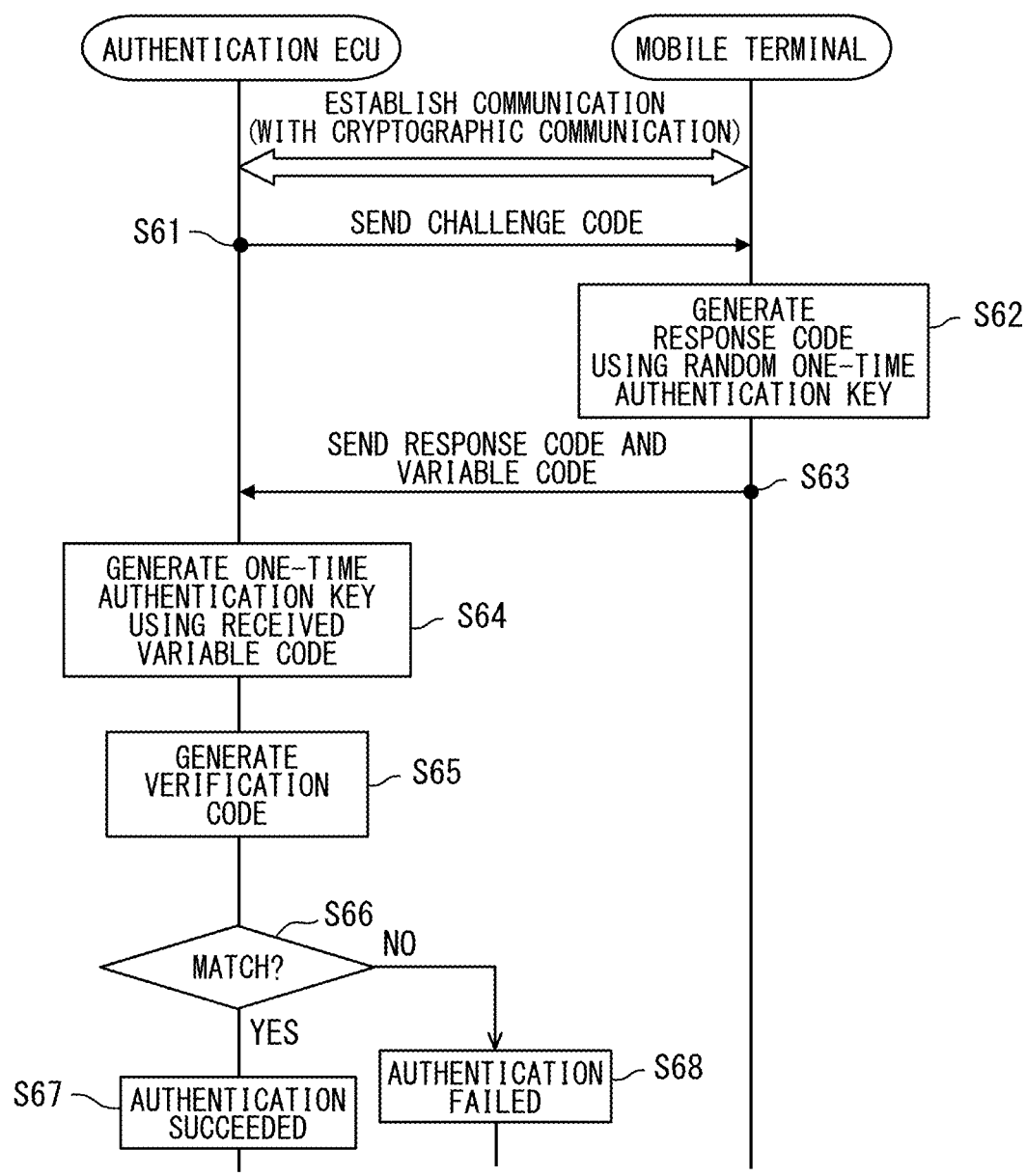
FIG. 23 is a sequence diagram showing an example of a process in which an authentication ECU authenticates a mobile terminal.

Here, the operation of the authentication ECU when the user uses the vehicle Hv will be described with reference to FIGS. 22 and 23. As a condition, the user described here is a person who carries the mobile terminal 1 in which the service key of the vehicle Hv is stored. That is, the user here corresponds to the owner or the guest, and the mobile terminal 1 corresponds to the owner terminal or the guest terminal.

First, while the vehicle Hv is parked, the authentication ECU 4 periodically causes the BLE communication unit 57 to perform scanning, and determines whether or not the mobile terminal 1 exists in the vicinity of the vehicle (at step S51). The determination of whether or not the mobile terminal 1 exists in the vicinity of the vehicle is performed based on whether or not the BLE signal emitted from the mobile terminal 1 is received, such as by advertising. When the BLE signal from the mobile terminal 1 is received (YES in step S51), the communication is connected to the mobile terminal 1 (at step S52). On the other hand, when the mobile terminal 1 cannot be found as a result of scanning, this flow ends. When the flow is terminated, step S51 is re-executed at the timing when the predetermined scan interval has elapsed. The flowchart shown in FIG. 22 can be repeatedly performed at predetermined scan intervals while the vehicle Hv is parked.

When the authentication ECU 4 can communicate with the mobile terminal 1, the authentication ECU 4 executes the authentication process in step S53. The authentication process will be described later. When the authentication of the mobile terminal 1 (and thus the user) is successful as a result of the authentication process (YES at step S54), the mode shifts to the standby mode (at step S55).

The standby mode corresponds to a state in which unlocking/locking, on/off switching of the traveling power supply, and the like can be performed based on a user operation on the door button or the like. The standby mode corresponds to a state in which the authentication processor 41 recognizes that a mobile terminal 1/user having a service key on one side exists in the vicinity of the vehicle. The area around the vehicle includes not only the outside of the vehicle but also the inside of the vehicle. In this embodiment, as an example, an expiration date is set for the determination result of successful authentication. The expiration date is set to, for example, 3 seconds, 5 seconds, 10 seconds, or the like.

On the other hand, when the authentication of the mobile terminal 1 fails as a result of the authentication process (NO at step S54), this flow ends. When the authentication process fails, the in-vehicle equipment may be operated so that the user can recognize that the authentication has not succeeded. For example, when the authentication process is not successful, a predetermined authentication failure image may be displayed on the display 51, or a lighting device provided on a side mirror or the like may be turned on in a predetermined pattern. When the authentication process fails, the authentication ECU 4 may display the authentication failure screen on the display 11 by transmitting a predetermined control signal to the mobile terminal 1 by BLE communication. The authentication ECU 4 may present that the authentication has failed by turning on the welcome light that emits light toward the road surface around the door in a predetermined pattern.

In step S56, the authentication processor 41 determines whether or not a user operation for using the vehicle Hv has been performed based on signals from the door button, the touch sensor, the start button, and the like. The user operation for using the vehicle Hv refers to an action of trying to open the door, such as touching/grasping the door handle. Pressing the start button also corresponds to a user operation for using the vehicle Hv.

When the signal corresponding to the user operation is input from the in-vehicle sensor (YES at step S56), the authentication processor 41 executes vehicle control according to the state of the element operated by the user and the vehicle Hv (at step S57). For example, the authentication processor 41 unlocks the door when it detects that the door button is pressed/the door handle is gripped while the vehicle Hv is locked. Further, when the authentication processor 41 detects that the start button is pressed, the authentication processor 41 switches the traveling power supply from the off state to the on state or from the on state to the off state.

When actually controlling the vehicle such as unlocking/locking the door and turning on/off the power for traveling, not only the authentication result but also the estimated position of the mobile terminal 1, the authority of the service key, and the state of the vehicle Hv are checked. Then, when the predetermined control execution condition is not satisfied, the execution of the vehicle control according to the user operation can be canceled. The case where the control execution condition is not satisfied is, for example, the case where the authority set in the service key is insufficient, or the case where the detected position of the mobile terminal 1 is 2 m or more away from the vehicle. The position of the mobile terminal 1 can be specified based on the reception status of the signal from the mobile terminal 1. As the position estimation material of the mobile terminal 1, various indexes such as reception intensity, signal arrival direction, ToF (Time of Flight), and RTT (Round-Trip Time) can be adopted.

On the other hand, when the user operation for using the vehicle Hv is not performed (NO at step S56), it is determined whether or not the authentication result has expired, that is, whether or not a predetermined time has passed since it was determined that the authentication was successful. While it is within the expiration date (NO at step S58), the standby mode is maintained. On the other hand, when the expiration date has expired, the authentication processor 41 re-executes the communication for the authentication process.

According to the above configuration, the user can access the vehicle Hv without operating the dedicated key 2 or the mobile terminal 1. That is, the passive entry passive start function is realized, and the convenience of the user can be enhanced.

About Authentication Processing

Here, a sequence of processes in which the authentication ECU 4 authenticates the mobile terminal 1 will be described. The authentication process of the mobile terminal 1 by the authentication ECU 4 includes steps S61 to S68 as shown in FIG. 23, for example. The authentication process is executed on the condition that an encrypted communication link between the mobile terminal 1 and the authentication ECU 4 has been established.

Step S61 is a step of transmitting a challenge code from the authentication ECU 4 to the mobile terminal 1. As the challenge code, a random number having a predetermined length generated by using a random number table prepared in advance can be adopted. The challenge code may be a random number generated by using the clock time information (so-called system time) provided in the authentication ECU 4 as SEED. The challenge code can be determined in a variety of ways.

Step S62 is a step in which the mobile terminal 1 generates a response code by combining an arbitrary one-time authentication key stored in the key information memory M1 with the received challenge code by a predetermined method. Step S63 is a step in which the mobile terminal 1 collectively or separately returns the response code generated in step S62 and the variable code corresponding to the one-time authentication key used to generate the response code to the authentication ECU 4. The variable code corresponding to a certain one-time authentication key refers to the variable code used in the DSK 3 to generate the one-time authentication key.

In step S64, the variation code received from the mobile terminal 1 by the authentication ECU 4 and the service key corresponding to the communication partner stored in the vehicle-side memory 45 are used to generate the one-time authentication key by the same method as the one-time authentication issue unit G4 of the DKS 3. Here, the combination of the service key and the variable code used by the authentication ECU 4 to generate the one-time authentication key is the same as the one-time authentication key generation material used by the mobile terminal 1 to generate the response code. Therefore, the one-time authentication key generated by the authentication ECU 4 in step S64 is the same as the one-time authentication key used by the mobile terminal 1 to generate the response code. Such step S64 is a process of restoring the one-time authentication key used by the mobile terminal 1 to generate the response code based on the variable code received from the mobile terminal 1 and the service key of the mobile terminal 1 held by the mobile terminal 1.

In step S65, the authentication ECU 4 generates a verification code based on the one-time authentication key generated in step S64 and the challenge code transmitted in step S61. The verification code generation method itself is the same as the response code generation. When the communication partner is the mobile terminal 1 that holds the service key registered in the vehicle-side memory 45, it can be expected that the verification code and the response code match. When the communication partner is an unregistered device, the response code is not returned, or the response code and the verification code do not match. Therefore, the response code as described above functions as information for verifying the validity of the communication partner using the authentication ECU 4.

In step S66, the validity of the communication partner is determined by comparing the verification code generated by the authentication ECU 4 in step S65 with the response code received from the mobile terminal 1. That is, when the two codes match, it is determined that the authentication is successful (at step S67). On the other hand, when the two codes are different, it is determined that the authentication has failed (at step S68). When the response code is not returned even after the predetermined response waiting time has elapsed from the transmission of the challenge code, the authentication ECU 4 can determine that the authentication has failed.

According to the above configuration, the mobile terminal 1 and the user are authenticated using the one-time authentication key generated based on the unique service key unique to each mobile terminal 1. Therefore, the security can be enhanced as compared with the configuration in which the mobile terminal is authenticated using the fixed key information. Further, according to the above method, the information exchanged between the authentication ECU 4 and the mobile terminal 1 when generating the response code is a variable code and a challenge code. At the time of authentication, the one-time authentication key itself is not transmitted/received between the authentication ECU and the mobile terminal. To generate a one-time authentication key, a service key delivered separately in the service key issuance phase is required, and the one-time authentication key cannot be restored simply by receiving the variable code. In addition, the one-time authentication key used for authentication is changed each time. Therefore, according to the above method, it is possible to reduce the risk that an unrelated person will succeed in the authentication process illegally. The irrelevant person here refers to a person to whom the service key of the vehicle Hv is not given.

The above-mentioned authentication sequence is an example, and may not be limited to this feature. The operation of each device may be designed so that the mobile terminal 1 and the authentication ECU 4 have the same one-time authentication key used to generate the response code and/or the verification code. For example, the authentication process may be performed according to the procedure shown in FIG. 24. That is, the authentication process may include steps S61a to S69a as another example.

Figure 24:
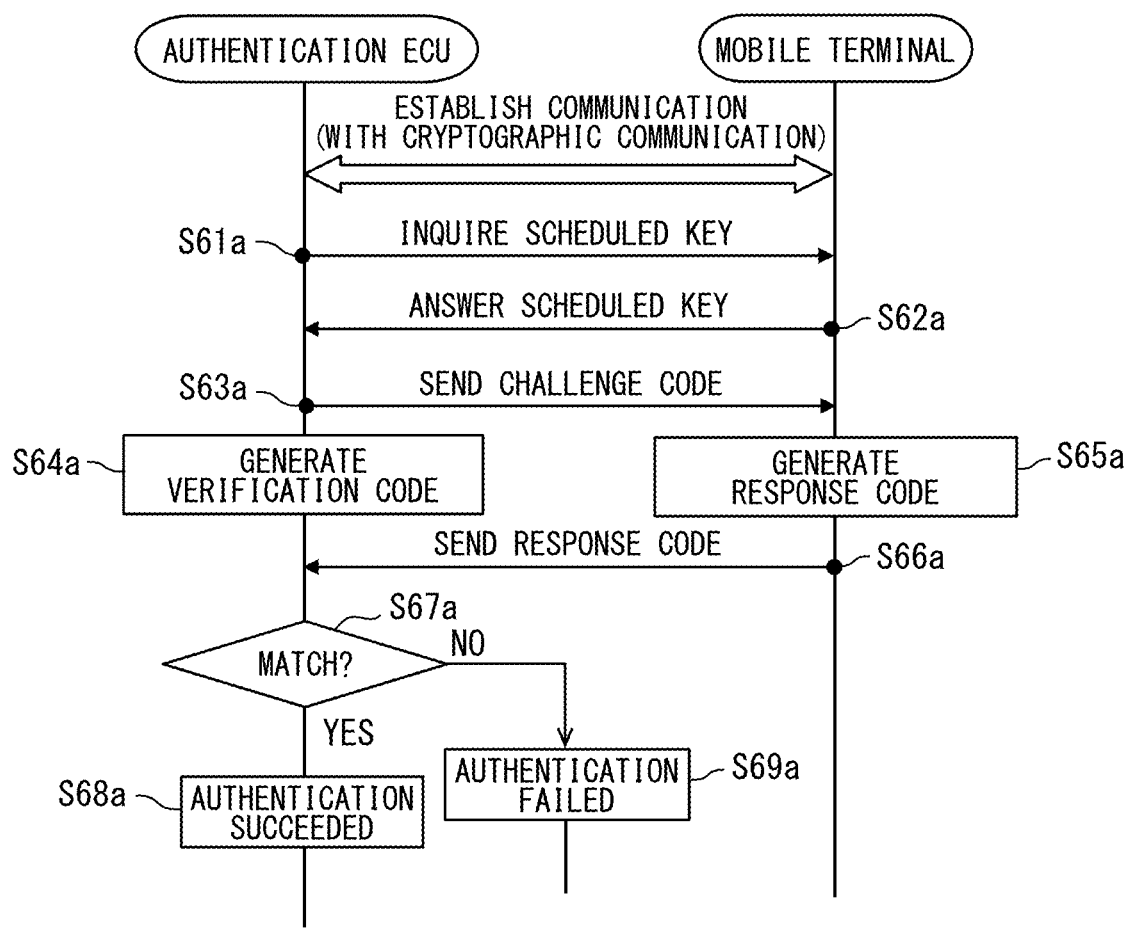
FIG. 24 is a sequence diagram showing another example of a process in which an authentication ECU authenticates a mobile terminal.

When the authentication processing pattern shown in FIG. 24 is adopted, it is assumed that the authentication ECU 4 and the mobile terminal 1 hold a plurality of common one-time authentication keys as a condition configuration. For example, the authentication ECU 4 acquires the same one-time authentication key held by the mobile terminal 1 by receiving a data set including a plurality of one-time authentication keys as a vehicle registration package. The number for identifying the one-time authentication keys is assigned to each of the one-time authentication keys. Further, when the one-time authentication key stored in the vehicle-side memory 45 becomes less than the predetermined replenishment threshold value, the authentication ECU 4 receives the unacquired one-time authentication key and the authentication key umber from the mobile terminal 1 under a condition that the authentication of the mobile terminal 1 is successful. As a result, the authentication ECU 4 can replenish the one-time authentication key stored in the vehicle-side memory 45. The authentication ECU 4 may be configured to acquire the one-time authentication key directly from the DKS 3. The mobile terminal 1 replenishes the one-time authentication key by communicating with the DKS 3 at any time as described later.

Step S61a is a step in which the authentication ECU 4 transmits a key usage confirmation signal to the mobile terminal 1. The key usage confirmation signal is a signal for inquiring about the number of the key to be used. The key to be used refers to the one-time authentication key used to generate the subsequent response code. The key usage confirmation signal corresponds to the adjustment message.

When the mobile terminal 1 receives the key usage confirmation signal, it notifies the authentication ECU 4 of the number of the key to be used in step S62a. Any method can be adopted as the method for determining the key to be used. For example, among the one-time authentication keys held by the mobile terminal 1, the key with the smallest number is selected as the key to be used.

In addition, the mobile terminal 1 sequentially deletes the expired ones by the expiration date management of the one-time authentication key described later. The authentication ECU 4 also manages the expiration date in the same manner, but the time information of the authentication ECU 4 and the time information of the mobile terminal 1 do not always completely match. In addition, the timing of discarding the one-time authentication key based on the expiration date may differ. Due to these circumstances, the authentication ECU 4 does not always hold the key to be used held by the mobile terminal 1.

When the authentication ECU 4 does not hold the key to be used notified from the mobile terminal 1, the authentication ECU 4 may request the mobile terminal 1 to use another key. Steps S61*a* to S62*a* may be repeated until the one-time authentication key held by both the authentication ECU 4 and the mobile terminal 1 is selected. In addition, in order to more efficiently match the keys to be used, the key usage confirmation signal may include the numbers of a plurality of candidates randomly selected or selected according to a predetermined rule from the one-time authentication keys held by the authentication ECU 4. The mobile terminal 1 may be configured to randomly select or select according to a predetermined rule a key to be used from the plurality of candidates, and responds to it.

Step S63*a* is a step in which the authentication ECU 4 transmits a challenge code in the same manner as in step S61. Step S64*a* is a step in which the authentication ECU 4 generates a verification code based on the one-time authentication key corresponding to the number notified as the key to be used from the mobile terminal 1 and the challenge code transmitted in step S63*a*. As the one-time authentication key itself, the one-time authentication key stored in the vehicle-side memory 45 is used.

Step S65*a* is a step in which the mobile terminal 1 generates a response code by using the one-time authentication key corresponding to the number selected as the key to be used and the challenge code received from the authentication ECU 4. The one-time authentication key itself used to generate the response code is obtained from DSK 3 in advance and stored in the terminal memory 105. When the generation of the response code is completed, the mobile terminal 1 transmits the response code to the authentication ECU 4 as step S66*a*.

When the authentication ECU 4 receives the response code from the mobile terminal 1, in step S67*a*, the authentication ECU 4 determines the validity of the communication partner by comparing the response code with the verification code generated in step S65*a*. That is, when the two codes match, it is determined that the authentication is successful (at step S68*a*). On the other hand, when the two codes are different, it is determined that the authentication has failed (at step S69*a*).

According to the above method, the information exchanged between the authentication ECU 4 and the mobile terminal 1 when generating the response code is the number of the key to be used and the challenge code, and the one-time authentication key itself is not transmitted/received by communication. The one-time authentication key cannot be restored with the key number alone. Therefore, also by the above method, it is possible to reduce the risk that an unrelated person will illegally succeed in the authentication process, as in the above-mentioned authentication method. In the above example, the mode in which the mobile terminal 1 notifies the authentication ECU 4 of the key number to be used before the response code is generated has been described, alternatively, the processing order may not be limited to this feature. After generating the response code, the mobile terminal 1 may notify the authentication ECU 4 of the number of the one-time authentication key used for generating the response code.

One-Time Authentication Key Replenishment Sequence

Figure 25:
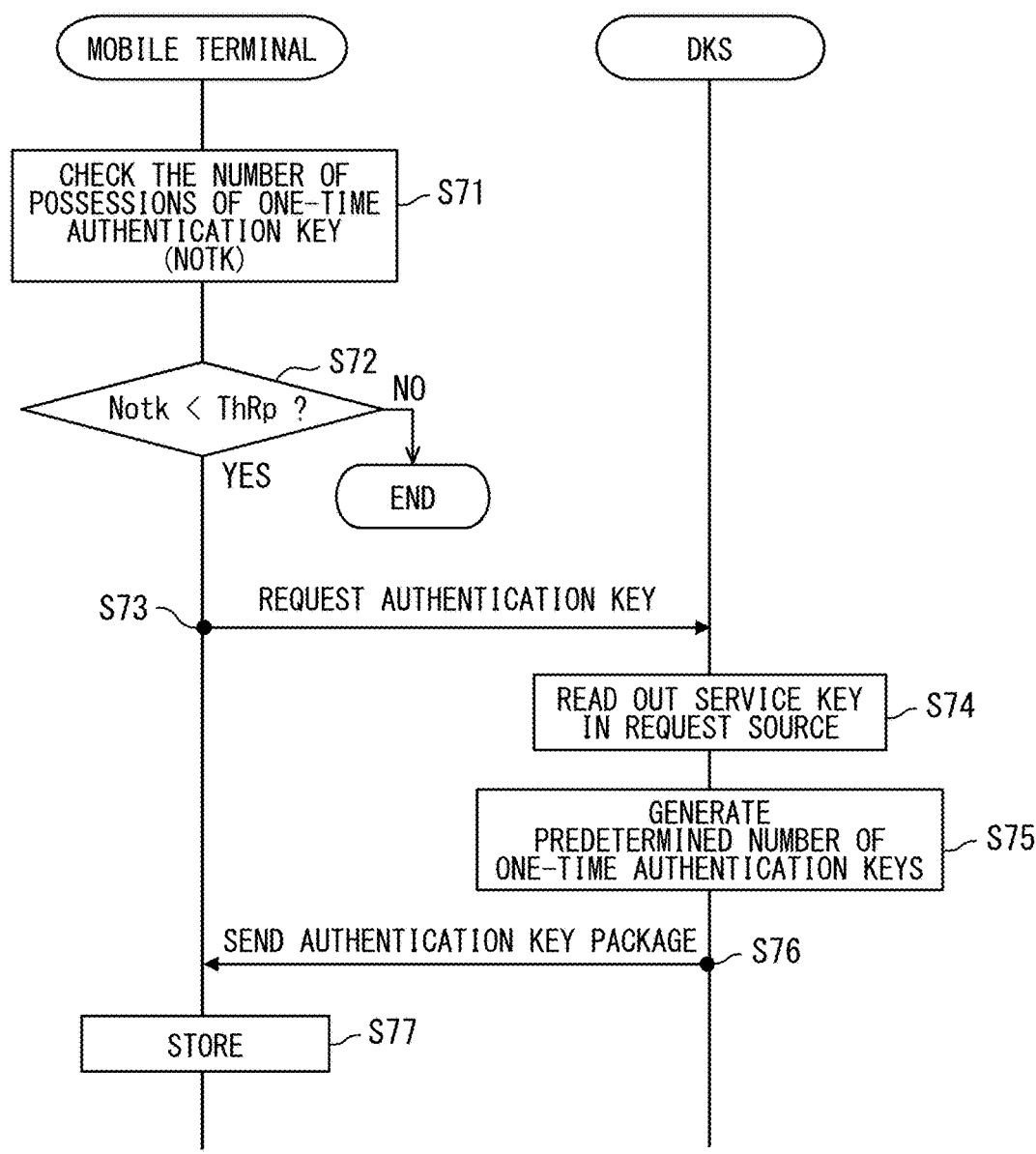
FIG. 25 is a sequence diagram of a process in which a mobile terminal replenishes a one-time authentication key.

Here, the one-time authentication key replenishment process executed by the mobile terminal 1 will be described with reference to FIG. 25. The one-time authentication key replenishment process is a process of replenishing the one-time authentication key when it becomes less than a predetermined replenishment threshold ThRp. The one-time authentication key replenishment process includes steps S71 to S77 as shown in FIG. 25. The one-time authentication key replenishment process is periodically executed, for example, at a predetermined remaining number confirmation cycle. The one-time authentication key replenishment process may be executed on condition that the mobile terminal 1 is in the online state. The one-time authentication key replenishment process may also be started based on the receipt of the remaining number confirmation instruction signal transmitted from the DKS 3 or the user performing a predetermined remaining number confirmation operation. The one-time authentication key replenishment process may be executed as a part of the storage authentication key update process described later. Receiving the remaining number confirmation instruction signal and accepting the remaining number confirmation operation correspond to the confirmation event.

The expression of the mobile terminal 1 as the execution body of the one-time authentication key replenishment process can be understood as the terminal processor 101 and/or the one-time authentication key management unit F2.

Step S71 is a step in which the mobile terminal 1 confirms the remaining number (i.e., Notk) of the one-time authentication keys stored in the terminal-side memory 105. Step S72 is a step in which the mobile terminal 1 determines whether or not the remaining number (Notk) of the one-time authentication keys acquired in step S71 is less than a predetermined replenishment threshold value (ThRp). When an equation of Notk <ThRp is satisfied, the mobile terminal 1 transmits an authentication key request signal to the DKS 3 at step S73. The authentication key request signal is a signal for requesting distribution of the one-time authentication key. The authentication key request signal corresponds to the replenishment request signal. On the other hand, when an equation of Notk ThRp is satisfied, the mobile terminal 1 ends the sequence of replenishing the one-time authentication key.

As described above, the necessity of replenishing the one-time authentication key can be managed by the replenishment necessity flag. When the equation of Notk <ThRp is satisfied, the mobile terminal 1 sets the replenishment necessity flag to an on state. Further, when the equation of Notk ThRp is satisfied, the mobile terminal 1 sets the replenishment necessity flag to an off state. When the mobile terminal 1 is in the offline state, the state in which the replenishment necessity flag is set to the on state is maintained, and then the authentication key request signal can be transmitted based on the fact that the mobile terminal 1 is online.

When the DKS 3 receives the authentication key request signal from the mobile terminal 1, in step S74, the service key of the request source is read out from the user DB 33. Then, the DSK 3 generates a plurality of one-time authentication keys by using the service key and a variable code randomly generated by a predetermined rule (at step S75). The number of one-time authentication keys generated in step S75 may be a fixed number, or may be a value obtained by adding a predetermined value (for example, 100) to the difference between the replenishment threshold value and the remaining number. The authentication key request signal may include information indicating the remaining number of one-time authentication keys in the mobile terminal 1 so that the DKS 3 can specify the required number of issuances.

When the generation of the one-time authentication key is completed, the DKS 3 transmits the authentication key package to the mobile terminal 1 at step S76. An authentication key package is a data set in which a variable code is associated with an individual one-time authentication key. When the mobile terminal 1 receives the authentication key package from the DKS 3, the mobile terminal 1 stores the data included in the authentication key package in the terminal memory 105 (at step S77).

According to the above configuration, the one-time authentication key held by the mobile terminal 1 is replenished at any time based on the fact that the number of one-time authentication keys is less than a predetermined value. Therefore, it is possible to reduce the risk that the user cannot use the vehicle Hv due to the exhaustion of the one-time authentication key. Further, the replenishment threshold value is set to a sufficiently large value of, for example, 100 or more. According to this setting, even when the user temporarily stays outside the communication area such as a mountainous area, it is possible to reduce the possibility that the one-time authentication key will be insufficient during the stay outside the communication area. The digital key application 104 may be configured so that the user can register an arbitrary value as a replenishment threshold within a range larger than a predetermined minimum value.

Periodic Update Sequence of One-Time Authentication Key

Figure 26:
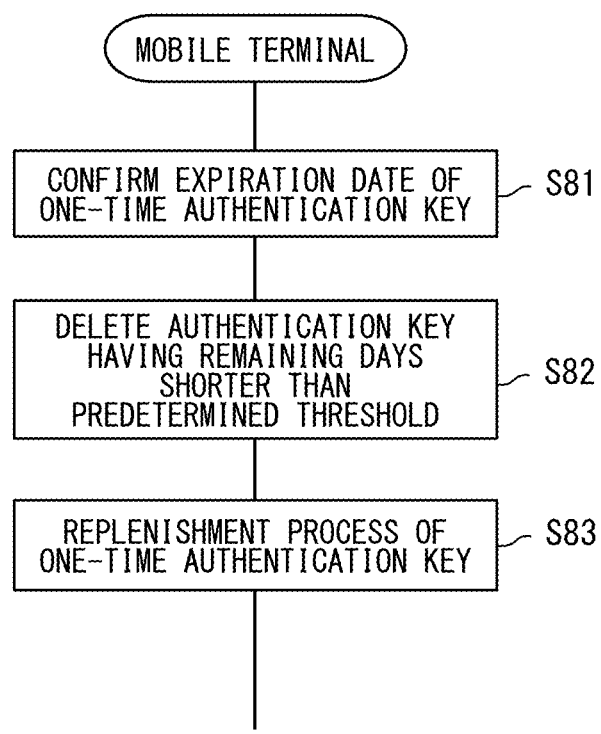
FIG. 26 is a sequence diagram of a process in which a mobile terminal replaces a one-time authentication key stored in a key information memory.

Here, the storage authentication key update process executed by the mobile terminal 1 will be described with reference to FIG. 26. The storage authentication key update process is a process of periodically replacing a part or all of the one-time authentication keys stored in the terminal memory 105. The storage authentication key update process includes steps S81 to S83 as shown in FIG. 26. The storage authentication key update process is periodically executed, for example, at a predetermined replacement cycle. The storage authentication key update process may be executed on condition that the mobile terminal 1 is in the online state. The expression of the mobile terminal 1 as the execution body of the processing step constituting the storage authentication key update process can be understood as the terminal processor 101 and/or the one-time authentication key management unit F2.

Step S81 is a step in which the mobile terminal 1 confirms the expiration date of each one-time authentication key stored in the terminal-side memory 105 based on the terminal clock time which is the time information held by the mobile terminal 1. The mobile terminal 1 deletes the expired one-time authentication key (at step S82). Confirmation of the expiration date corresponds to comparing the date and time indicated as the expiration date with the current date and time. The terminal clock time is adjusted at any time by communicating with a predetermined server such as the DKS 3.

Step S83 is a step in which the mobile terminal 1 executes the one-time authentication key replenishment process in cooperation with the DKS 3. The one-time authentication key replenishment process is as described above. In the replenishment process based on the expiration date, the replenishment process may be configured to replenish only the number deleted in step S82 regardless of whether the remaining number (i.e., Notk) is less than the replenishment threshold value (i.e., ThRp). For example, when twenty one-time authentication keys are deleted in step S82, the mobile terminal 1 may transmit a signal requesting issuance of twenty one-time authentication keys as an authentication key request signal. The authentication key request signal may include information indicating the desired number of issuances.

According to the above configuration, a part or all of the one-time authentication keys stored in the mobile terminal 1 is periodically replaced based on the expiration date. According to this configuration, the available one-time authentication key changes over time. Therefore, the security can be further strengthened.

About Updating Time Information in the Authentication ECU

Figure 27:
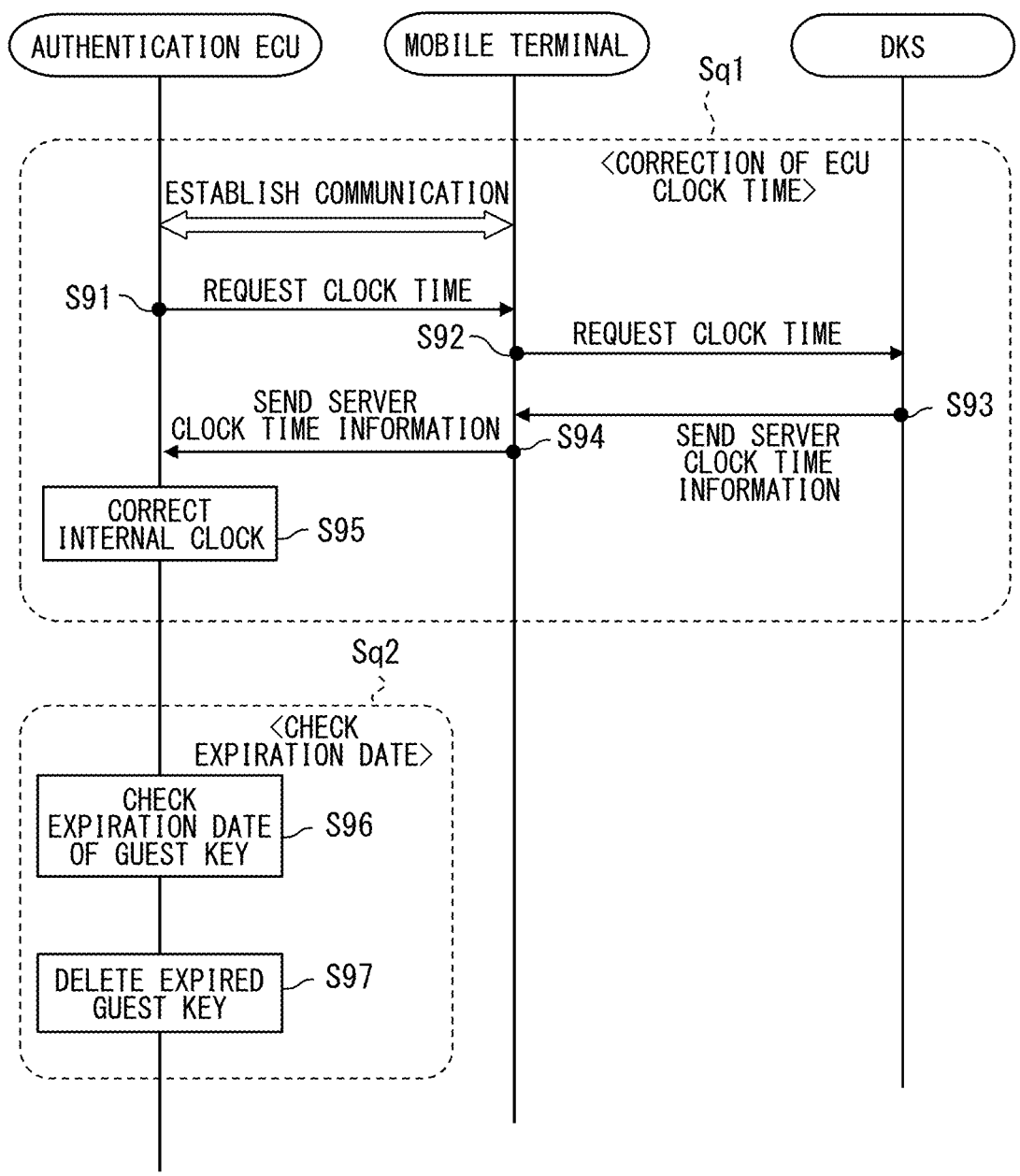
FIG. 27 is a sequence diagram for explaining the correction of the ECU clock time and the deletion of the guest key based on the expiration date, which are carried out by the authentication ECU.

The authentication ECU 4 checks the expiration date of the guest key based on the time inside the ECU, which is the time information held by the authentication ECU 4. Therefore, it may be preferable that the time inside the ECU is synchronized with the time information of the DKS 3. Here, a process of correcting the internal time of the ECU so as to synchronize with the time information of the DKS 3 using the feature in FIG. 27 and then the process of expiration date of the guest key will be described. As shown in FIG. 27, a series of sequences for updating the ECU time information and checking the expiration date of the guest key include steps S91 to S97. At least the sequence for updating the ECU internal time is executed on condition that the BLE communication link is established between the authentication ECU 4 and the mobile terminal 1. The mobile terminal 1 here may be either an owner terminal or a guest terminal.

In step S91, the authentication ECU 4 transmits a clock time request signal to the mobile terminal 1. The clock time request signal is a signal that requests server time information, which is time information held by the DKS 3. The time request signal may include information indicating the request source, such as an ECU number or a vehicle ID.

When the mobile terminal 1 receives the clock time request signal from the authentication ECU 4 by BLE communication, at step S92, the mobile terminal 1 generates a clock time request signal conforming to the format of cellular communication or Wi-Fi communication and transmits it to the DKS 3. Step S92 corresponds to the step of transferring the data from the authentication ECU 4 to the DKS 3. The clock time request signal transmitted from the mobile terminal 1 to the DKS 3 may preferably include the information of the mobile terminal 1 so that the DKS 3 can specify the return destination of the server time information.

When the DKS 3 receives the clock time request signal from the mobile terminal 1, it returns the server time information to the request source mobile terminal 1 (at step S93). Further, the mobile terminal 1 transfers the server time information received from the DKS 3 to the authentication ECU 4 by BLE communication (at step S94).

When the authentication ECU 4 receives the server time information from the mobile terminal 1, the authentication ECU 4 corrects the ECU internal time using the server time information (at step S95). The time inside the ECU refers to the time information held by the authentication ECU 4. The data reception process in each device may include a validity verification process using a check code. When the validity is not confirmed as a result of the verification process using the check code, the request can be rejected. Steps S91 to S95 described above correspond to the sequence Sq1 for updating the ECU time information.

The authentication ECU 4 confirms the expiration date of each guest key registered in the vehicle side memory 45 using the corrected time information, for example, based on the correction of the ECU internal time (at step S96). Then, the authentication ECU 4 deletes the data of the guest key whose expiration date has expired (at step S97). Note that step S97 may be a process of invalidating the expired guest key by using a flag or the like while leaving the key data.

Steps S96 to S97 correspond to the sequence Sq2 for checking the expiration date of the guest key. The sequence Sq1 for updating the ECU time information and the sequence Sq2 for checking the expiration date of the guest key may be executed separately. The sequence Sq2 for checking the expiration date of the guest key may not be limited to the case where the ECU time information is updated, and may be executed at a predetermined cycle. Further, the check of the expiration date of the guest key may be executed based on the timing when the driving power is switched from on to off or when the driving power is switched from off to on.

The time information included in the authentication ECU 4 may deviate from the actual time or the server time depending on the accuracy of the clock oscillator included in the authentication ECU 4. According to the above configuration, the time inside the ECU is corrected each time the mobile terminal 1 is connected. Therefore, it is possible to reduce the risk that the authentication ECU 4 deletes/invalidates the guest key based on incorrect time information.

About the Owner Key Deletion Process

The owner of the vehicle Hv may change depending on the sale/transfer of the vehicle Hv. When the owner changes, it may be preferable that the service key of the old owner is deleted. Under such circumstances, the vehicle digital key system Sys needs to be configured so that not only the guest key but also the owner key information can be deleted.

Figure 28:
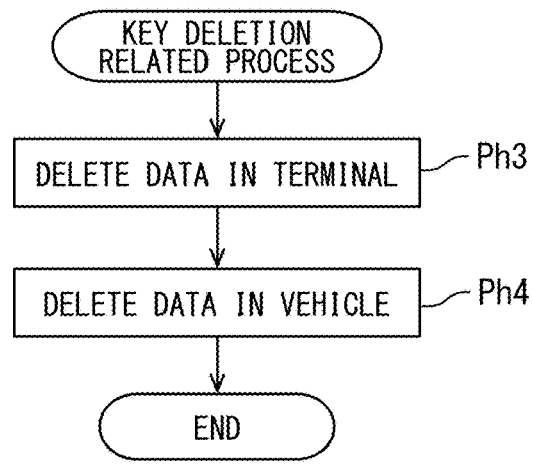
FIG. 28 is a diagram for explaining the overall feature of the sequence related to the deletion of the service key.

The DKS 3 of the present embodiment is configured to be able to accept an owner key deletion request from both the owner terminal and the in-vehicle HMI device. When the owner key is deleted based on the operation on the owner terminal, the DKS 3 may include the in-terminal data deletion phase Ph3 and the in-vehicle data deletion phase Ph4 as a whole process as shown in FIG. 28. The in-terminal data deletion phase Ph3 is a phase in which the data of the service key (here, the owner key) designated is deleted from the mobile terminal 1. The in-vehicle data deletion phase Ph4 is a phase in which the service key designated is deleted from the authentication ECU 4 i. Here, a sequence in which the owner key is deleted based on an operation on the owner terminal will be described with reference to FIGS. 29 and 30.

Figure 29:
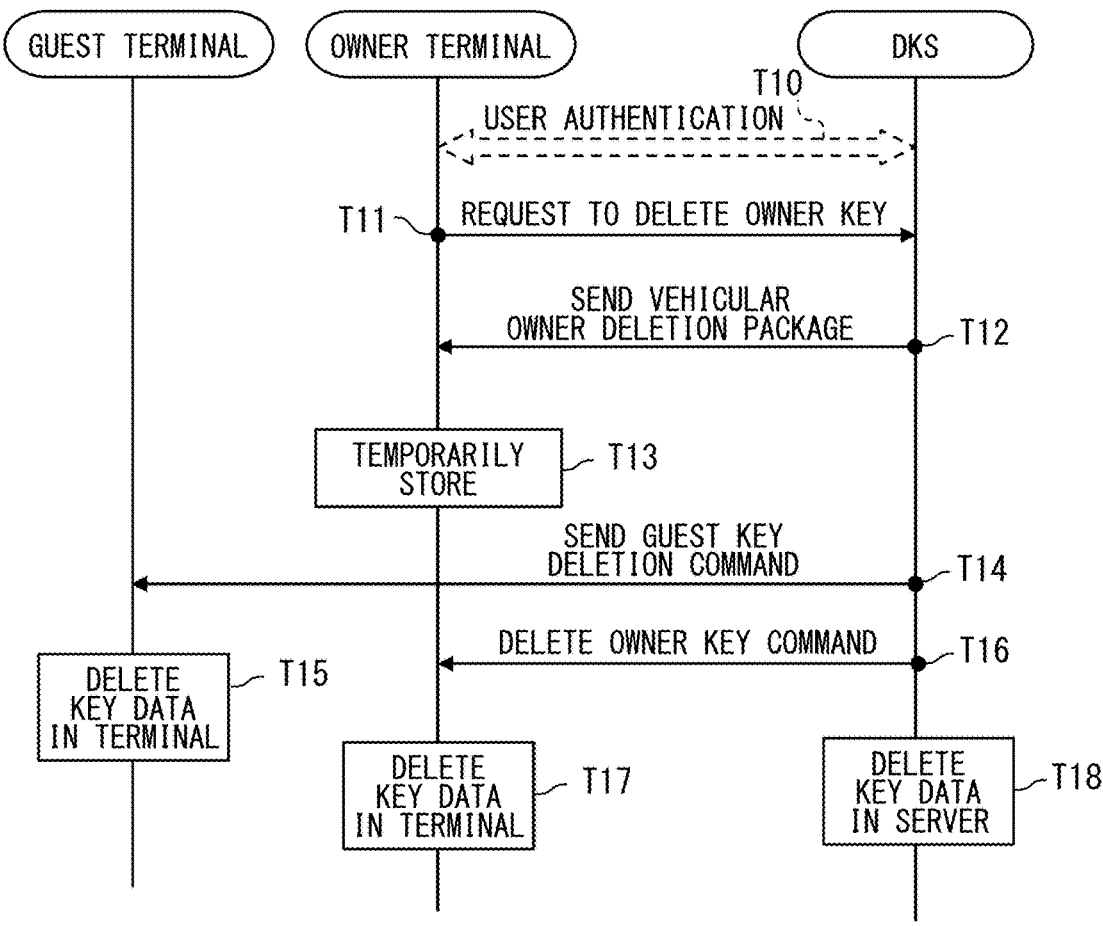
FIG. 29 is a sequence diagram showing an interaction between a mobile terminal and a DKS when deleting an owner key.

FIG. 29 is a sequence diagram showing the interaction of each device corresponding to the in-terminal data deletion phase Ph3. The sequence for deleting the owner key data from the mobile terminal 1 includes steps T10 to T18, as shown in FIG. 29.

Step T10 is a step in which the DKS 3 authenticates the user/mobile terminal 1 in the same manner as in step S10. Step T11 is a step in which the mobile terminal 1 as the owner terminal transmits an owner key deletion request signal based on the user's operation. The owner key deletion request signal includes information for the DKS 3 to identify the request source, such as a device ID, a user ID, or a service key ID. Further, the owner key deletion request signal may include information such as a service key ID, an ECU number, or a vehicle ID as information for identifying the service key to be deleted. Assuming that one user is the owner of a plurality of vehicles, it may be preferable that the owner key deletion request signal includes information for identifying the service key to be deleted.

When the DKS 3 (i.e., the service key deletion unit G5) receives the owner key deletion request signal from the owner terminal, the DKS 3 (i.e., the service key deletion unit G5) transmits the vehicle owner deletion package to the owner terminal as step T12. The vehicle owner deletion package is a data set for deleting data related to all service keys from the vehicle Hv. The vehicle owner deletion package may include a terminal check code or a vehicle check code. When the owner terminal receives the vehicle owner deletion package delivered from the DKS 3, the owner terminal verifies the validity of the package by using the terminal check code, and then stores the package in the vehicle data temporary memory M2 (at step T13).

Further, when the guest key is issued to the vehicle Hv, the DKS 3 transmits a guest key deletion command to the guest terminal based on the owner key deletion request signal from the owner terminal (at step T14). The case where the guest key is issued to the vehicle Hv corresponds to the case where the guest key associated with the owner key to be deleted exists, in other words. The guest key deletion command is a signal for instructing the guest terminal to delete the data related to the service key for the vehicle Hv. The guest key deletion command includes information such as a service key ID to be deleted and a terminal check code. When the guest terminal receives the guest key deletion command, it verifies its validity using the terminal check code, and then deletes all the data related to the service key specified from the key information memory M1 (at step T15). In a more preferred embodiment, the guest terminal may report to the DKS 3 when the guest key deletion process is completed.

The DKS 3 transmits an owner key deletion command to the owner terminal based on the owner key deletion request signal from the owner terminal (at step T16). The owner key deletion command is a signal for instructing the owner terminal to delete the data related to the service key for the vehicle Hv. The owner key deletion command includes information such as a service key ID to be deleted and a terminal check code. The owner key deletion command and the guest key deletion command correspond to a type of instruction commands for deleting the service key, that is, a service key deletion command.

When the owner terminal receives the owner key deletion command, it verifies its validity using the terminal check code, and then deletes all the data related to the service key specified from the key information memory M1 (at step T17). The owner key deletion command does not affect on the data stored in the vehicle data temporary memory M2. That is, even if the owner terminal receives the owner key deletion command, the vehicle owner deletion package stored in the vehicle data temporary memory M2 is left for a predetermined period without being deleted. In a more preferred embodiment, the owner terminal may report to the DKS 3 when the owner key deletion process is completed.

The DKS 3 deletes the data related to the owner key requested to be deleted from the user DB 33 and the vehicle DB 32 based on receiving, for example, that the deletion of the service key is completed from the owner terminal and the guest terminal (at step T18). The deletion of the data in the server may be executed after receiving a report from the vehicle Hv that the deletion of the data in the vehicle has also been completed. In the present embodiment, the vehicle owner deletion package and the owner key deletion command are transmitted separately, alternatively, the transmission mode of various data may not be limited to this feature. The vehicle owner deletion package and the owner key deletion command may be transmitted together with each other as a series of data.

Figure 30:
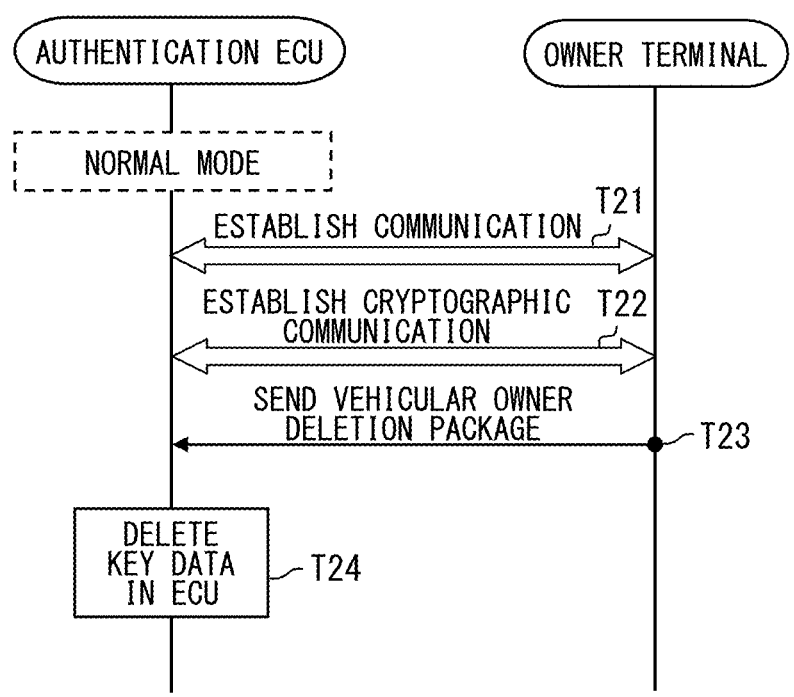
FIG. 30 is a sequence diagram showing an interaction between an owner terminal and an authentication ECU when deleting an owner key.

The sequence of deleting the data related to the owner key from the vehicle Hv will be described with reference to FIG. 30 below. The information related to the owner key also includes guest key data. The sequence for deleting the data related to the owner key from the vehicle Hv includes steps T21 to T24. Unlike the owner key registration sequence, the authentication ECU 4 accepts the owner key deletion instruction even in the normal mode. The mobile terminal 1 in the description of FIG. 30 is a mobile terminal 1 holding a vehicle owner deletion package, and can be referred to an old owner terminal.

When the mobile terminal 1 holding the vehicle owner deletion package enters the BLE communication range of the vehicle Hv, the authentication ECU 4 makes a communication connection with the mobile terminal 1 by BLE in the same manner as in the state of holding the service key (at Step T21). Then, encrypted communication is started (at step T22). Based on the establishment of the encrypted communication link with the authentication ECU 4, the mobile terminal 1 transmits the vehicle owner deletion package for the vehicle Hv, which is stored in the vehicle data temporary memory M2 (at step T23).

When the authentication ECU 4 receives the vehicle owner deletion package from the mobile terminal 1, the authentication ECU 4 deletes all the data related to the service key stored in the vehicle side memory 45 based on the command/program included in the package. As described above, the owner terminal is configured so that the owner key can be deleted from the authentication ECU 4 when the BLE communication link with the authentication ECU 4 is established.

The sequence including steps T11 to T13 may be executed in a state where the owner terminal is in communication connection with the DKS 3. In that case, the vehicle owner deletion package acquired by the owner terminal from the DKS 3 is promptly transferred to the authentication ECU 4 in step T23, and the owner key can also be deleted from the vehicle side memory 45. When the authentication ECU 4 receives the vehicle owner deletion package, the authentication ECU 4 may delete all the service key data after verifying the validity of the received data based on the vehicle check code included in the received data.

Regarding Guest Key Deletion Processing by Owner Authority

It may be preferable that the owner is configured to be able to delete the guest key even before the expiration date, based on a request from the guest or a violation of the usage rules. Here, the flow of the process of deleting the designated guest key by the DSK 3 based on the request from the owner terminal will be described with reference to FIGS. 31 and 32.

Figure 31:
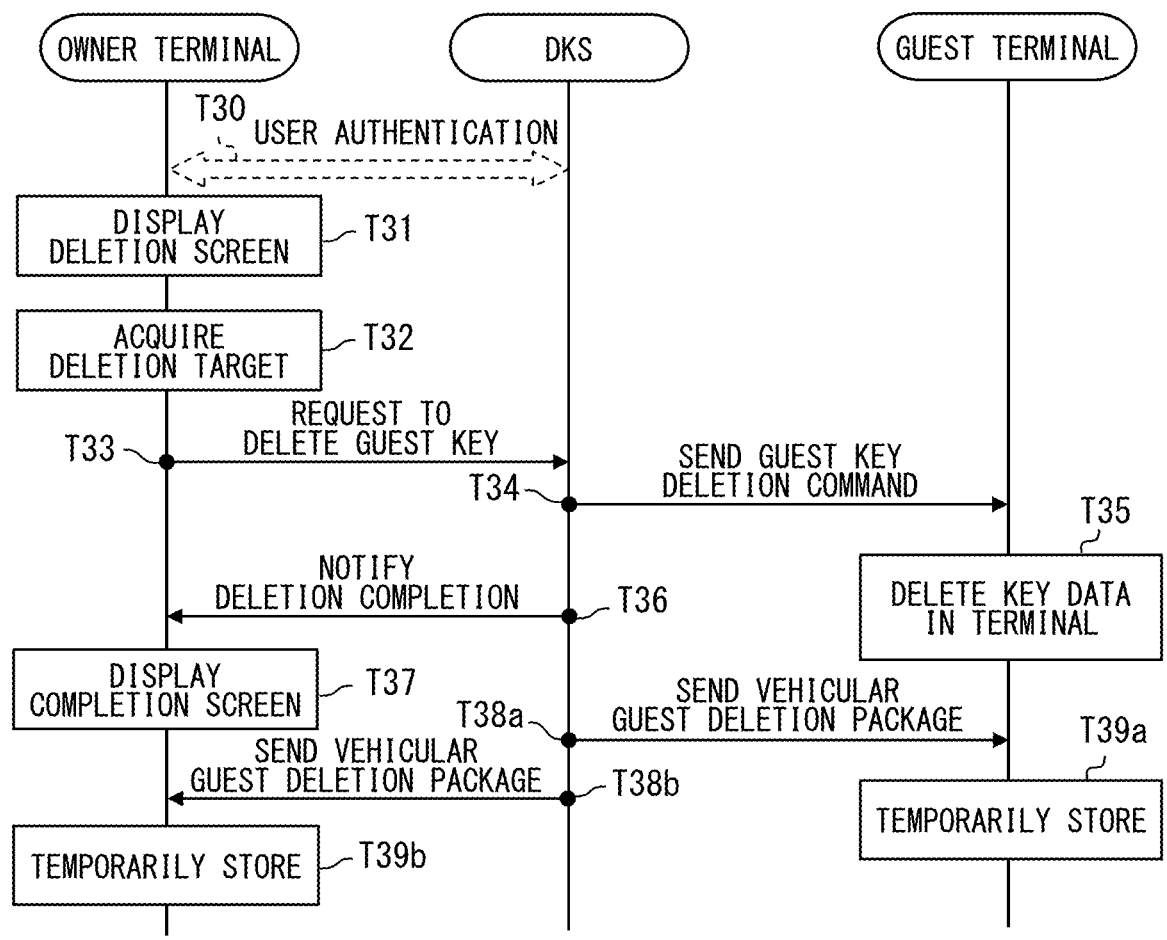
FIG. 31 is a sequence diagram showing an interaction between a mobile terminal and a DKS when deleting a guest key.

Similar to the deletion of the owner key, the guest key deletion process can be divided into a phase Ph3 for deleting the data related to the guest key from the mobile terminal 1 and a phase Ph4 for deleting the guest key data from the vehicle Hv. FIG. 31 is a sequence diagram showing the interaction of each device corresponding to the phase Ph3 of deleting the guest key data from the mobile terminal 1. The sequence for deleting the guest key data from the mobile terminal 1 includes steps T30 to T39b, as shown in FIG. 31.

The device that accepts the owner's operation may not be limited to the mobile terminal 1, and may be a desktop/notebook PC (or a laptop computer). Subsequent owner terminals may be desktop/notebook PCs operated by the owner.

Step T30 is a step in which the digital key application 104 on the owner terminal authenticates that the operator is the owner. The authentication method in the digital key application 104 may be a method using a password or a method using biometric information. Both passwords and biometric information may be used to verify ownership. Various methods such as two-step verification can be adopted for user authentication.

Step T31 is a step in which the owner terminal displays the deletion target selection screen on the display 11 based on the operation signal input from the touch panel 12. The deletion target selection screen is a screen for selecting a guest key to be deleted or a guest corresponding to the guest key. The deletion target selection screen includes a list of guests or guest keys. The deletion target selection screen can also be referred to a guest list screen showing a list of guests or a guest deletion screen.

In step T32, the owner terminal identifies the guest key as a deletion target based on the user operation on the deletion target selection screen indicated by the output signal of the touch panel 12. The user operation of selecting the deletion target guest key corresponds to the deletion instruction operation. When the deletion target guest key is selected by the owner, the owner terminal transmits a guest key deletion request signal targeting the guest key to the DKS 3 (at step T33). The guest key deletion request signal includes the service key ID or user ID to be deleted as information for identifying the service key to be deleted. The guest key deletion request signal may be a signal requesting that a plurality of guest keys be deleted at once. For example, the guest key deletion request signal may be a signal requesting that all guest keys associated with the owner key be deleted at once.

When the DKS 3 receives the guest key deletion request signal, it transmits a guest key deletion command to the guest terminal associated with the guest key specified in the reception signal (at step T34). When the guest terminal receives the guest key deletion command, it verifies its validity using the terminal check code, and then deletes all the data related to the service key specified from the key information memory M1 (at step T35). The guest key deletion command corresponds to the deletion instruction signal. In a more preferred embodiment, the guest terminal may report to the DKS 3 when the guest key deletion process is completed.

Step T36 is a step in which the DKS 3 notifies the owner terminal that the deletion of the guest key is completed. The DKS 3 may send a guest key deletion completion notification based on the completion of transmission of the guest key deletion command, or may send a guest key deletion after receiving a deletion completion report from the guest terminal.

When the owner terminal receives the guest key deletion completion notification from the DKS 3, the owner terminal displays the deletion completion notification screen on the display 11 (at step T37). The deletion completion notification screen may include a user name associated with the deleted guest key and the like.

Further, the DKS 3 transmits the guest deletion package for the vehicle to the owner terminal and the guest terminal corresponding to the guest key set as the deletion target (at steps T38a and T38b). When each device receives the vehicle guest key deletion package, each device stores it in the vehicle data temporary memory M2 (at steps T39a, T39b). The guest key deletion package for vehicles corresponds to the deletion dataset.

Figure 32:
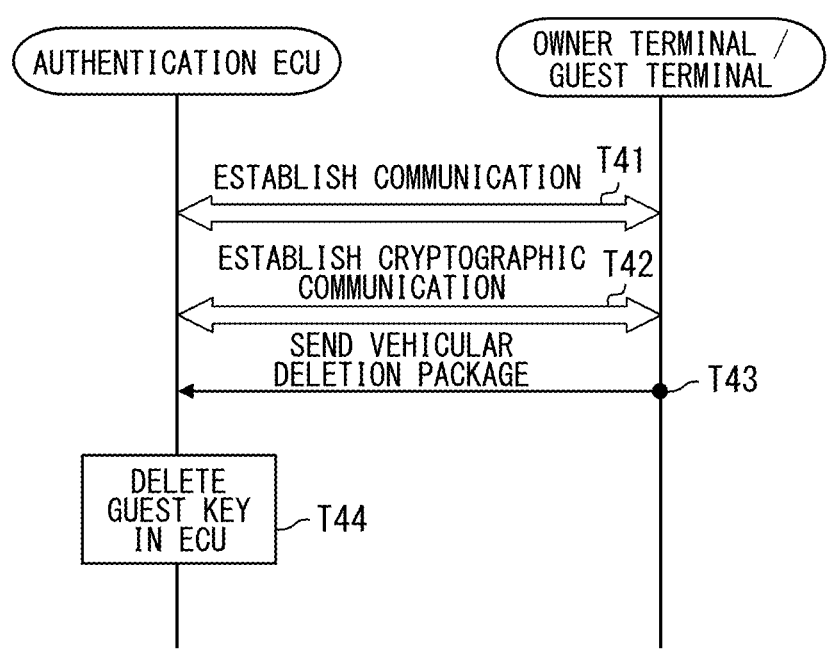
FIG. 32 is a sequence diagram showing an interaction between a mobile terminal and an authentication ECU when deleting a guest key.

Next, a sequence for deleting data related to the guest key from the vehicle Hv will be described with reference to FIG. 32. The sequence for deleting the data related to the guest key from the vehicle Hv includes steps T41 to T44. The guest terminal appearing in the sequence of deleting the data related to the guest key from the vehicle Hv corresponds to the guest terminal holding the guest key deletion package for the vehicle.

When the mobile terminal 1 as the owner terminal or the guest terminal enters the BLE communication range of the vehicle Hv, the authentication ECU 4 makes a communication connection with the mobile terminal 1 by BLE (at step T41). Then, encrypted communication is started (at step T42). Based on the establishment of the encrypted communication link with the authentication ECU 4, the mobile terminal 1 transmits the vehicle guest key deletion package for the vehicle Hv, which is stored in the vehicle data temporary memory M2 (at step T43).

When the authentication ECU 4 receives the guest key deletion package for the vehicle from the owner terminal/guest terminal, the authentication ECU 4 deletes the data related to the guest key specified as the deletion target in the vehicle side memory 45 based on the instruction/program included in the package.

The sequence including steps T41 to T43 may be executed in a state where the owner terminal/guest terminal is in communication connection with the DKS 3. When the authentication ECU 4 receives the vehicle guest key deletion package, the authentication ECU 4 may delete all the service key data after verifying the validity of the received data based on the vehicle check code included in the received data.

According to the above configuration, the owner can delete any guest key at any time. Therefore, it is possible to stop the guest from using the vehicle Hv according to the usage status of the vehicle Hv by the guest and the convenience of the owner.

When the guest key is suddenly deleted while the guest is using the vehicle Hv, the guest may be inconvenienced. In particular, when the guest is moving to a place away from the original storage place of the vehicle Hv by using the vehicle Hv, and if the vehicle Hv suddenly becomes unusable, both the guest and the owner may be inconvenienced. Under such circumstances, a certain period of time may be provided from the application for deletion of the guest key to the actual execution of the deletion process. The deletion of the guest key or the like may be executed on condition that the vehicle Hv is parked in the predetermined storage location. The DKS 3 may display a screen indicating that the owner has applied for deletion of the guest key on the corresponding guest terminal.

As described above, the owner terminal is configured to be able to accept operations for selectively deleting the guest key associated with the vehicle. On the other hand, the operation of changing only the setting related to the expiration date or the authority without deleting the guest key is configured to be unacceptable. The DKS 3 is also configured so that it is impossible to change the authority setting and expiration date of the issued service key while keeping the service key. When the owner wants to change the service key authority setting or expiration date for a certain guest, the owner will carry out the procedure for issuing the new guest key with the desired authority setting after deleting the corresponding guest key once.

In the above, the case where the owner deletes the guest key by operating the owner terminal or the like has been described, alternatively, the guest key can also be deleted by the guest's own operation. When the guest key is deleted based on the guest's operation, the DSK 3 sends a notification that the guest key has been deleted to the owner terminal associated with the guest key. Based on the notification, the owner terminal displays, for example, a guest deletion screen including the deleted guest key or its user name. Alternatively, the status information for each guest is updated based on the notification from the DKS 3.

About Service Key Deletion Processing Using In-Vehicle HMI

Figure 33:
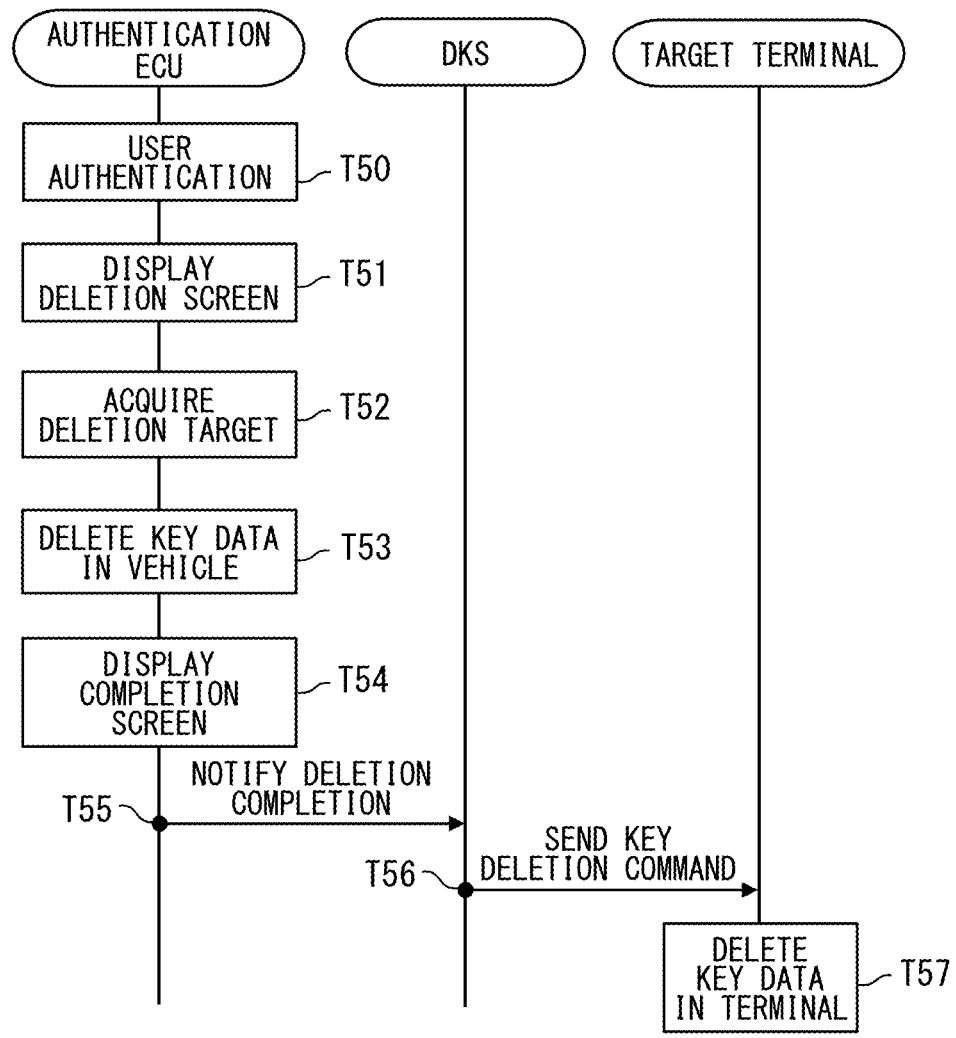
FIG. 33 is a sequence diagram showing a flow of a series of processes when a service key is deleted via an in-vehicle HMI.

Here, the flow of the process of deleting the service key specified by the user based on the user operation for the in-vehicle HMI will be described with reference to FIG. 33. The sequence of deleting the service key specified by the user from the authentication ECU 4 and the related mobile terminal 1 based on the user operation on the vehicle-mounted HMI includes steps T50 to T57 as shown in FIG. 33. As a condition, the DKS 3 is configured to be able to accept a request for deleting a service key according to the authority of the operator via the in-vehicle HMI. For example, when the operator of the in-vehicle HMI 50 is the owner, the authentication ECU 4 and the DKS 3 are configured to be able to accept not only the guest key but also a deletion instruction for the owner key via the in-vehicle HMI 50. Among the steps constituting FIG. 33, the specific execution subject of the step executed by the authentication ECU 4 can be understood as the authentication processor 41.

Step T50 is a step in which the authentication ECU 4 authenticates the user operating the in-vehicle HMI 50. As described above, various methods such as a method involving password input and a method using biometric information can be adopted as the authentication method. The step T50 can be understood as a step of identifying the operator of the in-vehicle HMI 50. Further, for the user authentication by the authentication ECU 4, the authentication result of the mobile terminal 1 by the authentication ECU 4 may be diverted. The authentication ECU 4 may consider the user corresponding to the mobile terminal 1 as the communication partner as the operator of the in-vehicle HMI 50.

In step T51, the authentication ECU 4 displays the service key deletion screen on the display 51 based on the operation signal input from the input device 52. The service key deletion screen is a screen for selecting a service key ID or a user to be deleted. When the operator is recognized as the owner, the service key deletion screen is configured so that the owner key can also be selected as the deletion target. The service key deletion screen may include a list of service keys that can be deleted with the authority of the user as an operator, or a list of corresponding users.

In step T52, the authentication ECU 4 identifies the service key to be deleted based on the user operation on the service key deletion screen indicated by the output signal of the input device 52. Then, as step T53, the authentication ECU 4 deletes the data related to the service key designated as the deletion target from the vehicle side memory 45. When the data deletion from the vehicle side memory 45 is completed, the authentication ECU 4 displays the deletion completion screen (at step T54). The deletion completion screen may include information such as a user name associated with the deleted service key. The display of the deletion completion screen is an arbitrary element and may be omitted.

When the deletion of the data related to the designated service key is completed, the authentication ECU 4 transmits a deletion completion notification signal indicating that the service key deletion sequence is completed to the DKS 3 at step T55. The deletion completion notification signal includes the deleted service key ID or the corresponding user ID and the like. When the owner key is specified as the deletion target, all the service keys are deleted from the vehicle side memory 45 in step T53.

Upon receiving the deletion completion notification signal from the authentication ECU 4, the DKS 3 transmits a service key deletion command to the mobile terminal 1 associated with the service key specified in the reception signal (at step T56). When the owner key is deleted from the vehicle-side memory 45 based on the operation on the in-vehicle HMI 50, the DSK 3 transmits a service key deletion command to the owner terminal and all guest terminals associated with the owner terminal.

When the mobile terminal 1 receives the service key deletion command, it verifies its validity using the terminal check code, and then deletes all the data related to the service key specified from the key information memory M1 (at step T57). As a more preferable embodiment, each mobile terminal 1 may report to the DKS 3 when the service key deletion process is completed.

As described above, the owner can delete the service key of any guest by using the in-vehicle HMI 50. The owner can also delete the owner key using the in-vehicle HMI 50. Instead of the owner, the staff of the dealer shop can execute the same deletion process using the in-vehicle HMI 50.

The authentication ECU 4 may be configured to execute the owner key deletion process using the in-vehicle HMI 50 on condition that the security unlock signal is input from the security unlock tool or the DKS 3. With such a configuration, it is possible to reduce the risk that the owner key and all guest keys associated with the owner key will be deleted due to an operation error or an illegal operation. Deleting the owner key has a greater impact than deleting the guest key. Therefore, the user authentication for deleting the owner key may be more sophisticated/complex than the user authentication for deleting the guest key. For example, the number of user authentication steps for deleting the owner key may be set to be larger than the number of user authentication steps for deleting the guest key.

Further, the DKS 3 transmits different data to the owner terminal depending on whether or not the owner key deletion operation is performed via the in-vehicle HMI 50 as described above. For example, when the owner key deletion operation is performed on the owner terminal, the DKS 3 sends a vehicle owner key deletion package to the owner terminal, while the DKS 3 does not send the vehicle owner key deletion package to the owner terminal when the owner key deletion operation is performed on the in-vehicle HMI 50. According to this configuration, the amount of data communication of the owner terminal can be suppressed. Further, when the owner key deletion operation is performed by the in-vehicle HMI 50, the authentication ECU 4 deletes all the service keys without receiving the deletion data set from the DKS 3. That is, the communication volume of the DKS 3 itself can be reduced.

Supplement to the Service Key Management Method by DKS

Figure 34:
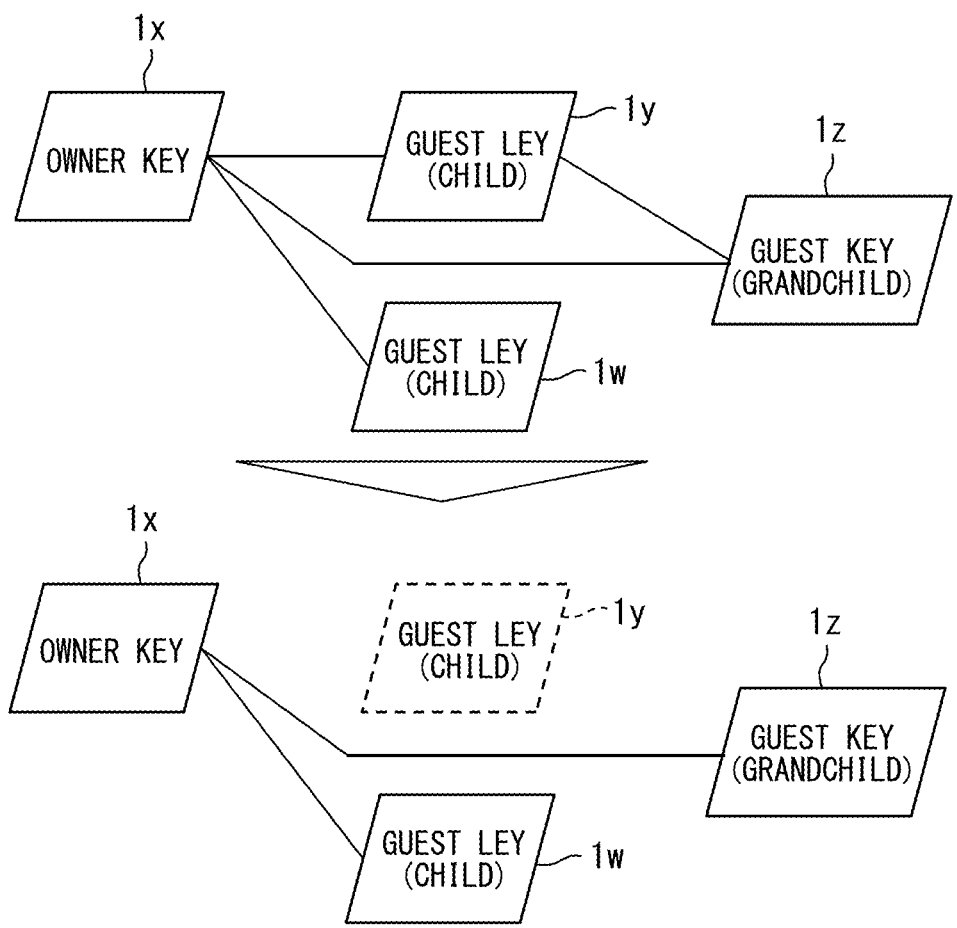
FIG. 34 is a diagram for explaining an operation example of DKS when a guest key with an issue authority is deleted.

In the DKS 3, all of the guest keys associated with one owner key are managed by connecting to the service key ID of the owner key. Even when the guest key with the issuance right is deleted, the DKS 3 does not delete the guest key of the grandchild generation/third generation issued according to the authority of the guest key with the issuance right, as shown in FIG. 34. The guest key of the grandchild generation/third generation survives as a guest key linked to the owner key. In FIG. 34, 1x indicates an owner key, 1y indicates a guest key with an issue right, and 1z indicates a grandchild generation/third generation guest key. 1v is a guest key issued by the owner key, and the presence or absence of the issuance right is arbitrary. For convenience, a group of guest keys associated with one owner key is also referred to as a family. The service keys that provide the family are managed by the owner key ID.

Further, the DKS 3 is configured to be able to accept a user's application for changing the model of the mobile terminal 1. When the model is changed by the user, the device ID may change. However, the service key ID is not changed even if the model is changed. Since the family is formed by the service key ID of the owner key, even if the owner changes the model of the mobile terminal 1, the guest key is not affected and the family itself survives. For example, even if the owner changes the model of the mobile terminal 1, the device ID and the service key of the owner terminal are only changed. The same applies when the mobile terminal 1 of the guest having the guest key with the issue authority is changed. That is, the vehicle digital key system Sys is configured so as not to affect other guest keys even when the mobile terminal 1 that is the issue source of the guest key is changed to another device.

Figure 35:
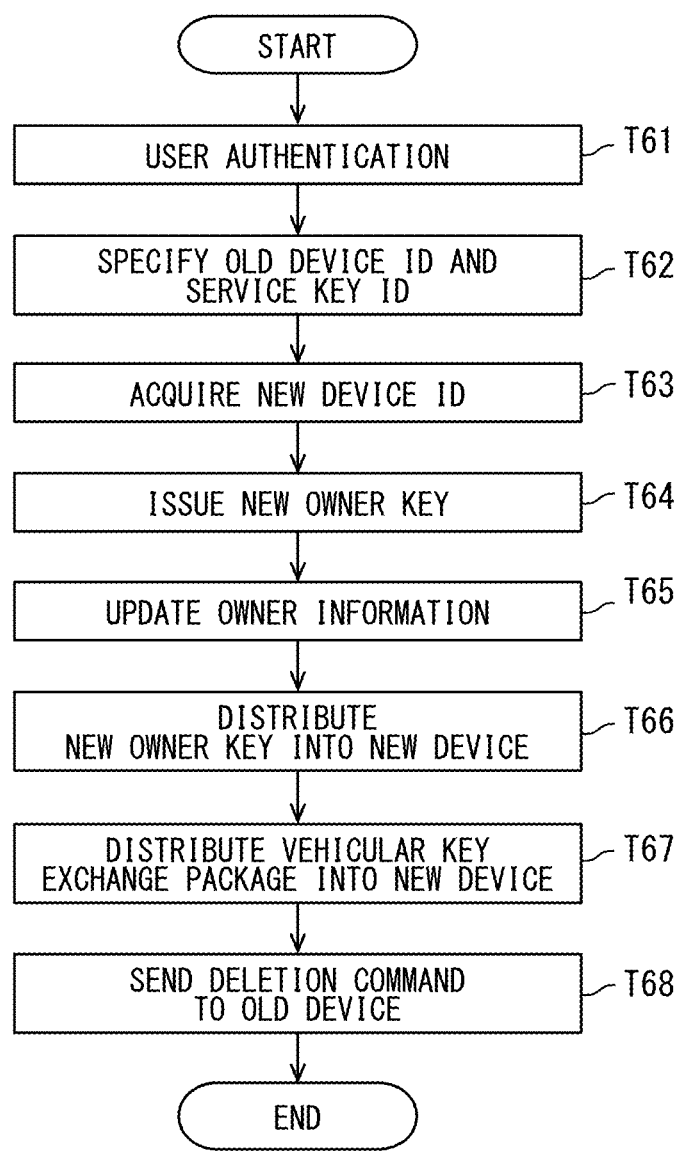
FIG. 35 is a flowchart for explaining the operation of the DKS when the model of the mobile terminal owned by the owner is changed.

The DKS 3 carries out the owner terminal change process, for example, in the procedure shown in FIG. 35. The owner terminal change process is a process for changing the model of the owner terminal. As shown in FIG. 35, the owner terminal authentication process may include steps T61 to T68. The owner terminal change process is started based on the input of a signal corresponding to the offer to change the model from the mobile terminal 1 or the PC. The terminal operated by the owner may be an old terminal which is a mobile terminal 1 before the model change, or a new terminal which is a mobile terminal 1 after the model change. In addition, the device to which the owner applies for a model change may be any terminal that has access to the Internet, such as a desktop/laptop PC. The digital key application 104 is installed on the new terminal and information such as the user ID is registered by the predetermined data transfer operation by the owner.

Step T61 is a step of authenticating that the operator/applicant is the owner. The authentication method for being an owner is as described above. When the DKS 3 authenticates that the operator is the owner, the DKS 3 refers to the user DB 33 based on the user ID and the like, and acquires the owner's old device ID and service key ID (at step T62). The old device ID refers to the device ID of the old terminal. Further, the DKS 3 acquires a new device ID, which is a device ID of the new terminal, by performing data communication with the new terminal (at step T63). Step T64 is a step in which the DKS 3 newly issues a service key as an owner key using the new device ID. The specific method of generating the service key is as described above.

When the DKS 3 generates the new owner key, the DKS 3 updates the registered contents of the user DB 33 (at step T65). For example, in the owner user data, the old owner key is deleted and the new owner key is registered. The old owner key is a service key that was used before the model change, and is a service key based on the old device ID. In this embodiment, even if the owner's device is changed, the owner's service key ID is not changed and the previous ID is maintained. Therefore, no special action is required for the guest user data. As another aspect, when the service key ID is also changed, the DKS 3 can replace the owner's service key ID associated with the guest key with the new owner key ID. In addition, when the DSK 3 generates a new owner key, it creates a predetermined number of one-time authentication keys corresponding to the new owner key.

Then, the DKS 3 transmits the terminal key exchange package to the new terminal (at step T66). The terminal key exchange package includes at least the new owner key. The key exchange package for terminals may be a command/program that replaces the owner key stored in the key information memory M1 with a new owner key. The terminal key exchange package may include a plurality of one-time authentication keys corresponding to the new owner key and a variable code. In addition, the terminal key exchange package may include a terminal check code. The data set for the one-time authentication key may be transmitted as an authentication key package separately from the terminal key exchange package.

When the mobile terminal 1 as a new terminal receives the key exchange package for the terminal from the DKS 3, after verifying the validity of the data based on the terminal check code, the received data related to the new owner key is stored in the key information memory M1. Specifically, the terminal processor 101 stores the received service key as the new owner key and a plurality of one-time authentication keys associated with the variable code.

In addition, the DKS 3 transmits a vehicle key exchange package, which is a data set for registering data related to the new owner key in the authentication ECU 4, to the new terminal. The vehicle key exchange package includes a service key as a new owner key and a vehicle check code. The key exchange package for vehicles may be a command/program that replaces the owner key stored in the vehicle side memory 45 with a new owner key.

When the mobile terminal 1 as a new terminal receives the vehicle key exchange package, the terminal 1 stores it in the vehicle data temporary memory M2. Then, based on the establishment of the authentication ECU 4 and the BLE encrypted communication link, the vehicle key exchange package is transferred to the authentication ECU 4. That is, the vehicle key exchange package is also distributed to the authentication ECU 4 via the mobile terminal 1 in the same manner as the vehicle registration package.

When the authentication ECU 4 receives the vehicle key exchange package, it verifies the validity of the data based on the vehicle check code, and then stores the received data related to the new owner key in the vehicle side memory 45. Specifically, the authentication processor 41 stores the received service key as the new owner key in the owner key memory 451. Along with this, the authentication ECU 4 deletes the old owner key stored in the owner key memory 451. Since the service key ID is maintained even after the model is changed, it may be diverted without being deleted. Of course, the service key ID may be newly registered after being deleted once.

When the authentication ECU 4 accepts the owner key registration operation while the owner key is stored in the owner key memory 451, the authentication ECU 4 may display a predetermined warning message on the displays 11 and 51. The warning message is, for example, a message indicating that the owner has already been registered. In addition, when the authentication ECU 4 accepts the owner key registration operation while the owner key is stored in the owner key memory 451, the authentication ECU 4 may display a screen for prompting the input of a predetermined password on the displays 11 and 51. As the password requested to be entered here, for example, a password associated with the owner's user ID or a predetermined code for deleting the owner key can be adopted.

In addition, the DKS 3 transmits a service key deletion command to the old terminal at step T68. As a result, when the old terminal remains in an online state, the service key is deleted from the old terminal. Note that step T68 is an arbitrary element and may be omitted.

Other Supplements for the Entire System

In the above, the vehicle Hv is assumed to be a vehicle owned by an individual as an example, and the owner is also assumed to be an individual. Alternatively, the above-mentioned digital key system for vehicles Sys can also be applied to MaaS (Mobility as a Service). The owner may be, for example, a company/organization that provides a vehicle rental service or a sharing service. In that case, the staff as an operator belonging to the company/organization can operate the owner terminal. Further, the owner may have a large number of vehicles such as 50 or 100 vehicles. The service key ID as the owner may be common to a plurality of vehicles or may be different for each vehicle. The configuration of the DKS 3 may be divided into a server that manages vehicle information and a server that manages the service key, depending on the form of the business.

In the above-described embodiment, the authentication ECU 4 describes the configuration of acquiring the data related to the registration/deletion of the service key from the mobile terminal 1, alternatively, the present embodiment may not be limited to this feature. The authentication ECU 4 may be configured to receive various packages from the DKS 3 by cellular communication or Wi-Fi communication without going through the mobile terminal 1.

Additional Note (1)

The mobile terminal 1 described above is a portable general-purpose information processing device that is configured to execute:

transmitting an owner key issuance request signal, which requests to issue an owner key that is a service key for the vehicle owned by the user and has the authority as an owner, to the server (3) that generates a service key for using the vehicle based on the operation of the user;

receiving the owner key from the server as the server's response to the owner key issuance request signal;

storing the received owner key in a predetermined terminal memory (105); and starting a communication for registering the owner key in the vehicle device under a condition that the communication link for short-range wireless communication is established with the vehicle device (4) mounted on the vehicle.

Further, the digital key application 104 can be understood as a computer program that executes a general-purpose computer as a mobile terminal 1. In addition, the storage medium in which the digital key application 104 is stored corresponds to a storage medium in which an instruction set for operating the computer as the mobile terminal 1 is stored.

Additional Note (2)

The device, the system and the method therefor which have been described in the present disclosure may be also realized by a dedicated computer which constitutes a processor programmed to execute one or more functions concretized by computer programs. Also, the device and the method therefor which have been described in the present disclosure may be also realized by a special purpose hardware logic circuit. Also, the device and the method therefor which have been described in the present disclosure may be also realized by one or more dedicated computers which are constituted by combinations of a processor for executing computer programs and one or more hardware logic circuits.

For example, some or all of the functions provided by the authentication processor may be realized as hardware. A configuration in which a certain function is implemented as hardware includes a configuration in which the function is implemented by using one or more ICs or the like. As a processor (arithmetic core), a CPU, an MPU, a GPU, a DFP (Data Flow Processor), or the like can be adopted. Further, some or all of the functions provided by the authentication processor may be realized by combining a plurality of types of arithmetic processing units. Some or all of the functions provided by the authentication processor may be realized by using a system-on-chip (SoC), FPGA, ASIC, or the like. The FPGA is an abbreviation for Field Programmable Gate Array. The ASIC is an abbreviation of Application Specific Integrated Circuit. The above supplementary description is similarly applicable to the terminal processor and the server processor. Further, the computer program may be stored in a computer-readable non-transitionary tangible storage medium as an instruction executed by the computer. As a program storage medium, an HDD (Hard-disk Drive), an SSD (Solid State Drive), a flash memory, or the like can be adopted.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause the vehicular digital key system to perform functions" should be understood that (i) only the circuit can cause a vehicular digital key system to perform all the functions, (ii) only the processor can cause a vehicular digital key system to perform all the functions, or (iii) the circuit can cause a vehicular digital key system to perform at least one of the functions and the processor can cause a vehicular digital key system to perform the remaining functions. For instance, in the case of the above-described (iii), function A and B among the functions A to C may be implemented by a circuit, while the remaining function C may be implemented by a processor.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular digital key system comprising:
   a vehicular device that is mounted on and used in a vehicle;
   a mobile terminal that is an information processing terminal carried by a user; and
   a server that generates a service key unique for each mobile terminal as key information for using the vehicle, and distributes the service key directly or indirectly to each of the mobile terminal and the vehicular device, wherein:
   the vehicular device is configured to determine a validity of the mobile terminal using a disposable one-time authentication key generated based on the service key;
   the server generates a plurality of the one-time authentication keys based on a request from the mobile terminal, and delivers the one-time authentication keys to the mobile terminal with an expiration date;
   the mobile terminal is configured to receive the one-time authentication key from the server;
   the mobile terminal stores the one-time authentication key in a predetermined terminal-side memory; and
   the mobile terminal is configured to replace a part or all of the one-time authentication keys stored in the terminal-side memory based on the expiration date of each one-time authentication key.

2. The vehicular digital key system according to claim 1, wherein:
   the vehicular device and the mobile terminal are configured to perform data communication with each other by short-range wireless communication, which is wireless communication conforming to a predetermined short-range wireless communication standard;
   the one-time authentication key is a code generated by combining the service key with a different variable code each time;
   the mobile terminal receives information indicating the variation code used to generate the one-time authentication key together with the one-time authentication key, from the server;
   the mobile terminal transmits the variation code to the vehicular device under a condition that a link of the short-range wireless communication link is established with the vehicular device;
   the vehicular device includes a vehicle-side memory for storing the service key of the mobile terminal issued by the server;
   the vehicular device is configured to generate the one-time authentication key by combining the service key of the mobile terminal stored in the vehicle-side memory and the variable code received from the mobile terminal; and
   the vehicular device is configured to determine the validity of the mobile terminal using a generated one-time authentication key.

3. The vehicular digital key system according to claim 1, wherein:
   the vehicular device and the mobile terminal are configured to perform data communication with each other by short-range wireless communication, which is wireless communication conforming to a predetermined short-range wireless communication standard;

the vehicular device is configured to acquire the plurality of one-time authentication keys issued for the mobile terminal from the mobile terminal or the server and to store the plurality of one-time authentication keys in the vehicle-side memory;

the vehicular device is configured to communicate with the mobile terminal through the short-range wireless communication to exchange an adjustment message for checking the one-time authentication key used for an authentication process from the plurality of one-time authentication keys issued by the server; and the vehicular device is configured to determine the validity of the mobile terminal using the one-time authentication key specified based on the adjustment message.

4. The vehicular digital key system according to claim 1, wherein:

the mobile terminal is configured to determine whether a remaining number of the one-time authentication keys stored in the terminal-side memory is less than a predetermined value, periodically or based on a detection of an occurrence of a predetermined confirmation event; and the mobile terminal is configured to communication with the server to acquire the one-time authentication key from the server when the Internet is accessible after the mobile terminal determines that the remaining number of the one-time authentication keys is less than the predetermined value.

5. The vehicular digital key system according to claim 1, wherein:

the server includes a database that stores information about an owner terminal, which is the mobile terminal possessed by an owner of the vehicle, in association with information of an owner key, which is the service key having an authority as the owner;

the server is configured to issue a guest key which is the service key for a guest who is the user other than the owner, based on a reception of a predetermined guest key issuance request signal issued from the owner terminal;

the guest key includes two types of the guest key with an issuance right that has an authority to issue an other guest key and the guest key without the issuance right that does not have the authority to issue the other guest key; and when the server issues the guest key based on a request from the owner key, the server is configured to determine whether the guest key to be issued is guest key with the issuance right or the guest key without the issuance right, based on a signal received from the owner terminal.

6. The vehicular digital key system according to claim 5, wherein:

the mobile terminal having the guest key with the issuance right or the owner terminal transmits a data set including setting information of the authority assigned to a newly issued guest key as the guest key issuance request signal based on an operation of the user; and the server is configured to issue the guest key having the authority corresponding to the setting information acquired from an issue request source of the guest key.

7. The vehicular digital key system according to claim 6, wherein:

the owner terminal is configured to accept an operation for selectively deleting the guest key associated with the vehicle; and the owner key is configured not to accept an operation for changing only a setting of the expiration date or the authority without deleting the guest key.

8. The vehicular digital key system according to claim 5, wherein:

the server is configured to store the plurality of the guest keys associated with one vehicle in the database in association with an owner key number, which is an identification number associated with the owner key; and the server is configured to manage the service key associated with the one vehicle based on the owner key number.

9. The vehicular digital key system according to claim 8, wherein:

the server is configured to deliver the owner key number together with the guest key to a guest terminal, which is the mobile terminal corresponding to the guest key when the server issues the guest key based on the request from the owner terminal.

10. The vehicular digital key system according to claim 8, wherein:

the server is configured to accept a change of the mobile terminal owned by the user; and the server is configured not to delete the service key delivered to the guest associated with the owner even when the mobile terminal possessed by the owner is changed.

11. The vehicular digital key system according to claim 1, wherein:

a guest key, which is the service key for a guest who is the user other than the owner of the vehicle, has an expiration date specified by an issue request source of the guest key; and the vehicular device is configured to automatically delete information of an expired guest key.

12. The vehicular digital key system according to claim 1, wherein:

the vehicular device and the mobile terminal are configured to perform data communication with each other by short-range wireless communication, which is wireless communication conforming to a predetermined short-range wireless communication standard;

the server and the mobile terminal are configured to be able to communicate via the Internet;

the vehicular device is configured to acquire clock time information from the server via the mobile terminal based on an establishment of the link of the short-range wireless communication with the mobile terminal; and the vehicular device is configured to correct an internal clock time, which is the clock time information held by the vehicular device, using an acquired clock time information.

13. The vehicular digital key system according to claim 1, wherein:

the vehicular device is provided by at least one of (i) a circuit and (ii) a processor having a memory storing computer program code;

the mobile terminal is provided by at least one of (i) a circuit and (ii) a processor having a memory storing computer program code; and the server is provided by at least one of (i) a circuit and (ii) a processor having a memory storing computer program code.

14. A vehicular digital key management method executed by:
- a mobile terminal that is an information processing terminal carried by a user;
- a vehicular device that is mounted on and used in a vehicle; and
- a server that generates a service key unique to each mobile terminal as key information for using the vehicle, the vehicular digital key management method comprising:
- generating, by the server, a plurality of disposable one-time authentication keys based on the service key of the mobile terminal according to a request from the mobile terminal;
- delivering, by the server, the one-time authentication keys to the mobile terminal with an expiration date;
- receiving, by the mobile terminal, the one-time authentication key from the server;
- storing, by the mobile terminal, the one-time authentication key in a predetermined terminal-side memory;
- periodically replacing, by the mobile terminal, a part or all of the one-time authentication keys stored in the terminal-side memory based on the expiration date of each one-time authentication key;
- specifying, by the vehicular device, any one of the one-time authentication keys held by the mobile terminal by communicating with the server or the mobile terminal; and
- determining, by the vehicular device, a validity of the mobile terminal using a specified one-time authentication key.

15. A vehicular device mounted on and used in a vehicle and configured to communicate with each of a mobile terminal as an information processing terminal carried by an user and a server that generates a service key unique for each mobile terminal as key information for using the vehicle, the vehicular device comprising:
- a vehicle-side memory that stores the service key for each user; and
- a vehicle control unit having at least one processor, wherein:
- the vehicle control unit generates a one-time authentication key, which is a disposable authentication key, based on the service key stored in the vehicle-side memory; and
- the vehicle control unit determines a validity of the mobile terminal using the one-time authentication key.

16. The vehicular device according to claim 15, wherein:
- the vehicle control unit is provided by at least one of (i) a circuit and (ii) a processor having a memory storing computer program code.

17. A mobile terminal as an information processing terminal carried by an user and configured to communicate with each of a vehicular device mounted and used in a vehicle and a server that generates a service key as key information for using the vehicle, the mobile terminal comprising:
- a terminal-side memory that stores a data of the service key;
- a short-range communication unit that performs short-range wireless communication, which is wireless communication conforming to a predetermined short-range wireless communication standard, with the vehicular device;
- a network connection unit for communicating with the server via the Internet; and
- a terminal control unit having at least one processor, wherein
- the terminal control unit transmits an authentication key request signal, for requesting the server to deliver a plurality of one-time authentication keys with expiration dates generated based on the service key at once, to the server under a condition that a connection to the Internet is established;
- the terminal control unit receives the one-time authentication key from the server, and stores the one-time authentication key in the terminal-side memory; and
- the terminal control unit replaces a part or all of the one-time authentication keys stored in the terminal-side memory based on the expiration date of each one-time authentication key.

18. The mobile terminal according to claim 17, further comprising:
- at least one of (i) a circuit and (ii) a processor having a memory storing computer program code,
- wherein the at least one of the circuit and the processor having the memory is configured to cause the mobile terminal to provide:
- the short-range communication unit; the network connection unit; and the terminal control unit.

* * * * *